US012618508B2

(12) United States Patent
Liu et al.

(10) Patent No.: US 12,618,508 B2
(45) Date of Patent: May 5, 2026

(54) GIMBAL, LEVELING METHOD AND CONTROL METHOD THEREOF, LEVELING MOTOR AND GIMBAL ASSEMBLY

(71) Applicant: SZ DJI TECHNOLOGY CO., LTD., Shenzhen (CN)

(72) Inventors: Guoyao Liu, Shenzhen (CN); Shanguang Guo, Shenzhen (CN); Wenjie Wang, Shenzhen (CN); Wenlin Xie, Shenzhen (CN); Huipeng Yin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 201 days.

(21) Appl. No.: 18/213,258

(22) Filed: Jun. 22, 2023

(65) Prior Publication Data

US 2023/0349507 A1 Nov. 2, 2023

Related U.S. Application Data

(63) Continuation of application No. PCT/CN2020/142293, filed on Dec. 31, 2020.

(51) Int. Cl.
*F16M 11/20* (2006.01)
*F16M 11/04* (2006.01)
(Continued)

(52) U.S. Cl.
CPC ....... *F16M 11/2035* (2013.01); *F16M 11/048* (2013.01); *F16M 11/18* (2013.01);
(Continued)

(58) Field of Classification Search
CPC ........... F16M 11/2092; F16M 11/2071; F16M 11/38; F16M 11/2021; F16M 11/24;
(Continued)

(56) References Cited

U.S. PATENT DOCUMENTS

2017/0026554 A1 1/2017 Olsson et al.

FOREIGN PATENT DOCUMENTS

CN 105518369 A 4/2016
CN 106764305 A 5/2017
(Continued)

OTHER PUBLICATIONS

International Search Report of PCT/CN2020/142293 (Sep. 22, 2021).

*Primary Examiner* — Said Bouziane

(57) ABSTRACT

A gimbal, a balancing method, a control method, a balancing motor and a gimbal assembly are provided. The balancing method includes: controlling a driving motor to rotate, and obtain a first electric signal parameter of the driving motor, where the gimbal includes a rotating assembly and a balancing motor, and the rotating assembly includes a gimbal component, a transmission mechanism and a driving motor. The driving motor is configured to drive the gimbal component to rotate so as to adjust the attitude of the gimbal. The balancing motor is configured to drive at least part of the gimbal component to move via the transmission mechanism so as to adjust the center of gravity of the gimbal. The operation of the balancing motor may be controlled based on the first electrical signal parameter to make the gimbal in a balanced state in an adjustment direction of the balancing motor.

20 Claims, 19 Drawing Sheets

(51) Int. Cl.

| | |
|---|---|
| *F16M 11/18* | (2006.01) |
| *F16M 11/22* | (2006.01) |
| *F16M 11/38* | (2006.01) |
| *F16M 13/04* | (2006.01) |
| *G03B 17/56* | (2021.01) |
| *H04N 23/60* | (2023.01) |

(52) U.S. Cl.
   CPC ........... *F16M 11/38* (2013.01); *G03B 17/561*
      (2013.01); *H04N 23/60* (2023.01); *F16M*
      *11/22* (2013.01); *F16M 13/04* (2013.01);
      *F16M 2200/022* (2013.01); *F16M 2200/024*
      (2013.01); *F16M 2200/04* (2013.01)

(58) Field of Classification Search
   CPC .... F16M 11/041; F16M 11/18; F16M 11/205;
      F16M 11/048; F16M 11/242; F16M
      11/2035; G03B 17/56; G03B 17/561;
      H04N 23/60; F16H 19/04; F41A 23/28;
      F41A 23/34; F41A 23/30; B25J 11/002;
      B25J 19/0008; B25J 9/162; F41H 7/005;
      G05D 1/0891
   See application file for complete search history.

(56)           References Cited

FOREIGN PATENT DOCUMENTS

| | | | |
|---|---|---|---|
| CN | 206164640 U | 5/2017 | |
| CN | 108253271 A | 7/2018 | |
| CN | 108459622 A | 8/2018 | |
| CN | 110785725 A | 2/2020 | |
| CN | 111316029 A | 6/2020 | |
| CN | 112119363 A | 12/2020 | |
| CN | 216079233 U | 3/2022 | |
| CN | 216345078 U | 4/2022 | |
| WO | WO-2017206068 A1 * | 12/2017 | ............. B64D 47/08 |

* cited by examiner

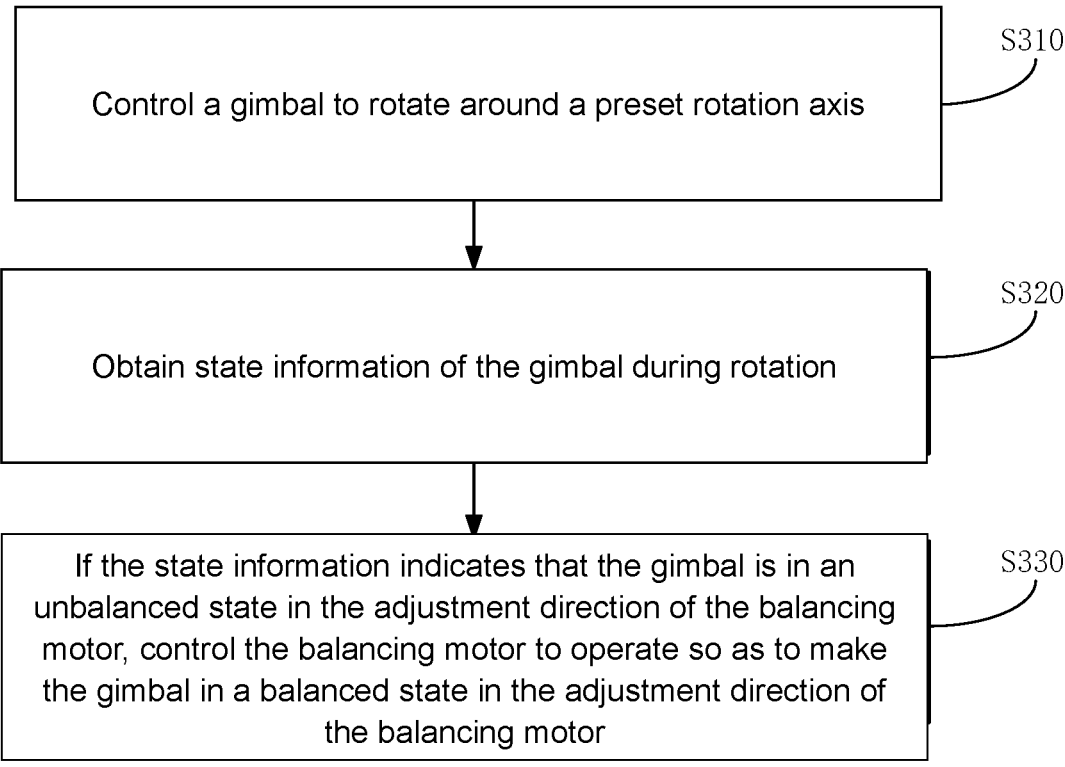

Control a gimbal to rotate around a preset rotation axis

S310

Obtain state information of the gimbal during rotation

S320

If the state information indicates that the gimbal is in an unbalanced state in the adjustment direction of the balancing motor, control the balancing motor to operate so as to make the gimbal in a balanced state in the adjustment direction of the balancing motor

GIMBAL, LEVELING METHOD AND CONTROL METHOD THEREOF, LEVELING MOTOR AND GIMBAL ASSEMBLY

RELATED APPLICATIONS

This application is a continuation application of PCT application No. PCT/CN2020/142293, filed on Dec. 31, 2020, and the content of which is incorporated herein by reference in its entirety.

COPYRIGHT NOTICE

TECHNICAL FIELD

The present disclosure relates to the field of gimbal stabilization technologies, and in particular to a gimbal, a leveling method and a control method thereof, a leveling motor and a gimbal assembly.

BACKGROUND

At present, a load, such as a camera or a mobile phone, can be installed on a gimbal to achieve stabilization and attitude adjustment without the load. When the load installed on the gimbal is not well-balanced or the balance is poor, it may cause a motor of the gimbal to continue to output force; as a result, the motor becomes hot, the power consumption increases, the battery life is shortened, and the stabilization performance is reduced. This may affect the control accuracy of the gimbal, and the reliability and service life of the gimbal may be reduced. Moreover, in the case where a user manually performs balancing, it usually needs repeated testing and repeated balancing, which may affect the experience and the accuracy may be poor.

SUMMARY

Embodiments of the present disclosure provide a gimbal, a leveling method and a control method thereof, a leveling motor and a gimbal assembly (the leveling herein refers to balancing a gimbal or a gimbal assembly so that the gimbal or gimbal assembly is balanced and thus leveled).

Some exemplary embodiment of the present disclosure provide a balancing method for a gimbal, and the balancing method includes: controlling a driving motor to rotate and obtaining a first electric signal parameter of the driving motor, wherein the gimbal includes at least one rotation assembly and a balancing motor, the at least one rotation assembly each includes a gimbal component, a transmission mechanism, and the driving motor, the driving motor is configured to drive the gimbal component to rotate so as to adjust an attitude of the gimbal, the balancing motor each is configured to drive, via the transmission mechanism, at least part of the gimbal component to move so as to adjusting a center of gravity of the gimbal; and controlling the balancing motor to operate based on the first electric signal parameter of the driving motor so as to enable the gimbal to be in a balanced state in a direction adjusted by the balancing motor.

Some exemplary embodiment of the present disclosure provide a gimbal, including: a rotation assembly including a gimbal component, a transmission mechanism and a driving motor configured to drive the gimbal component to rotate so as to adjust an attitude of the gimbal; a balancing motor configured to drive, via the transmission mechanism, at least part of the gimbal component to move so as to adjust a center of gravity of the gimbal; and a controller configured to: control the driving motor to rotate and obtain a first electrical signal parameter of the driving motor, and control the balancing motor to operate based on the first electric signal parameter of the driving motor so as to enable the gimbal to be in a balanced state in a direction adjusted by the balancing motor.

According to some exemplary embodiments of the present disclosure, by adjusting the center of gravity of the gimbal with a balancing motor and adjusting the attitude of the gimbal with a driving motor, the gimbal may automatically adjust its balance during a moving process, so that manual adjustment is not required, which results in convenient operation and can improve the accuracy. Moreover, the transmission mechanism is detachably connected to the balancing motor. In this way, after the balancing motor completes the balancing operation of the gimbal, the balancing motor and cables can be removed from the gimbal. It prevents the cables from winding the gimbal when the gimbal is in operation or storage, avoiding unnecessary damage to the gimbal, the balancing motor, or the cables.

Some additional aspects and advantages of the present disclosure will be set forth in the description which follows, and some of them will be apparent based on the description, or may be learned by practice of the present disclosure.

BRIEF DESCRIPTION OF THE DRAWINGS

The above and/or additional aspects and advantages of the present disclosure will become apparent and understandable based on the description of some exemplary embodiments in conjunction with the following drawings. In the drawings:

FIG. 19 is a flow chart of a balancing method of a gimbal according to some exemplary embodiments of the present disclosure.

Figure 1:
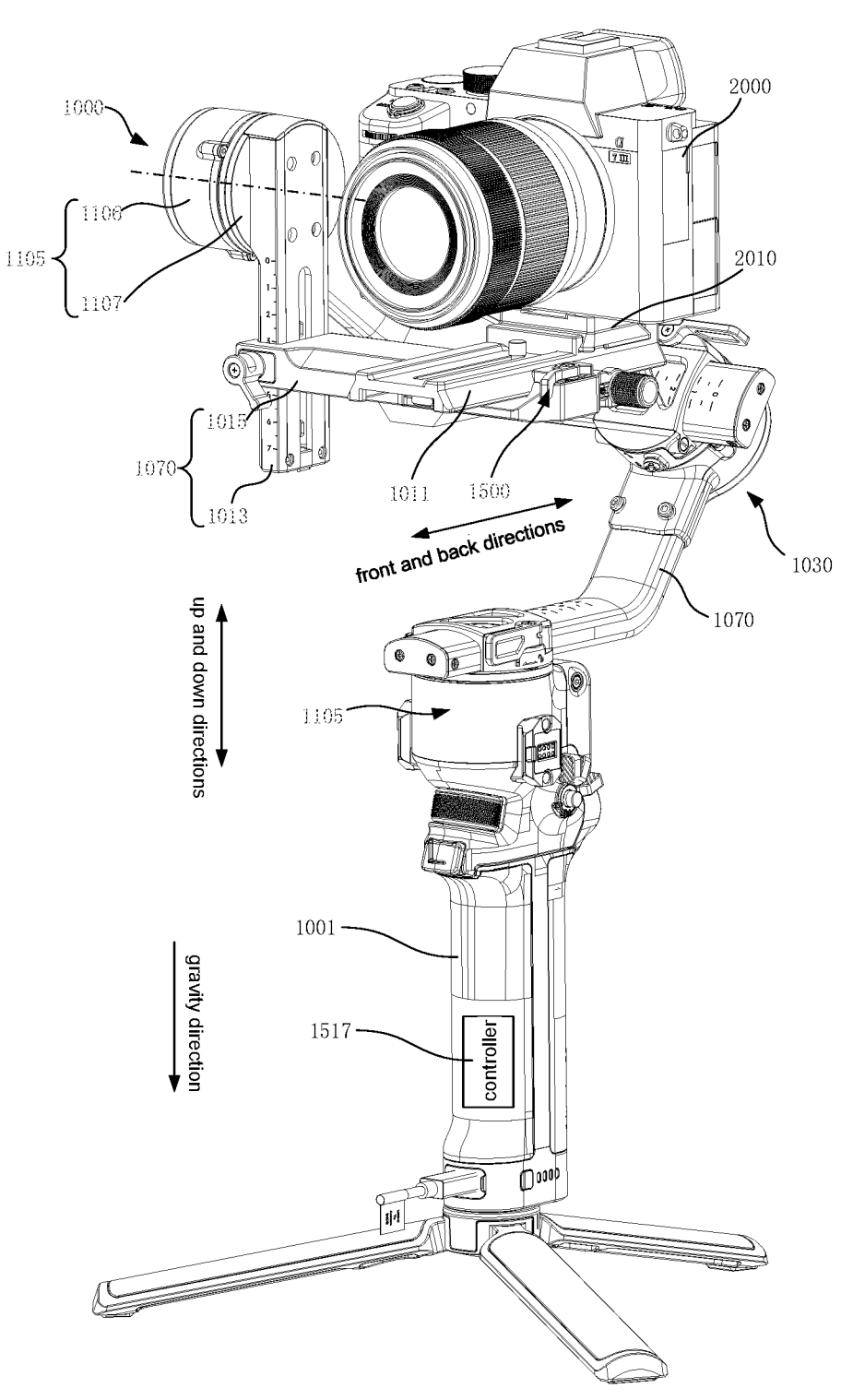
FIG. 1 is a perspective schematic view of a gimbal according to some exemplary embodiments of the present disclosure.

DESCRIPTION OF MAIN ELEMENTS IN THE DRAWINGS gimbal 1000, support mechanism 1001, load fixing plate 1011, load 2000; rotation assembly 1100, gimbal component 1101, transmission mechanism 1103, driving motor 1105; pitch axis assembly 1010, vertical arm 1013, cross arm 1015, roll axis assembly 1030, yaw axis assembly 1050, and axis arm 1070.

DETAILED DESCRIPTION

Some exemplary embodiments of the present disclosure will be described in detail below. The exemplary embodiments are described with reference to the accompanying drawings, in which the same or similar reference numerals represent the same or similar elements or elements with the same or similar functions. The exemplary embodiments described below by referring to the figures are exemplary, are only for explaining the present disclosure; they should not be construed as limiting the present disclosure.

In the description of the present disclosure, the terms "first" and "second" are used for descriptive purposes only, and cannot be understood as indicating or implying relative importance or the quantity of indicated technical features. Thus, a feature defined as "first" or "second" may explicitly or implicitly include one or more of the features. In the description of the present disclosure, "plurality" means two or more, unless otherwise specifically defined.

In the description of the present disclosure, it should be noted that, unless otherwise specified and limited, the terms "mounted to," "connected to" and "connected with" should be understood in a broad sense. For example, they may be fixedly connected, detachably connected, or integrally connected; they may be mechanical connections or electrical connections; they may be direct connections, indirect connections via an intermediary, communications between interiors of two elements or interactions between two elements. A person of ordinary skill in the art can understand the specific meanings of the above terms in the present disclosure according to specific situations.

The following disclosure provides many different exemplary embodiments or examples for realizing different structures of the present disclosure. To simplify the description of this disclosure, the components and arrangements of certain specific examples will be described below. Of course, they are examples only and are not intended to limit this disclosure. Furthermore, this disclosure may repeat reference numerals and/or reference letters in different instances. This repetition is for simplicity and clarity, and does not indicate a relationship between various embodiments and/or arrangements discussed. In addition, this disclosure provides examples of various specific processes and materials. However, a person of ordinary skill in the art can understand the use of other processes and/or the use of other materials.

A gimbal, as a carrier of a load, may be used to adjust an attitude of the load, to stabilize the load, and/or to realize the sensing of the load at different angles. The gimbal may be a hand-held gimbal or an airborne gimbal, such as a gimbal mounted on a movable platform which includes, but is not limited to, an unmanned aerial vehicle (UAV), an unmanned vehicle, and an unmanned ship.

The gimbal may be an orthogonal gimbal or a non-orthogonal gimbal, including, but not limited to, a single-axis gimbal, a two-axis gimbal, a three-axis gimbal, etc., so that the gimbal can rotate around different numbers of rotation axes, to achieve attitude adjustment of the load in one or more directions. For each axis, the gimbal may include a corresponding rotation assembly, and the rotation assembly may include a gimbal component(s) and a driving motor(s). The gimbal component may be connected to a rotation part of the driving motor, so that when the rotation part of the driving motor rotates, the corresponding gimbal component may be driven to rotate around a corresponding rotation axis, thereby realizing the attitude adjustment of the load. In the rotation assembly, the gimbal component may be a one-piece structure or split structures, that is, it may be formed by connecting multiple parts. The shape, size and other parameters thereof may be designed according to actual needs. The driving motor may be a brush motor or a brushless motor.

For example, the gimbal may be a three-axis gimbal. The gimbal may include a yaw axis assembly, a roll axis assembly and a pitch axis assembly connected sequentially. Specifically, the yaw axis assembly may include a yaw axis motor and a yaw axis gimbal component, and the yaw axis motor may be used to drive the yaw axis gimbal component to rotate; the roll axis assembly may include a roll axis motor and a roll axis gimbal component, and the roll axis motor is used to drive the roll axis gimbal component to rotate; the pitch axis assembly may include a pitch axis motor and a pitch axis gimbal component, and the pitch axis motor is used to drive the pitch axis gimbal component to rotate. The yaw axis motor, the yaw axis gimbal component, the roll axis motor, the roll axis gimbal component, the pitch axis motor, the pitch axis gimbal component, and the load may be connected in sequence, in which the pitch axis gimbal component and the load may be directly connected, or may be indirectly connected via an additional connection part.

In this disclosure, the load may include, but is not limited to, a photographing device (such as a camera, a mobile phone, a tablet), a ranging device, a radio device, etc. The load may be removed from the gimbal. Different loads may be loaded on the same gimbal in time-sharing to realize corresponding functions of the loads in different scenarios. According to the actual application scenarios, a user may choose the corresponding load to be carried by the gimbal. Different loads may have different sizes, shapes, masses, etc. Therefore, after a load is mounted on the gimbal, the center of gravity of the gimbal may have a corresponding difference due to the difference in load. In practical applications, the center of gravity of the gimbal is expected to be adjusted so that the corresponding driving motor of the gimbal does not need to overcome the gravity by providing unnecessary torque output, thereby avoiding serious heating of the motor which may affect the service life of the gimbal. The adjustment of the center of gravity of the gimbal is to make the center of gravity of the corresponding parts in the combination of the gimbal and the load fall on a corresponding rotation shaft. For example, in the example of a three-axis gimbal as mentioned above, the center of gravity of the combination of the load and the pitch axis assembly may substantially fall on the pitch axis; the center of gravity of the combination of the load and the pitch axis assembly and the roll axis assembly may substantially fall on the roll axis; the center of gravity of the combination of the load, the pitch axis assembly, the roll axis assembly and the yaw axis assembly may substantially fall on the yaw axis.

In light of the foregoing, the mounting position of the load on the gimbal may be adjusted so that the position of the load relative to the base of the gimbal (which may be the support mechanism mentioned below, a part of the support mechanism, or a part connected to the support mechanism) changes. Specifically, this may be achieved by adjusting the position of the gimbal component relative to the corresponding driving motor, and/or, when the gimbal component is a split structure, by adjusting the positions of the corresponding parts in the gimbal component.

In order to achieve the above position adjustment, a manual locking structure may be provided at a location for position adjustment. In the rotation assembly, with adjusting the position of the gimbal component relative to the corresponding driving motor as an example, the manual locking structure may lock the gimbal component to the rotation part of the driving motor, so that the gimbal component almost does not move relative to the rotation part of the driving motor. In addition, after manual unlocking by the user, the gimbal component may be unlocked from the rotation part of the driving motor, so that the gimbal component may move relative to the rotation part of the driving motor. In this way, the position of the load may be changed to achieve the purpose of adjusting the gimbal's center of gravity (that is, balancing). Moreover, after the gimbal is in a balanced state in the corresponding adjustment direction, the gimbal component may be manually locked to the rotation part of the driving motor. The adjustment direction is the moving direction of the gimbal component or a corresponding part of the gimbal component, which may be a direction perpendicular to the corresponding rotation axis.

As can be seen from the above, in an application scenario of the gimbal, balancing is a very important operation of the gimbal. However, whenever the load is changed, a user may need to balance the gimbal. This not only needs to judge whether the gimbal is in a balanced state in the corresponding adjustment direction, but also needs to make manual adjustment when it is not in a balanced state; especially for a multi-axis gimbal, it needs to be balanced separately in multiple adjustment directions, and the operation is thus cumbersome and inefficient.

As can be seen from the above, in the application scenario of gimbal, balancing is a very important operation for a gimbal. However, every time after the load is changed, the user needs to re-balance the gimbal. The user not only needs to judge whether the gimbal is in a balanced state in a corresponding adjustment direction, but also needs to manually adjust it in an unbalanced state. Especially for a multi-axis gimbal, it is necessary to perform balancing in multiple adjustment directions, which is cumbersome and inefficient.

Therefore, this disclosure provides a gimbal balancing method, which can automatically determine whether a gimbal is in a balanced state in a corresponding adjustment direction, and can automatically balance the gimbal in an unbalanced state, so as to achieve the corresponding intelligent operation, which helps free the user's hands.

With reference to FIGS. 1 to 4, this disclosure provides a balancing method for a gimbal 1000, and the balancing method includes:

Step S110: Control a driving motor 1105 to rotate, and obtain a first electric signal parameter of the driving motor 1105, the gimbal 1000 includes a rotation assembly 1100 and a balancing motor 1300. The rotation assembly 1100 includes a gimbal component 1101, a transmission mechanism 1103, and the driving motor 1105. The driving motor 1105 is configured to drive the gimbal component 1101 to rotate so as to realize an attitude adjustment of the gimbal 1000. The balancing motor 1300 is configured to drive at least a part of the gimbal component 1101 to move via the transmission mechanism 1103, so as to adjust a center of gravity of the gimbal 1000.

Step S120: Control the balancing motor 1300 according to the first electric signal parameter of the driving motor 1105 to enable the gimbal 1000 to be in a balanced state in an adjustment direction of the balancing motor 1300.

According to some exemplary embodiments, the balancing method of this disclosure may be realized by the gimbal 1000 of this disclosure. Specifically, please refer to FIG. 1, the gimbal 1000 is configured to control the rotation of the driving motor 1105, and obtain a first electrical signal parameter(s) of the driving motor 1105; in addition, it is also configured to control the operation of the balancing motor 1300 according to the first electric signal parameter of the driving motor 1105, so that the gimbal 1000 is in a balanced state in a direction adjusted by the balancing motor 1300.

According to the above balancing method, the gimbal 1000 may adjust the center of gravity of the gimbal 1000 via the balancing motor 1300, so that the gimbal 1000 may automatically adjust the balance; thus manual adjustment is not required, the operation is convenient, and the accuracy may be improved. Further, since the first electrical signal parameter is obtained during the rotation of the gimbal 1000 by controlling the rotation of the driving motor 1105, there is no specific requirement for the attitude of the gimbal 1000. In the case where the gimbal 1000 is a hand-held gimbal, the support mechanism 1001 (such as the grip part or the handle) of the gimbal 1000 does not need to be tilted; thus, the user's operation steps are further reduced, for example, step of the user tilting the gimbal 1000 may be removed. Thus, this is conducive to the simple and convenient adjustment of the center of gravity of the gimbal 1000.

Specifically, according to some exemplary embodiments, the balancing motor 1300 may adjust the center of gravity of the gimbal 1000 by driving a part of the gimbal component 1101 to move in translation. The direction adjusted by the balancing motor 1300 refers to the direction in which at least part of the gimbal component 1101 is driven to move as driven by the rotation of an output shaft 1305 of the balancing motor 1300 during the operation of the balancing motor 1300. For example, according to some exemplary embodiments shown in FIG. 1 and FIG. 5, the gimbal 1000 is a three-axis gimbal, which includes three rotation assemblies 1100, which are pitch axis (PITCH) assembly 1010, roll assembly (ROLL) 1030, and yaw axis (YAW) assembly 1050. The roll axis assembly 1030 connects the pitch axis assembly 1010 and the yaw axis assembly 1050. A load 2000 may be mounted on the pitch axis assembly 1010. The directions adjusted by the balancing motor 1300 may include front and back directions, up and down directions, A1-A2 directions and B1-B2 directions. The front and back directions are the directions in which the load 2000 may move. The up and down directions are the directions in which a part of the axis arm 1070 (i.e., the gimbal component 1101) adjusting the movement of the pitch axis assembly 1010, where this is mounted with the load of 2000. The A1-A2 directions are the moving directions of the axis arm 1070 (that is, the gimbal component 1101) of the roll axis assembly 1030. The B1-B2 directions are the moving directions of the axis arm 1070 (i.e., the gimbal component 1101) of the yaw axis assembly 1050. The driving motors 1105 of the roll axis assembly 1030, the pitch axis assembly 1010 and the yaw axis assembly 1050 are used to adjust the attitude of the gimbal 1000. In some exemplary embodiments, the directions A1-A2 may be parallel to the length extension direction of the axis arm 1070 of the roll axis assembly 1030, and the B1-B2 directions may be parallel to the length extension direction of the axis arm 1070 of the yaw axis assembly 1050.

It can be understood that, in some exemplary embodiments, when there are multiple rotating assemblies 1100, the sequence of connecting the multiple rotating assemblies 1100 may include other sequences besides that described above. For example, the pitch axis assembly 1010 may be connected to the roll axis assembly 1030 and the yaw axis assembly 1050, and the load 2000 may be mounted on the roll axis assembly 1030, etc., which are not specifically limited herein.

It should be noted that due to the different types of the load 2000, the structure, shape, and size of the rotation assembly 1100 may be adapted to the load 2000 with certain corresponding changes. For example, when the load 2000 is a camera, for the rotation assembly 1100 with the closest connection distance to the load 2000, its gimbal component 1101 may include, for example, an axis arm 1070 and the load fixing plate 1011. When the load 2000 is a mobile phone, for the rotation assembly 1100 with the closest connection distance to the load 2000, its gimbal component may include, for example, a mobile phone clamp, so that the balancing motor 1300 may drive the mobile phone clamp to move relative to the driving motor 1105. Alternatively, a mobile phone adapter for connecting to a mobile phone may be further included, so that the balancing motor 1300 may drive the mobile phone adapter to move relative to the mobile phone clamp.

Figure 2:
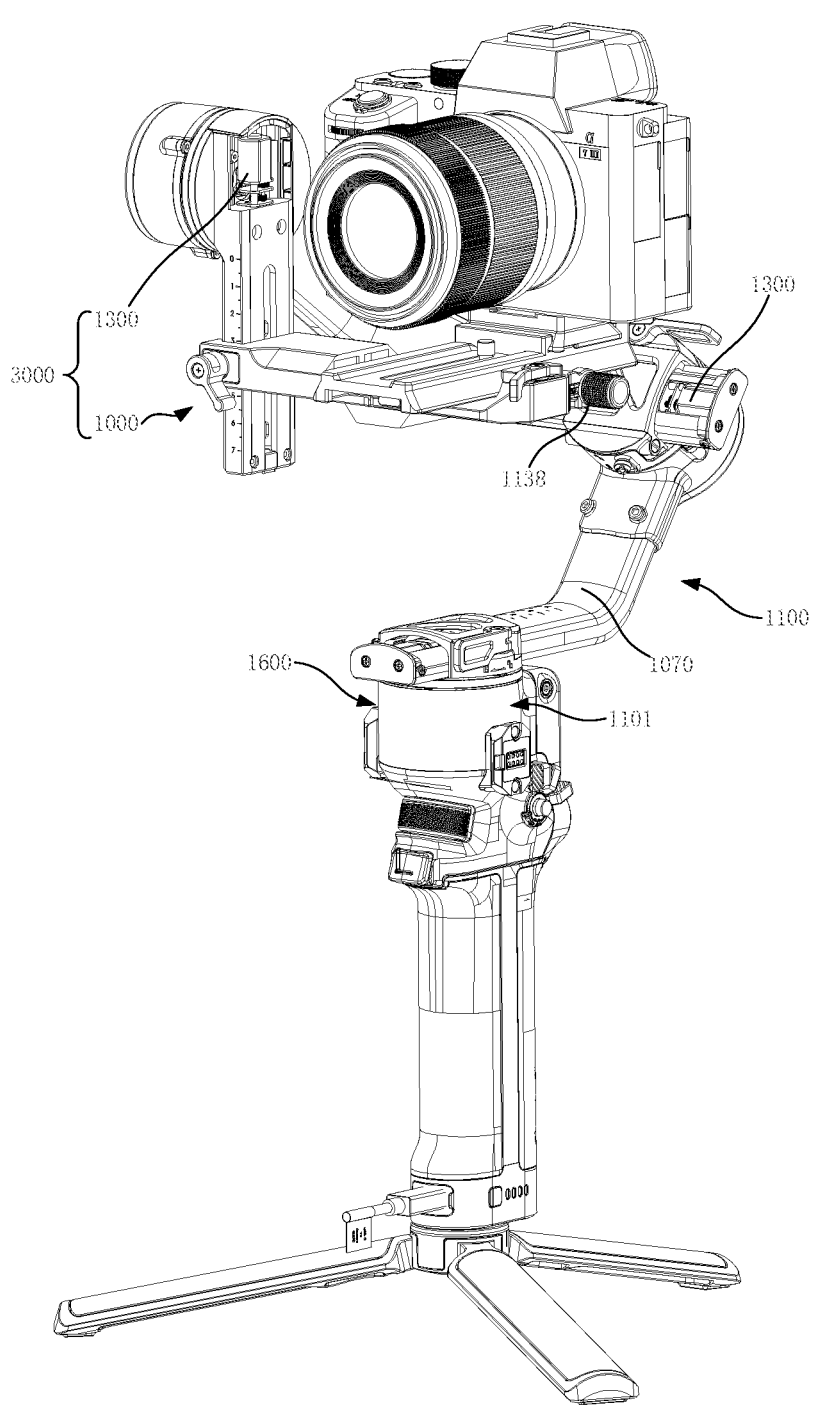
FIG. 2 is a perspective schematic view of a gimbal according to some exemplary embodiments of the present disclosure.
Figure 3:
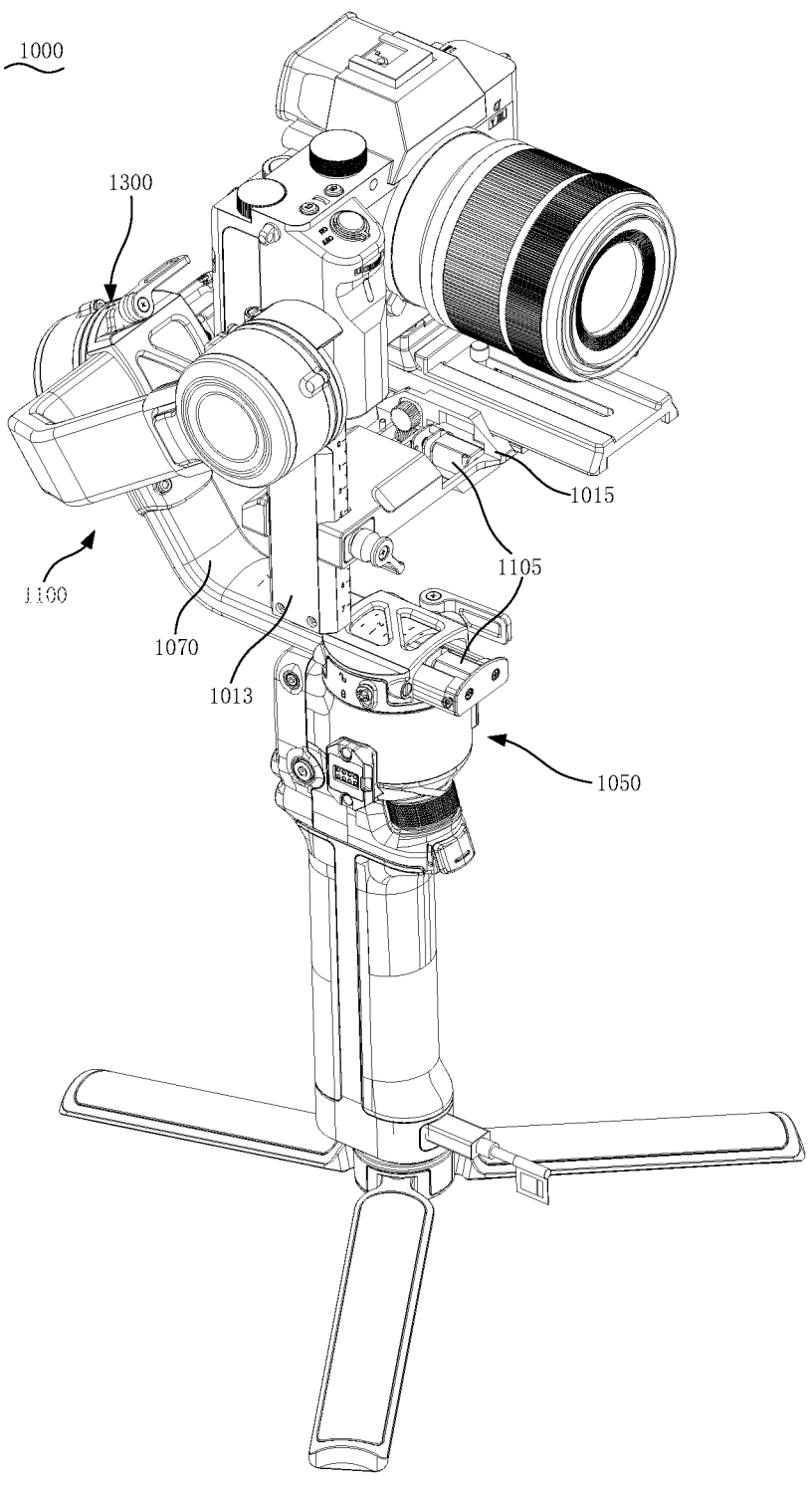
FIG. 3 is a perspective schematic view of a gimbal according to some exemplary embodiments of the present disclosure.
Figure 12:
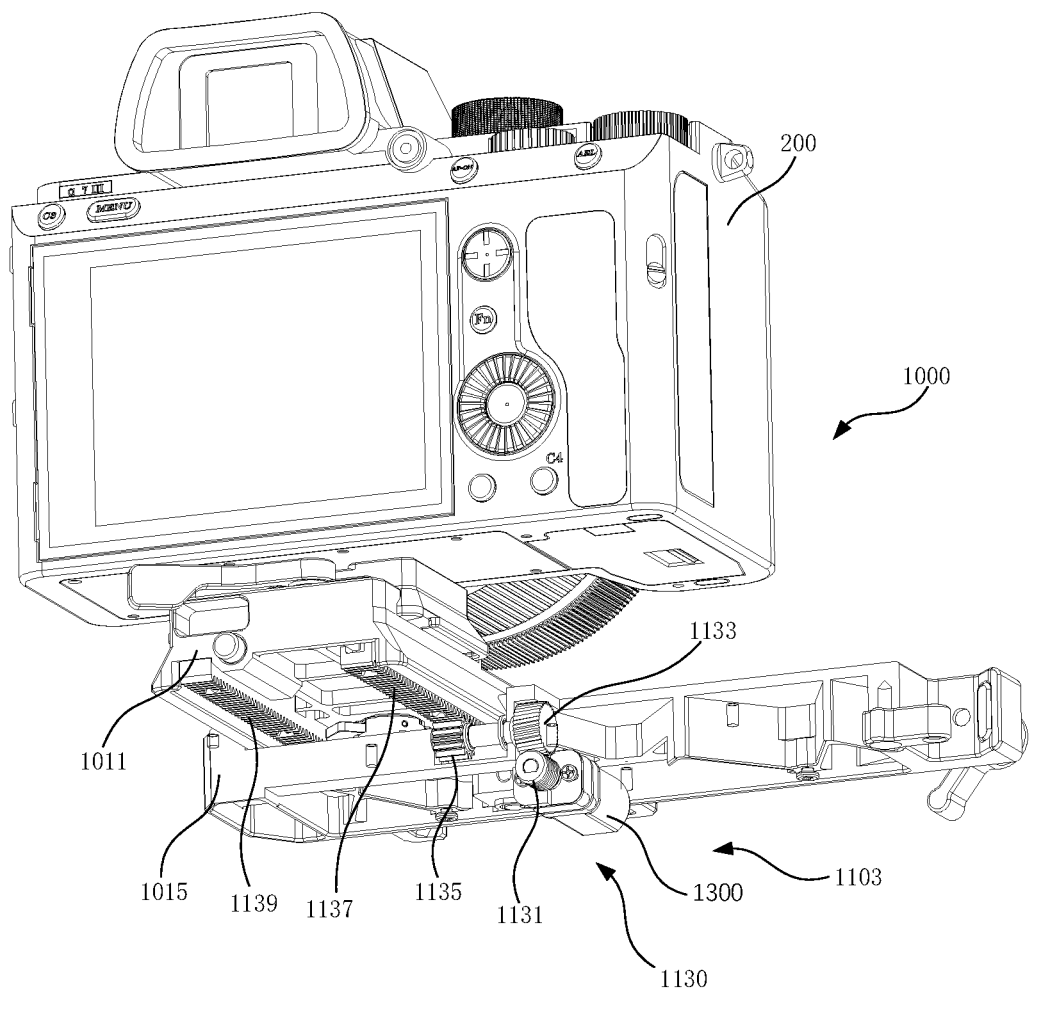
FIG. 12 is a schematic partial structural view of a gimbal according to some exemplary embodiments of the present disclosure.

Specifically, the balancing motor 1300 may drive at least part of the gimbal component 1101 to move. It can be understood that the balancing motor 1300 may drive the movement of the axis arm of a corresponding rotation assembly 1100 and/or the movement of the load fixing plate 1011 (as shown in FIG. 12) on the axis arm for connecting the load 2000. In some exemplary embodiments, for example, the roll axis assembly 1030, the pitch axis assembly 1010 and the yaw axis assembly 1050 shown in FIG. 2 and FIG. 3 are each equipped with a balancing motor 1300. A vertical arm 1013 of the axis arm 1070 of the pitch axis assembly 1010 may be equipped with a balancing motor 1300, a cross arm 1015 of the axis arm 1070 of the pitch axis assembly 1010 may be installed on another balancing motor 1300. The load 2000 may be mounted on the cross arm 1015. The corresponding balancing motor 1300 can drive the cross arm 1015 of the pitch axis assembly 1010 to move up and down relative to the vertical arm 1013 of the pitch axis assembly 1010, drive the load fixing plate 1011 (as shown in FIG. 12) to move forward and backward relative to the cross arm 1015, and drive the axis arms 1070 of the roll axis assembly 1030 and the yaw axis assembly 1050 to move relative to a rotation part (e.g., including the rotor 1106) or a stationary part (e.g., including the stator 1107 of the respective driving motor 1105. According to some exemplary embodiments, at least one of the roll axis assembly 1030, the pitch axis assembly 1010 and the yaw axis assembly 1050 is equipped with a balancing motor 1300. The number of balancing motors 1300 corresponding to each rotation assembly 1100 is not limited to one, and may be other numbers, which nay be configured according to actual conditions.

The gimbal 1000 may include a controller 1517. The controller 1517 may be connected to the driving motor 1105 and the balancing motor 1300, and controls the attitude adjustment and center of gravity adjustment of the gimbal 1000 according to the electrical signal parameters of the two. The location of the controller 1517 is for illustration only. In some exemplary embodiments, the controller 1517 may have different placement positions. For example, it may be arranged on the axis arm 1070 of the pitch axis assembly 1010 of the gimbal 1000, so as to be integrated on the same circuit board with the inertial measurement unit of the gimbal 1000 (used to measure the attitude information of the gimbal 1000). This may reduce the wiring between the inertial measurement unit and the controller 1517, help reduce communication delays, and improve the attitude response speed of the gimbal.

It can be understood that in some exemplary embodiments, the gimbal 1000 may be adjusted for its attitude and center of gravity by a controller that is remote or independent from the gimbal 1000 to the driving motor 1105 and the balancing motor 1300.

In some exemplary embodiments, step S110 may include:
Control the driving motor 1105 to drive at least part of the gimbal component 1101 to rotate according to a fixed rotation amplitude.

The balancing method of this disclosure may be realized by the gimbal 1000 of this disclosure. Specifically, With reference to FIG. 1, the gimbal 1000 may be used to control the driving motor 1105 to drive the gimbal component 1101 to rotate according to a fixed rotation amplitude. Specifically, the controller 1517 of the gimbal 1000 may be used to control the driving motor 1105 to drive the gimbal component 1101 to rotate according to a fixed rotation amplitude, and the rotation amplitude of the driving motor 1105 is also fixed. The rotation amplitude of the driving motor 1105 may have a corresponding mapping relationship with the rotation amplitude of the gimbal component 1101.

In this way, the detection of the first electrical signal parameter of the driving motor 1105 may be facilitated.

Specifically, in some exemplary embodiments, the driving motor 1105 may drive the gimbal component 1101 to rotate with a fixed rotation amplitude, so that the corresponding gimbal component 1101 may swing around a rotation axis with a corresponding range, thus the center of gravity of the gimbal 1000 may be adjusted in the process, and the force received by the driving motor 1105 may change, and correspondingly, the first electrical signal parameter of the driving motor 1105 may also change. In this way, by detecting the first electrical signal parameter of the driving motor 1105, it may be determined whether the gimbal 1000 has reached a balanced state in a corresponding adjustment direction. Exemplarily, reference may be made to FIG. 1 and FIG. 4, when the driving motor 1105 of the pitch axis assembly 1010 rotates with a fixed rotation amplitude, the axis arm 1070 of the pitch axis assembly 1010 (including the vertical arm 1013 and the cross arm 1015) may swing along a rotation axis of the driving motor 1105 of the pitch axis assembly 1010. During a balancing operation (for example, when the load 2000 moves back and forth, or the cross arm 1015 moves up and down), a gravity moment (gravity moment=gravity*arm of force) of the driving motor 1105 of the pitch axis assembly 1010 may change, and the corresponding output (that is, output torque) of the driving motor 1105 may also change. For example, when the gravity moment increases, the driving motor 1105 of the pitch axis assembly 1010 needs to provide a relatively larger force output in order to drive the axis arm 1070 of the pitch axis assembly 1010 to reach a position at the same height (for example, a larger current, voltage or power is required to drive the driving motor 1105). Thus, by detecting the first electric signal parameter of the driving motor 1105, it can be known in which direction to adjust the balance in order to reduce the gravity moment, thereby implementing the balancing operation.

In some exemplary embodiments, the first electrical signal parameter includes an output torque of the driving motor 1105. Step S120 includes:

Step S121: control a balancing motor 1300 to drive at least part of the gimbal component 1101 to move, and control the operation of the balancing motor 1300 according to the change of the torque of the driving motor 1105.

The balancing method of this disclosure may be implemented by the gimbal 1000 of this disclosure. Specifically, referring to FIG. 1, the gimbal 1000 may be configured to control the balancing motor 1300 to drive at least part of the gimbal component 1101 to move, and to control the operation of the balancing motor 1300 according to the change of the torque of the driving motor 1105. Specifically, the controller 1517 of the gimbal 1000 may control the balancing motor 1300 to drive at least part of the gimbal component 1101 to move, and control the operation of the balancing motor 1300 according to the change of the torque of the driving motor 1105. In this way, the gimbal 1000 may achieve a balanced state in the direction adjusted by the balancing motor 1300.

Specifically, in the exemplary embodiments shown in FIGS. 1-3, the gimbal 1000 is a three-axis gimbal, and the number of balancing motors 1300 is four. The controller 1517 of the gimbal 1000 may control the four balancing motors 1300 according to different timings to drive the corresponding gimbal component 1101 to move in different adjustment directions. When the balancing motor 1300 is working, the balance state of the gimbal 1000 may be judged by obtaining the corresponding torque of the driving motor 1105.

In some exemplary embodiments, when the driving motor 1105 is powered on, the output current value of the driving motor 1105 may be considered as equivalent to the output force of the driving motor 1105, that is, equivalent to the output torque of the driving motor 1105. When the gimbal 1000 is not in a balanced state in the direction adjusted by the balancing motor 1300, the output torque of the corresponding driving motor 1105 is relatively large (for example, greater than or equal to a preset torque). When at least part of the gimbal component 1101 (such as the axis arm 1070) is adjusted to move in order to achieve a balanced state of the gimbal 1000 in the direction adjusted by the balancing motor 1300, the corresponding output torque of the driving motor 1105 may be adjusted to be relatively small (for example, less than the preset torque). Therefore, whether the gimbal 1000 is in a balanced state in the direction adjusted by the balancing motor 1300 may be judged by the first electric signal parameter of the driving motor 1105.

In some exemplary embodiments, the output torque of the driving motor 1105 may also be obtained by detecting other values, not limited to the current value. The first electrical signal parameter may be detected and stored by the controller 1517, or detected and stored by a corresponding electronic governor of the driving motor 1105, etc., which are not specifically limited herein.

It should be noted that, in some exemplary embodiments shown in FIG. 1 and FIG. 2, the gimbal 1000 includes a yaw axis assembly 1050. However, when the adjustment direction corresponding to the yaw axis assembly 1050 is adjusted by the above method, it is not necessary to tilt the gimbal 1000 to make the direction of the driving motor 1105 of the yaw axis assembly 1050 not parallel to or not coincide with the direction of gravity. Instead, this method may directly drive the driving motor 1105 of the yaw axis assembly 1050 to rotate, detect the first electrical signal parameter of the driving motor 1105 of the yaw axis assembly 1050, and then use the first electrical signal parameter to perform the corresponding adjustment of the yaw axis assembly 1050 direction for balancing. That is, when balancing the direction corresponding to the yaw axis assembly 1050, even if the gimbal 1000 is placed stationary such as on a table, whether the gimbal 1000 is in a balanced state in the corresponding adjustment direction may be judged or determined based on the output torque of the driving motor 1105 in each rotation assembly 1100. That is to say, in this case, the output torque of the driving motor 1105 is the gravity moment, and when the gravity moment is reduced to close to 0, it may be assumed that the gimbal 1000 is in a balanced state in the corresponding adjustment direction. However, since the direction of the rotation axis corresponding to the yaw axis assembly 1050 is parallel to the direction of gravity, the gravity moment may be 0 because the gimbal 1000 is in an unbalanced state in the direction corresponding to the adjustment of the yaw axis assembly 1050. This makes it impossible to judge whether the gimbal 1000 is indeed in an unbalanced state in the direction of adjustment corresponding to the yaw axis assembly 1050, or it has reached a balanced state. Thus, the gimbal 1000 needs to be tilted. For example, the support mechanism 1001 (such as a grip, a handle, or other supports) is made to form a certain angle with respect to the direction of gravity. Yet in the above method of this disclosure, since the gimbal component 1101 in the yaw axis component 1050 rotates with a fixed amplitude, in order to maintain the current rotation, the driving motor 1105 in the yaw axis assembly 1050 needs a large output torque when the moment of inertia is large, then with a decrease in the moment of inertia, the output torque also decreases accordingly. In addition, the moment of inertia of the driving motor 1105 in the yaw axis assembly 1050 may continue to decrease when the gimbal 1000 approaches a balanced state in the direction corresponding to the adjustment of the yaw axis assembly 1050. Therefore, by determining the magnitude of the output torque, it may be judged whether the gimbal 1000 is in a balanced state in the adjustment direction corresponding to the yaw axis assembly 1050.

In some exemplary embodiments, Step S121 includes:

Step S122: when the torque of the driving motor 1105 increases, control the balancing motor 1300 to drive at least part of the gimbal component 1101 to move in a direction opposing an original moving direction;

Step S123: when the torque of the driving motor 1105 decreases, control the balancing motor 1300 to drive at least part of the gimbal component 1101 to continue moving along the original moving direction;

Step S124: When the torque of the driving motor 1105 is less than a preset torque, control the balancing motor 1300 to stop driving the at least part of the gimbal component 1101 to move, and determine that the gimbal 1000 is in a balanced state in the direction adjusted by the balancing motor 1300.

The balancing method of this disclosure may be implemented by the gimbal 1000 of this disclosure. Specifically, referring to FIG. 1, the gimbal 1000 may be configured to control the balancing motor 1300 to drive at least part of the gimbal component 1101 to move in a direction opposing an original moving direction when the torque of the driving motor 1105 increases, or to control the balancing motor 1300 to drive at least part of the gimbal component 1101 to continue moving in an original moving direction when the torque of the driving motor 1105 decreases, or to control the balancing motor 1300 to stop driving the at least part of the gimbal component 1101 to move when the torque of the driving motor 1105 is less than a preset torque and determine that the gimbal 1000 is in a balanced state in the direction adjusted by the balancing motor 1300. Specifically, the controller 1517 of the gimbal 1000 may be configured to control the balancing motor 1300 to drive at least part of the gimbal component 1101 to move in a direction opposing an original moving direction when the torque of the driving motor 1105 increases, or control the balancing motor 1300 to drive at least part of the gimbal component 1101 to continue moving in an original moving direction when the torque of the driving motor 1105 decreases, or to control the balancing motor 1300 to stop driving the at least part of the gimbal component 1101 to move when the torque of the driving motor 1105 is less than a preset torque and determine that the gimbal 1000 is in a balanced state in the direction adjusted by the balancing motor 1300.

In this way, the center of gravity of the gimbal 1000 may be adjusted by changing the torque, so that the gimbal 1000 may achieve a balanced state in the direction adjusted by the balancing motor 1300.

It can be understood that in the case where the driving motor 1105 drives the corresponding gimbal component 1101 (such as the axis arm 1070) to rotate around the rotation axis of the driving motor 1105 to perform a balancing operation, when the output torque of the driving motor 1105 increases, it may be determined that the gravity moment on the driving motor 1105 increases, and the axis arm 1070 moves away from a balance position. In such a case, controlling the balancing motor 1300 to drive the axis arm 1070 to move in a direction opposing an original moving direction may make the axis arm 1070 approach the balance position, and may reduce the output torque of the driving motor 1105. When the torque of the driving motor 1105 decreases, it may be determined that the gravity moment on the driving motor 1105 decreases and the axis arm 1070 approaches a balance position, In such a case, controlling the balancing motor 1300 to drive the axis arm 1070 to move in an original moving direction may make the axis arm 1070 continue to approach the balance position.

When the torque of the driving motor 1105 is less than a preset torque, it may be determined that the position of the axis arm 1070 may make the gimbal 1000 in a balanced state in the direction adjusted by the balancing motor 1300. Thus, the balancing motor 1300 may be controlled to stop driving the axis arm 1070 to move, and it can be determined that the gimbal 1000 is in a balanced state in the direction adjusted by the balancing motor 1300.

In some exemplary embodiments, Step S121 includes:

In a process in which the balancing motor 1300 drives at least part of the gimbal component 1101 to move in the same direction, if the output torque of the driving motor 1105 first decreases and then increases, control the balancing motor 1300 to drive the at least part of the gimbal component 1101 to move in a direction opposing the original moving direction, and a moving step size in the opposing direction is smaller than a moving step size in the original moving direction.

The balancing method of this disclosure may be implemented by the gimbal 1000 of this disclosure. Specifically, with reference to FIG. 1, for the gimbal 1000, when the balancing motor 1300 drives at least part of gimbal component 1101 to move in the same direction, if the output torque of the driving motor 1105 first decreases and then increases, the balancing motor 1300 may be controlled to drive the at least part of the gimbal component 1101 in a direction opposite to the original moving direction with a step size smaller than that in the original moving direction. Specifically, when the balancing motor 1300 drives at least part of the gimbal component 1101 to move in the same direction, If the output torque of the driving motor 1105 first decreases and then increases, the controller 1517 of the gimbal 1000 may be configured to control the balancing motor 1300 to drive the at least part of the gimbal component 1101 in a direction opposite to the original moving direction with a step size smaller than that in the original moving direction.

In this way, the at least part of the gimbal component 1101 may move toward a balance position, and repeated back and forth adjustments and finer adjustments may be avoided.

It can be understood that the number of adjustments for the moving step size may include multiple times, The adjustment range of the current moving step size may be greater than the adjustment range of the last moving step size, so that the moving step size decreases as the number of adjustments increases.

In the following, the at least part of gimbal component 1101 is the axis arm 1070 and this is used as an example for further illustration. When the output torque of the driving motor 1105 decreases, it may be determined that the axis arm 1070 moves toward the balance position. When the output torque of the driving motor 1105 increases, it may be determined that the axis arm 1070 moves away from the balance position. When the output torque of the driving motor 1105 first decreases and then increases, it may be determined that the axis arm 1070 crosses the balance position and then moves to the other side of the balance position, so it is necessary to drive the axis arm 1070 to move in a direction opposing the original moving direction, so that the axis arm 1070 may move toward the balance position. The moving step size in the opposing direction may be smaller than the moving step size in the original moving direction, so that the axis arm 1070 may reduce the probability of crossing the balance position again during this process of approaching the balance position so as to reach the balanced state quicker, so that the gimbal 1000 may reach the balanced state in a corresponding adjustment direction.

In some exemplary embodiments, the original moving direction may be the preset direction, which may facilitate controlling the balancing motor 1300. Specifically, the setting of the preset direction may allow the controller 1517 of the gimbal 1000 to directly control the balancing motor 1300 based on the preset direction, which makes the rotation part of the balancing motor 1300 (such as the rotor 1106) rotate in a preset direction. The preset direction may be clockwise, counterclockwise, or a sequential combination of clockwise and counterclockwise. This is not specifically limited herein. When the rotation part of the balancing motor 1300 rotates clockwise, it drives the axis arm 1070 to move. When the rotation part of the balancing motor 1300 rotates counterclockwise, the driving axis arm 1070 moves in a direction opposing the original moving direction.

In some exemplary embodiments, the rotation amplitude of at least part of the gimbal component 1101 may be determined based on the amplitude of the sinusoidal attitude change curve of the gimbal 1000. In this way, the rotation amplitude of the gimbal component 1101 may be easily controlled. Specifically, the controller 1517 of the gimbal 1000 may output a sinusoidal control signal, the gimbal 1000 may further include an electronic governor (not shown); the control signal of the controller 1517 may be input to the electronic governor, and then the electronic governor drives the driving motor 1105 to operate according to the control signal.

It can be understood that the sinusoidal attitude change curve of the gimbal 1000 may be for the rotation assembly 1100 corresponding to the adjustment direction. When there are more than one rotation assembly 1100 corresponding to the adjustment direction, each of them may correspond to a sinusoidal attitude change curve. The amplitude of the sinusoidal attitude change curve may be less than or equal to a preset amplitude threshold. During the rotation of the gimbal 1000, the balancing motor 1300 may drive at least part of the gimbal component 1101 to move. Therefore, when the amplitude of the sinusoidal attitude change curve is small, the rotation range of the gimbal component 1101 may also be small. In this way, it may be possible to avoid interference to the control of the balancing motor 1300 due to the movement of the gimbal component 1101 relative to the driving motor 1105.

In some exemplary embodiments, the first electrical signal parameter may include the moment of inertia of the rotation assembly 1100 corresponding to the rotation axis direction. Step S110 includes:

Step S111: when the rotation axis direction of the rotation assembly 1100 coincides with or is parallel to the gravity direction, control the driving motor 1105 to operate based on a preset excitation signal.

Step S112: Obtain a moment of inertia in the rotation axis direction of the rotation assembly 1100 where the driving motor 1105 is located.

The balancing method of this disclosure may be implemented by the gimbal 1000 of this disclosure. Specifically, with reference to FIG. 1, when the rotation axis direction of the rotation assembly 1100 coincides with or is parallel to the gravity direction, the gimbal 1000 is configured to control the driving motor 1105 to operate based on a preset excitation signal and obtain a moment of inertia corresponding to the rotation axis direction of the rotation assembly 1100 where the driving motor 1105 is located. Specifically, when the rotation axis direction of the rotation assembly

1100 coincides with or is parallel to the gravity direction, the controller 1517 of the gimbal 1000 is configured to control the operation of the driving motor 1105 based on a preset excitation signal, and obtain a moment of inertia in the rotation axis direction of the rotation assembly 1100 where the driving motor 1105 is located.

In this way, when the rotation axis direction of the rotation assembly 1100 coincides with or is parallel to the gravity direction, the gimbal 1000 may reach a balanced state in the corresponding adjustment direction.

Figure 4:
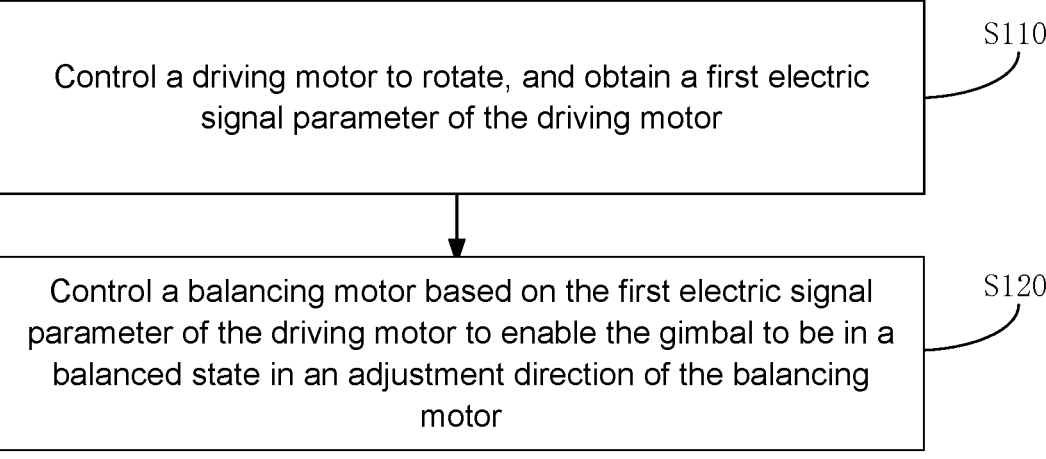
FIG. 4 is a flow chart of a balancing method of a gimbal according to some exemplary embodiments of the present disclosure.

Specifically, during the balancing process of the gimbal 1000, it may be convenient to place the gimbal 1000 still on a support (such as the ground or a table, etc.). As shown in FIG. 4, the gimbal 1000 may include a yaw axis assembly 1050. When the gimbal 1000 is placed on a support, the rotation axis direction of the driving motor 1105 of the yaw axis assembly 1050 coincides with or is parallel to the direction of gravity, and the gravity moment caused by imbalance is zero. When the driving motor 1105 of the yaw axis assembly 1050 rotates, it is impossible to determine, by detecting the output torque of the driving motor 1105 of the yaw axis assembly 1050, whether the gimbal 1000 is in a balanced state in the adjustment direction of the balancing motor 1300 (installed on the axis arm 1070 of the yaw axis assembly 1050), or the determining result may be inaccurate. Therefore, in this case, by controlling the rotation of the driving motor 1105 and detecting the moment of inertia of the yaw axis assembly 1050 in the rotation axis direction, that is, detecting the moment of inertia received by the driving motor 1105 of the yaw axis assembly 1050, it may be determined whether the gimbal 1000 is in a balanced state in the adjustment direction of the balancing motor 1300.

In some exemplary embodiments, Step S120 includes:

Step S125: Control the operation of the balancing motor 1300 according to the change of the moment of inertia, so that the gimbal 1000 is in a balanced state in the adjustment direction of the balancing motor 1300.

The balancing method of this disclosure may be implemented by the gimbal 1000 of this disclosure. Specifically, with reference to FIG. 1, the gimbal 1000 may be configured to control the operation of the balancing motor 1300 based on the change of the moment of inertia, so that the gimbal 1000 may reach a balanced state in the adjustment direction of the balancing motor 1300. Specifically, the controller 1517 of the gimbal 1000 may be configured to control the operation of the balancing motor 1300 based on the change of the moment of inertia, so that the gimbal 1000 may reach a balanced state in the adjustment direction of the balancing motor 1300.

In this way, the adjustment of the balance state of the gimbal 1000 may be realized.

Specifically, Step S125 includes:

Step S126: when the moment of inertia obtained currently decreases compared with the moment of inertia obtained last time (previously), control the output torque of the balancing motor 1300 to remain unchanged.

Step S127: when the moment of inertia obtained currently increases for the first time compared with the moment of inertia obtained (previously), control the balancing motor 1300 to reverse and maintain the output torque of the balancing motor 1300 unchanged.

Step S128: when the moment of inertia obtained currently is increased not for the first time compared with the moment of inertia obtained last time (previously), control the balancing motor 1300 to reverse and reduce the output torque of the balancing motor 1300.

Step S129: when the fluctuation of the moment of inertia is less than a preset fluctuation threshold and the output torque of the balancing motor 1300 is less than a preset torque threshold, control the balancing motor 1300 to stop outputting the torque, and determine that the gimbal 1000 is in a balanced state in the adjustment direction of the balancing motor 1300.

The balancing method of this disclosure may be implemented by the gimbal 1000 of this disclosure. Specifically, with reference to FIG. 1, when the moment of inertia obtained currently decreases compared with the moment of inertia obtained last time, the gimbal 1000 is configured to control the output torque of the balancing motor 1300 unchanged; when the moment of inertia obtained currently increases for the first time compared with the moment of inertia obtained last time, the gimbal 1000 is configured to control the balancing motor 1300 to rotate reversely and control the output torque of the balancing motor 1300 unchanged; when the moment of inertia obtained currently is increased not for the first time compared with the moment of inertia obtained last time, the gimbal 1000 is configured to control the balancing motor 1300 to rotate reversely and reduce the output torque of the balancing motor 1300; when the fluctuation of the moment of inertia is less than a preset fluctuation threshold and the output torque of the balancing motor 1300 is less than a preset torque threshold, the gimbal 1000 is configured to control the balancing motor 1300 to stop outputting the torque, and determine that the gimbal 1000 is in a balanced state in the adjustment direction of the balancing motor 1300. Specifically, the controller 1517 of the gimbal 1000 is configured to control the output torque of the balancing motor 1300 to remain unchanged when the moment of inertia obtained currently decreases compared with the moment of inertia obtained last time; the controller 1517 of the gimbal 1000 is configured to control the balancing motor 1300 to rotate reversely and control the output torque of the balancing motor 1300 to remain unchanged when the moment of inertia obtained currently increases for the first time compared with the moment of inertia obtained last time; the controller 1517 of the gimbal 1000 is configured to control the balancing motor 1300 to rotate reversely and reduce the output torque of the balancing motor 1300 when the moment of inertia obtained currently increases not for the first time compared with the moment of inertia obtained last time; the controller 1517 of the gimbal 1000 is configured to control the balancing motor 1300 to stop outputting the torque and to determine that the gimbal 1000 is in a balanced state in the adjustment direction of the balancing motor 1300 when the fluctuation of the moment of inertia is less than a preset fluctuation threshold and the output torque of the balancing motor 1300 is less than a preset torque threshold.

In this way, the balancing motor 1300 may be controlled based on a change of the moment of inertia so as to adjust the balance state of the gimbal 1000.

Specifically, the acquisition period of the moment of inertia may be set, and the control state of the balancing motor 1300 may be determined according to the comparison of the moment of inertia acquired in a preceding acquisition period with that in a succeeding acquisition period.

In the following, that the at least part of the gimbal component 1101 is the axis arm 1070 of the yaw axis component 1050 is taken as an example for further illustration. In some exemplary embodiments, when the moment of inertia obtained at present is reduced compared with the moment of inertia obtained last time, it may be determined that the axis arm 1070 moves toward the balance position, thus the output torque of the balancing motor 1300 is controlled to remain unchanged, so that the axis arm 1070 may be controlled to continue to move toward the balance position, where the output torque remaining unchanged includes the rotation direction and the output torque of the rotation part of the balancing motor 1300 remain unchanged. In some exemplary embodiments, when the currently obtained moment of inertia increases for the first time compared with the last obtained moment of inertia, it may be determined that the axis arm 1070 moves away from the balance position for the first time, thus the balancing motor 1300 is controlled to rotate reversely and the output torque of the balancing motor 1300 is controlled to remain unchanged, so that the axis arm 1070 moves toward the balance position. In some exemplary embodiments, when the moment of inertia obtained at present is increased not for the first time compared with the moment of inertia obtained last time, it may be determined that the axis arm 1070 continuously moves away from the balance position, thus the balancing motor 1300 is controlled to rotate reversely and the output torque of balancing motor 1300 is reduced so as to make the axis arm 1070 move toward the balance position at a slow speed.

In some exemplary embodiments, when the fluctuation of the moment of inertia is less than a preset fluctuation threshold and the output torque of the balancing motor 1300 is less than a preset torque threshold, it may be determined that the axis arm 1070 is in the balance position. It makes the gimbal 1000 in a balanced state in the adjustment direction of the balancing motor 1300, so that the balancing motor 1300 may be controlled to stop outputting torque, and it may be determined that the gimbal 1000 is in a balanced state in the adjustment direction of the balancing motor 1300. Thus, the balancing motor 1300 stops outputting torque, and the balancing motor 1300 is turned off.

In some exemplary embodiments, the rotation assembly 1100 where the driving motor 1105 is located may include the yaw axis assembly 1050 of the gimbal 1000. In this case, when the balancing operation of the yaw axis assembly 1050 is performed, the gimbal 1000 does not need to be tilted, which is convenient for the user to perform the balancing operation on the gimbal 1000.

In some exemplary embodiments, the excitation signal may be a sinusoidal excitation signal. As such, it is easy to control the driving motor 1105 of the yaw axis assembly 1050. When controlling the driving motor 105 with the excitation signal, if the operation of the balancing motor 1300 is controlled based on the moment of inertia, then when the gimbal 1000 approaches the balance state in the corresponding adjustment direction, the driving motor 1105 may drive the gimbal component 1101 to rotate with increasingly larger rotation amplitude.

With reference to FIG. 1, in some exemplary embodiments, the gimbal 1000 may include at least two rotation assemblies 1100. In addition, an angle between the rotation axis direction of at least one target rotation assembly 1100 and the gravity direction is larger than a preset angle. In this case, the balancing method may also include:

Step S130: when the gimbal 1000 is in a stationary state, obtain a second electrical signal parameter of a target driving motor 1105 of the target rotation assembly 1100.

Step S140: control the operation of the target balancing motor 1300 based on the second electrical signal parameter of the target driving motor 1105, so that the gimbal 1000 is in a balanced state in the adjustment direction of the target balancing motor 1300.

The balancing method of this disclosure may be implemented by the gimbal 1000 of this disclosure. Specifically, with reference to FIG. 1, the gimbal 1000 is configured to obtain a second electrical signal parameter of the target driving motor 1105 of the target rotation assembly 1100 when the gimbal 1000 is in a stationary state, and control the operation of the corresponding target balancing motor 1300 based on the second electrical signal parameter of the target driving motor 1105, so that the gimbal 1000 is in a balanced state in the adjustment direction of the target balancing motor 1300. Specifically, the controller 1517 of the gimbal 1000 is configured to obtain the second electrical signal parameter of the target driving motor 1105 of the target rotation assembly 1100 when the gimbal 1000 is in a stationary state and control the corresponding target balancing motor 1300 to operate based on the second electrical signal parameter of the target driving motor 1105, so as to make the gimbal 1000 in a balanced state in the adjustment direction of the target balancing motor 1300. Since the gimbal 1000 is in a stationary state, the output torque of the target driving motor 1105 is the gravity moment.

In this way, the balance state of gimbal 1000 may be adjusted.

It can be understood that, for the acquisition of the second electrical signal parameters in the above process, since the gimbal 1000 needs to be in a stationary state and the target balancing motor 1300 needs to be controlled, it can be seen intuitively that the gimbal 1000 is in a cycle state of being stationary, moving, stationary, and then moving until the gimbal 1000 is in a balanced state in the adjustment direction of the target balancing motor 1300.

Specifically, in some exemplary embodiments, the gimbal 1000 may be a three-axis gimbal. The rotation assembly 1100 may include a pitch axis assembly 1010, a roll axis assembly 1030, and a yaw axis assembly 1050. The roll axis assembly 1030 is connected to the pitch axis assembly 1010 and the yaw axis assembly 1050, and a load 2000 may be mounted on the pitch axis assembly 1010. The target rotation assembly 1100 may be one of the pitch axis assembly 1010 or the roll axis assembly 1030. In the case where the target rotation assembly 1100 is the pitch axis assembly 1010, the target driving motor 1105 is the driving motor 1105 of the pitch axis assembly 1010, and the target balancing motor 1300 is the balancing motor 1300 installed on the axis arm 1070 of the pitch axis assembly 1010. In the case where the target rotation assembly 1100 is the roll axis assembly 1030, the target driving motor 1105 is the driving motor 1105 of the roll axis assembly 1030, and the target balancing motor 1300 is the balancing motor 1300 installed on the axis arm 1070 of the roll axis assembly 1030. When the load 2000 is mounted on the pitch axis assembly 1010 and is not well-balanced in the corresponding adjustment direction thereof, the corresponding driving motor 1105 may output a large torque to overcome the gravity moment generated by the imbalance. Taking the gimbal 1000 shown in FIG. 4 as an example, if the load 2000 is mounted on the gimbal 1000 and is not well-balanced in the front-rear directions, the driving motor 1105 of the yaw-axis assembly 1050 may output a large torque.

In some exemplary embodiments, the second electrical signal parameter includes a target driving motor 1105 output torque. Step S140 includes:

Step S141: calculate the output torque of the target balancing motor 1300 in real time according to the output torque of the target driving motor 1105.

Step S142: control, according to the output torque of the target balancing motor 1300, the target balancing motor

1300 to drive at least part of the gimbal component 1101 of the target rotation assembly 1100 to move;

Where the output torque of the target driving motor 1105 is positively correlated with the output torque of the target balancing motor 1300.

The balancing method of this disclosure may be implemented by the gimbal 1000 of this disclosure. Specifically, with reference to FIG. 1, the gimbal 1000 is configured to calculate the output torque of the target balancing motor 1300 in real time according to the output torque of the target driving motor 1105, and configured to control the target balancing motor 1300 to drive at least part of the gimbal component 1101 of the target rotation assembly 1100 to move according to the output torque of the target balancing motor 1300, where the output torque of the target driving motor 1105 is positively correlated with the output torque of the target balancing motor 1300. Specifically, the controller 1517 of the gimbal 1000 is configured to calculate the output torque of the target balancing motor 1300 in real time according to the output torque of the target driving motor 1105, and configured to control the target balancing motor 1300 to drive at least part of the gimbal component 1101 of the target rotation assembly 1100 to move according to the output torque of the target balancing motor 1300, where the output torque of the target driving motor 1105 is positively correlated with the output torque of the target balancing motor 1300.

In this way, the operation of the target balancing motor 1300 may be controlled according to the output torque of the target driving motor 1105.

The output torque of the target driving motor 1105 is positively correlated with the output torque of the target balancing motor 1300, which can realize that the target driving motor 1105 drives the moving step size of the target gimbal component 1105 to gradually decrease, so as to achieve fine adjustment and avoid repeated back and forth adjustments. Otherwise, if the output torque of the target driving motor 1105 remains unchanged, the target gimbal component 1105 may pass the balance position, and repeated back and forth adjustments may be needed.

In some exemplary embodiments, the second electrical signal parameter may include a target driving motor 1105 output torque. Step S140 includes:

Step S143: Calculate the moving speed of the target balancing motor 1300 in real time according to the output torque of the target driving motor 1105.

Step S144: control, according to the moving speed of the target balancing motor 1300, the target balancing motor 1300 to drive at least part of the gimbal component 1101 of the target rotation assembly 1100 to move.

Where the output torque of the target driving motor 1105 is positively correlated with the moving speed of the target balancing motor 1300.

The balancing method of this disclosure may be implemented by the gimbal 1000 of this disclosure. Specifically, with reference to FIG. 1, the gimbal 1000 is configured to calculate the moving speed of the target balancing motor 1300 in real time according to the output torque of the target driving motor 1105, and is configured to control the target balancing motor 1300 to drive at least part of the gimbal component 1101 of the target rotation assembly 1100 to move according to the moving speed of the target balancing motor 1300, where the output torque of the target driving motor 1105 is positively correlated with the moving speed of the target balancing motor 1300. Specifically, the controller 1517 of the gimbal 1000 is configured to calculate the moving speed of the target balancing motor 1300 in real time according to the output torque of the target driving motor 1105, and is configured to control the target balancing motor 1300 to drive at least part of the gimbal component 1101 of the target rotation assembly 1100 to move according to the moving speed of the target balancing motor 1300, where the output torque of the target driving motor 1105 is positively correlated with the moving speed of the target balancing motor 1300.

In this way, the operation of the target balancing motor 1300 may be controlled according to the output torque of the target driving motor 1105.

In some exemplary embodiments, the balancing method may further include:

When the target balancing motor 1300 drives the target gimbal component 1101 to move so that the output torque of the target driving motor 1105 is zero, or the number of times the absolute value of the output torque of the target driving motor 1105 is less than a preset threshold reaches a preset number of times, determine that the gimbal 1000 is in a balanced state in the adjustment direction of the target balancing motor 1300.

The balancing method of this disclosure may be implemented by the gimbal 1000 of this disclosure. Specifically, with reference to FIG. 1, The gimbal 1000 is configured to determine that the gimbal 1000 is in a balanced state in the adjustment direction of the target balancing motor 1300, when the target balancing motor 1300 drives the target gimbal component 1101 to move so that the output torque of the target driving motor 1105 is zero, or when the number of times the absolute value of the output torque of the target driving motor 1105 is smaller than a preset threshold reaches a preset number of times. Specifically, the controller 1517 of the gimbal 1000 is configured to determine that the gimbal 1000 is in a balanced state in the adjustment direction of the target balancing motor 1300, when the target balancing motor 1300 drives the target gimbal component 1101 to move so that the output torque of the target driving motor 1105 is zero, or when the number of times the absolute value of the output torque of the target driving motor 1105 is smaller than a preset threshold reaches a preset number of times.

In this way, it may be determined that the gimbal 1000 is in a balanced state in the adjustment direction of the balancing motor 1300.

In the following exemplary embodiments, the target rotation assembly 1100 is the pitch axis assembly 1010 and the at least part of the gimbal component 1101 is the axis arm 1070 of the pitch axis assembly 1010, and the foregoing case is used as an example for further illustration. The balancing method in some exemplary embodiments may be referred to as a torque control mode. Specifically, according to some exemplary embodiments of the torque control mode, the output torque of the driving motor 1105 of the pitch axis assembly 1010 is denoted as $T_m$, and the corresponding output torque of the balancing motor 1300 is denoted as $T_s$.

The controller 1517 of the gimbal 1000 may first control the rotation axis direction of the pitch axis assembly 1010 (the rotation axis direction of the pitch axis assembly 1010 may be configured in such a way as to be coincident with, parallel to, or inclined to the rotation axis direction of the driving motor 1105 of the pitch axis assembly 1010) to be perpendicular to gravity or has a large angle therewith, and the adjustment direction to be perpendicular to the gravity or has a large angle therewith, for example larger than a preset angle. Specifically, this may be achieved by controlling the driving motor 1105 to adjust the attitude of the gimbal 1000, and then keep the attitude of the gimbal 1000 unchanged, or make the gimbal in a stationary state.

The output $T_s$ of the balancing motor 1300 may be calculated based on the output torque $T_m$ of the driving motor 1105. The process of calculating the output torque of the balancing motor 1300 may be seen with reference to the following formula (1):

$$T_s = k_{TP}T_m + k_{TI}\int_0^t T_m d\tau + k_{TD}\frac{d}{dt}T_m \tag{1}$$

In the above formula (1), $k_{TP}$, $k_{TI}$, and $k_{TD}$ are the PID coefficients of the torque control mode, which may be selected according to the specific gimbal 1000 and balancing motor 1300, where $k_{TP}$ is not 0, t is the current time, and $\tau$ is an integral variable. It can be understood that the torque control mode may also be selected as other feedback control algorithms, and is not limited to the PID control algorithm.

It should be noted that in practical applications, the last two items of formula (1) may not be introduced. However, the introduction of the item corresponding to $k_{TI}$ may be used to overcome at least part of the friction force of the gimbal component 1101 during the movement, so as to avoid the issue of insufficient adjustment due to the friction. In addition, the introduction of the item corresponding to $k_{TD}$ may avoid over-adjustment caused by inertia.

When the gimbal 1000 is not in a balanced state in the corresponding adjustment direction, $T_m$ is not zero; as calculated according to formula (1), $T_s$ is also not zero. The balancing motor 1300 has an output, that is, the input torque of the balancing motor 1300 is not zero, so that the load 2000 moves in the direction corresponding to the adjustment of the cross arm 1015, which makes $T_m$ decrease. In the case where $T_m$ decreases to 0, $T_s$ also becomes zero, the balancing motor 1300 stops output (i.e., shut down), and the load 2000 no longer moves (the load 2000 may move relative to the cross arm 1015 via the load fixing plate 1011). In this case, it is considered that the gimbal 1000 realizes automatic balance adjustment in the corresponding adjustment direction of the cross arm 1015. That is to say, when the pitch axis assembly 1010 only corresponds to the above-mentioned adjustment direction, it may be considered that the gimbal 1000 is in a balanced state in the adjustment direction of the balancing motor 1300 on the pitch axis assembly 1010.

As shown in FIG. 1, when the load 2000 deflects backward, the output torque of the driving motor 1105 of the pitch axis assembly 1010 is relatively large; the output torque of the balancing motor 1300 is calculated according to formula (1) to make the load 2000 move forward on the cross arm 1015 via the load fixing plate 1011, the output torque of the driving motor 1105 of the pitch axis assembly 1010 decreases until zero, the balancing motor 1300 stops output (i.e., shut down), and the load 2000 no longer moves via load fixing plate 1011. in this case, it is considered that the gimbal 1000 realizes the automatic balance adjustment in the adjustment direction of the cross arm 1015.

In the following exemplary embodiments, the target rotation assembly 1100 is the pitch axis assembly 1010 and the at least part of the gimbal component 1101 is the axis arm 1070 of the pitch axis assembly 1010, and the foregoing case is used as an example for further illustration. The balancing method in some exemplary embodiments may be referred to as a speed control mode. Specifically, in me exemplary embodiments of the speed control mode, the output torque of the driving motor 1105 of the pitch axis assembly 1010 is denoted as $T_m$, and the corresponding moving speed of the balancing motor 1300 is recorded as $V_s$.

The controller 1517 of the gimbal 1000 may first control the rotation axis direction of the pitch axis assembly 1010 (the rotation axis direction of the pitch axis assembly 1010 may be configured in such a way as to be coincident with, parallel to, or inclined to the rotation axis direction of the driving motor 1105 of the pitch axis assembly 1010) to be perpendicular to gravity or has a large angle therewith, and the adjustment direction to be perpendicular to the gravity or has a large angle therewith, for example larger than a preset angle. Specifically, it may be realized by controlling the driving motor 1105 to adjust the attitude of the gimbal 1000, then keep the attitude of gimbal 1000 unchanged, or make the gimbal in a stationary state.

The moving speed $V_s$ of the balancing motor 1300 may be calculated based on the output torque $T_m$ of the driving motor. The process of calculating the moving speed of the balancing motor 1300 may be seen with reference to the following formula (2):

$$V_s = k_{VP}T_m + k_{VI}\int_0^t T_m d\tau + k_{VD}\frac{d}{dt}T_m \qquad (2)$$

In the formula (2), $k_{VP}$, $k_{VI}$ and $k_{VD}$ are the PID coefficients of the speed control mode, which may be selected according to the specific gimbal 1000 and balancing motor 1300, where $k_{VP}$ is not 0, t is the current time, and $\tau$ is an integral variable. It can be understood that the speed control mode may also be selected as other feedback control algorithms, and is not limited to the PID control algorithm.

It should be noted that in practical applications, the last two items of formula (1) may not be introduced. However, the introduction of the item corresponding to $k_{VI}$ may be used to overcome at least part of the friction force of the gimbal component 1101 during the movement, so as to avoid the issue of insufficient adjustment due to the friction. In addition, the introduction of the item corresponding to $k_{VP}$ may avoid over-adjustment caused by inertia.

In the case where the gimbal 1000 is not in a balanced state in the corresponding adjustment direction, $T_m$ is not zero, and the calculated $V_s$ based on the formula (2) is also not zero; thus the balancing motor 1300 drives the load 2000 to move in the adjustment direction of the cross arm 1015, so that $T_m$ decreases; when $T_m$ decreases to 0, $V_s$ also becomes zero, thus the balancing motor 1300 stops output (i.e., shut down), the load 2000 no longer moves (the load 2000 may move relative to the cross arm 1015 via the load fixing plate 1011). In this case, it may be considered that the gimbal 1000 realizes automatic balancing adjustment in the corresponding adjustment direction of the cross arm 1015. That is to say, when the pitch axis assembly 1010 only corresponds to the above-mentioned adjustment direction, it can be considered that the gimbal 1000 is in a balanced state in the adjustment direction of the balancing motor 1300 on the pitch axis assembly 1010.

In some exemplary embodiments, a preset threshold $T_{m\_thr}$ may be provided. When the number of times when the absolute value of the input torque of the target driving motor 1105 meets $|T_m| < T_{m\_thr}$ reaches a preset number of times, it may be determined that the gimbal 1000 is in a balanced state in the adjustment direction of the target balancing motor 1300. The preset threshold and the preset number of times may be set according to specific situations, and are not specifically limited herein.

In some exemplary embodiments, the target rotation assembly 1100 may include a roll axis assembly 1030 and/or a pitch axis assembly 1010 of the gimbal 1000. Specifically, in some exemplary embodiments, the target rotation assembly 1100 includes the roll axis assembly 1030 of the gimbal 1000. In some exemplary embodiments, the target rotation assembly 1100 includes the pitch axis assembly 1010 of gimbal 1000. In some exemplary embodiments, the target rotation assembly 1100 includes the roll axis assembly 1030 and the pitch axis assembly 1010 of the gimbal 1000. In this way, different ways of balancing the roll axis assembly 1030 and/or the pitch axis assembly 1010 may be achieved.

In some exemplary embodiments, the balancing method may further include:

When the first electrical signal parameter of the driving motor 1105 indicates that the gimbal 1000 is not in a balanced state in a direction adjusted by the balancing motor 1300, trigger to control the balancing motor 1300 to operate based on the first electrical signal parameter of the driving motor 1105 to enable the gimbal 1000 in a balanced state in the direction adjusted by the balancing motor 1300; and/or, When the second electrical signal parameter of the target driving motor 1105 indicates that the gimbal 1000 is not in a balanced state in the direction adjusted by the target balancing motor 1300, trigger to control the corresponding target balancing motor 1300 to operate based on the second electrical signal parameter of the target driving motor 1105 to enable the gimbal 1000 in a balanced state in the direction adjusted by the target balancing motor 1300.

The balancing method of this disclosure may be implemented by the gimbal 1000 of this disclosure. Specifically, with reference to FIG. 1, the gimbal 1000 may be configured to trigger the execution of controlling the operation of the balancing motor 1300 based on the first electrical signal parameter of the driving motor 1105 when the first electrical signal parameter of the driving motor 1105 indicates that the gimbal 1000 is not in a balanced state in the direction adjusted by the balancing motor 1300, so that the gimbal 1000 is in a balanced state in the direction adjusted by the balancing motor 1300; and/or it may be configured to trigger the execution of controlling the operation of the balancing motor 1300 based on the second electrical signal parameter of the target driving motor 1105 when the second electrical signal parameter of the target driving motor 1105 indicates that the gimbal 1000 is not in a balanced state in the direction adjusted by the target balancing motor 1300, so that the gimbal 1000 is in a balanced state in the direction adjusted by the target balancing motor 1300. Specifically, the controller 1517 of the gimbal 1000 may be configured to trigger the execution of controlling the operation of the balancing motor 1300 based on the first electrical signal parameter of the driving motor 1105 when the first electrical signal parameter of the driving motor 1105 indicates that the gimbal 1000 is not in a balanced state in the direction adjusted by the balancing motor 1300, so that the gimbal 1000 is in a balanced state in the direction adjusted by the balancing motor 1300; and/or it may be configured to trigger the execution of controlling the operation of the balancing motor 1300 based on the second electrical signal parameter of the target driving motor 1105 when the second electrical signal parameter of the target driving motor 1105 indicates that the gimbal 1000 is not in a balanced state in the direction adjusted by the target balancing motor 1300, so that the gimbal 1000 is in a balanced state in the direction adjusted by the target balancing motor 1300.

In this way, it is convenient to automatically adjust the gimbal 1000 to a balanced state with at least one of the first electrical signal parameter and the second electrical signal parameter. In addition, the balancing operation is only triggered when the gimbal 1000 is in an unbalanced state in the corresponding adjustment direction. It is relatively more intelligent and may save computing or control resources.

Specifically, a corresponding threshold(s) may be set, and by comparing the first electric signal parameter with the corresponding threshold, it may be determined that the gimbal 1000 is not in a balanced state in the direction adjusted by the balancing motor 1300. By comparing the second electrical signal parameter with the corresponding threshold, it may be determined that the gimbal 1000 is not in a balanced state in the direction adjusted by the target balancing motor 1300, and the automatic execution of the gimbal 1000 balancing operation may further implemented.

In some exemplary embodiments, the gimbal 1000 may include at least two rotation assemblies 1100. The balancing method may include:

According to a first preset sequence, control the gimbal 1000 to be in a balanced state in the direction adjusted by the balancing motor 1300 corresponding to each rotation assembly 1100.

The balancing method of this disclosure may be implemented by the gimbal 1000 of this disclosure. Specifically, with reference to FIG. 1, the gimbal 1000 may be configured to control the gimbal 1000 to be in a balanced state in the direction adjusted by the balancing motor 1300 corresponding to each rotation assembly 1100 according to a first preset sequence. Specifically, the controller 1517 of the gimbal 1000 may be configured to control the gimbal 1000 to be in a balanced state in the direction adjusted by the balancing motor 1300 corresponding to each rotation assembly 1100 according to a first preset sequence.

In this way, the balancing operation of the gimbal 1000 may be completed relatively quickly.

Specifically, in the case where the gimbal 1000 includes at least two rotation assemblies 1100, when performing a balancing operation on one rotation assembly 1100, it may have a negative impact on another rotation assembly 1100 that has completed its balancing operation. Thus, by setting the first preset sequence, the negative impact on another rotation assembly 1100 that has completed its balancing operation during the balancing operation on the current rotation assembly 1100 may be reduced or avoided. In this way, the entire gimbal 1000 may be quickly adjusted to achieve a balanced state, and repeated balancing operations on the same rotation assembly 1100 may be avoided. The first preset sequence may be determined according to specific circumstances.

In some exemplary embodiments, the balancing method may include:

After completing the balancing operation in the direction adjusted by the balancing motor 1300 corresponding to one rotation assembly 1100, perform the balancing operation in the direction adjusted by the balancing motor 1300 corresponding to the next rotation assembly 1100; or Before the balancing operation in the direction adjusted by the balancing motor 1300 corresponding to one rotation assembly 1100 is completed, perform the balancing operation in the direction adjusted by the balancing motor 1300 corresponding to the next rotation assembly 1100.

The balancing method of this disclosure may be implemented by the gimbal 1000 of this disclosure. Specifically, with reference to FIG. 1, the gimbal 1000 is configured to perform the balancing operation in the direction adjusted by the balancing motor 1300 corresponding to the next rotation assembly 1100 after completing the balancing operation in the direction adjusted by the balancing motor 1300 corresponding to one rotation assembly 1100, or it is configured to perform the balancing operation in the direction adjusted by the balancing motor 1300 corresponding to the next rotation assembly 1100 before the balancing operation in the direction adjusted by the balancing motor 1300 corresponding to one rotation assembly 1100 is completed. Specifically, the controller 1517 of the gimbal 1000 is configured to perform the balancing operation in the direction adjusted by the balancing motor 1300 corresponding to the next rotation assembly 1100 after completing the balancing operation in the direction adjusted by the balancing motor 1300 corresponding to one rotation assembly 1100, or the controller 1517 of the gimbal 1000 is configured to perform the balancing operation in the direction adjusted by the balancing motor 1300 corresponding to the next rotation assembly 1100 before the balancing operation in the direction adjusted by the balancing motor 1300 corresponding to one rotation assembly 1100 is completed.

In this way, the balancing operations of at least two rotation assemblies 1100 may be sequentially performed in different ways.

Specifically, in some exemplary embodiments, after completing the balancing operation in the direction adjusted by the balancing motor 1300 corresponding to one rotation assembly 1100, the balancing operation in the direction adjusted by the balancing motor 1300 corresponding to the next rotation assembly 1100 is then performed. It makes the operation simple and easy. In some exemplary embodiments, before the balancing operation in the direction adjusted by the balancing motor 1300 corresponding to one rotation assembly 1100 is completed, the balancing operation in the direction adjusted by the balancing motor 1300 corresponding to the next rotation assembly 1100 is performed. That is to say, the balancing operations of at least two rotation assemblies 1100 partially overlap in time. In this way, the balancing operations of the balancing motors 1300 corresponding to different rotation assemblies 1100 may be accelerated. For example, assuming that the balancing operations in the directions adjusted by the balancing motors 1300 corresponding to the pitch axis assembly 1010 and the roll axis assembly 1030 each take 5 seconds, then firstly start the balancing operation in the direction adjusted by the balancing motor 1300 corresponding to the pitch axis assembly 1010; after the balancing operation in the direction adjusted by the balancing motor 1300 corresponding to the pitch axis assembly 1010 is performed for 3 seconds, the balancing operation in the direction adjusted by the balancing motor 1300 corresponding to the roll axis assembly 1030 is started.

The time period between the time corresponding to the balancing operation in the direction adjusted by the balancing motor 1300 corresponding to the next rotation assembly 1100 and the time corresponding to balancing operation in the direction adjusted by the balancing motor 1300 corresponding to the current rotation assembly 1100 may be less than or equal to a preset time period.

With reference to FIG. 1, in some exemplary embodiments, the number of rotation assemblies 1100 may be three. The three rotation assemblies 1100 include a first rotation assembly 1100, a second rotation assembly 1100, and a third rotation assembly 1100. The first rotation assembly 1100 is configured to mount the load 2000. The second rotation assembly 1100 is configured to connect the first rotation assembly 1100. The third rotation assembly 1100 is configured to connect the second rotation assembly 1100 and the support mechanism 1001. The first preset sequence may includes the sequence of the first rotation assembly 1100, the second rotation assembly 1100, and then the third rotation assembly 1100. In this way, the three rotation assemblies 1100 may be used to perform the balancing operations in sequence.

Specifically, the first preset sequence may be equivalent to performing balancing operations for the first rotation assembly 1100, then the second rotation assembly 1100, and then the third rotation assembly 1100, starting from the load 2000 in a sequence of from inside to outside of the gimbal 1000. When specifically setting the first preset sequence, what needs to be considered is which rotation assembly 1100 to be adjusted has a greater influence on the center of gravity of the gimbal 1000. The first rotation assembly 1100 is used to mount the load 2000. The position of the load 2000, the axis arm 1070 or other parts of the first rotation assembly 1100 may greatly affect the center of gravity of the gimbal 1000. The second one would be the position of the axis arm 1070 or other parts of the second rotation assembly 1100. The third one would be the position of the axis arm 1070 or other parts of the third rotation assembly 1100. Therefore, the first preset sequence may be determined according to the sequence mentioned above, which may minimize or avoid the negative impact on another rotation assembly 1100 that has completed its balancing operation during the balancing operation on the current rotation assembly 1100. In this way, the entire gimbal 1000 may be quickly adjusted to achieve a balanced state.

In some exemplary embodiments, the first rotation assembly 1100 may be one of the pitch axis assembly 1010 and the roll axis assembly 1030 of the gimbal 1000. The second rotation assembly 1100 may be the other one of the pitch axis assembly 1010 and the roll axis assembly 1030 of the gimbal 1000. The third rotation assembly 1100 may be the yaw axis assembly 1050 of the gimbal 1000. As shown in FIG. 1, the first rotation assembly 1100 is the pitch axis assembly 1010, the second rotation assembly 1100 is the roll axis assembly 1030, and the third rotation assembly 1100 is the yaw axis assembly 1050. According to the first preset sequence, the gimbal 1000 controls the balancing motor 1300 of the first rotation assembly 1100 to perform the balancing operation, then controls the balancing motor 1300 of the second rotation assembly 1100 to perform the balancing operation, and then controls the balancing motor 1300 of the third rotation assembly 1100 to perform the balancing operation.

In some exemplary embodiments, the first rotation assembly 1100 may be the roll axis assembly 1030, the second rotation assembly 1100 may be the pitch axis assembly 1010, and the third rotation assembly 1100 may be the yaw axis assembly 1050. The specific implementation principle would be the same as that of the above description, and will not be repeated herein.

With reference to FIG. 1, in some exemplary embodiments, each rotation assembly 1100 may include a locking structure 1500. The locking structure 1500 may be used to lock at least part of the gimbal component 1101 so that the at least part of the gimbal component 1101 may be fixed relative to the rotation part of the driving motor 1105, or may be used to unlock at least part of the gimbal component 1101 to allow the at least part of the gimbal component 1101 to move relative to the rotation part of the driving motor 1105. The locking structure 1500 may lock at least part of the gimbal component 1101 before the start of the balancing operation in the direction adjusted by the balancing motor 1300 corresponding to a rotation assembly 1100. The balancing method may further include:

After completing the balancing operation in the direction adjusted by the balancing motor 1300 corresponding to the rotation assembly 1100, or within a preset time period after the start of the balancing operation in the direction adjusted by the balancing motor 1300 corresponding to the rotation assembly 1100, prompt the user to unlock at least part of the gimbal component 1101 of the next rotation assembly 1100, or control to unlock at least part of the gimbal component 1101 of the next rotation assembly 1100.

The balancing method of this disclosure may be implemented by the gimbal 1000 of this disclosure. Specifically, with reference to FIG. 1, after completing the balancing operation in the direction adjusted by the balancing motor 1300 corresponding to the rotation assembly 1100 or within a preset time period after the start of the balancing operation in the direction adjusted by the balancing motor 1300 corresponding to the rotation assembly 1100, the gimbal 1000 may be configured to prompt the user to unlock at least part of the gimbal component 1101 of the next rotation assembly 1100, or control to unlock at least part of the gimbal component 1101 of the next rotation assembly 1100. Specifically, after completing the balancing operation in the direction adjusted by the balancing motor 1300 corresponding to the rotation assembly 1100 or within a preset time period after the start of the balancing operation in the direction adjusted by the balancing motor 1300 corresponding to the rotation assembly 1100, the controller 1517 of the gimbal 1000 may be configured to prompt the user to unlock at least part of the gimbal component 1101 of the next rotation assembly 1100, or control to unlock at least part of the gimbal component 1101 of the next rotation assembly 1100.

In this way, the next rotation assembly 1100 may be conveniently controlled for balancing operation.

Specifically, in some exemplary embodiments, the locking structure 1500 can be a manual locking structure. After completing the balancing operation in the direction adjusted by the balancing motor 1300 corresponding to one rotation assembly 1100, the user may be prompted to unlock at least part of the gimbal component 1101 of the next rotation assembly 1100. In some exemplary embodiments, within a preset period of time after the start of the balancing operation in the direction adjusted by the balancing motor 1300 corresponding to the rotation assembly 1100, the user may be prompted to unlock at least part of the gimbal component 1101 of the next rotation assembly 1100. The prompt herein may include, but is not limited to, sound and light prompt issued by the gimbal 1000; alternatively, the gimbal 1000 may send the prompt to a preset terminal, and the preset terminal may then issue the prompt, which includes, but is not limited to, sound and light prompt. The preset time period may be set according to specific situations, and is not specifically limited herein. In this way, the user may manually operate the manual locking structure to lock or unlock the at least part of the gimbal component 1101 according to the prompt.

In some exemplary embodiments, the locking structure 1500 may be an automatic locking structure. After completing the balancing operation in the direction adjusted by the balancing motor 1300 corresponding to the rotation assembly 1100, the controller 1517 of the gimbal 1000 may control the automatic locking structure to unlock at least part of the gimbal component 1101 of the next rotation assembly 1100. In some exemplary embodiments, within a preset time period after the start of the balancing operation in the direction adjusted by the balancing motor 1300 corresponding to a rotation assembly 1100, the controller 1517 of the gimbal 1000 may control the automatic locking structure to unlock at least part of the gimbal component 1101 of the next rotation assembly 1100. The preset time period may be set according to specific situations, and is not specifically limited herein.

The at least part of the gimbal component 1101 may be the axis arm 1070 or other parts of the rotation assembly 1100, such as the load fixing plate 1011 on the axis arm 1070, or a load connection part (a clamping part, or a magnetic part), and the like.

In some exemplary embodiments, a trigger condition for executing the balancing operation in the direction adjusted by the balancing motor 1300 corresponding to the next rotation assembly 1100 may include receiving an unlocking instruction for at least part of the gimbal component 1101 corresponding to the next rotation assembly 1100. In this way, a corresponding balancing operation may be performed with the next rotation assembly 1100.

Specifically, when at least part of the gimbal component 1101 is locked (such as the case in which the axis arm 1070 is locked), if the unlocking is not performed first, the balancing motor 1300 may be damaged during its operation. Therefore, the trigger condition for executing the balancing operation in the direction adjusted by the balancing motor 1300 corresponding to the next rotation assembly 1100 may include receiving an unlocking instruction for the at least part of the gimbal component 1101 corresponding to the next rotation assembly 1100, so that the damage may be avoided. This may improve the service life of the balancing motor 1300 and the gimbal 1000. The unlocking instruction may be input by the user in an operation area (such as inputting with keys or touch screens) on the support mechanism 1001 (such as a handle) of the gimbal 1000, or may be input by voice, gesture, or with a preset terminal communicating with the gimbal 1000. It may also be that the gimbal 1000 generate the instruction after a preset condition is satisfied, for example, the previous rotation assembly 1100 is about to complete or has completed the corresponding balancing operation.

With reference to FIG. 2, in some exemplary embodiments, the automatic locking structure may include a motor locking structure 1600. The motor locking structure 1600 may selectively lock or unlock the rotation part of the driving motor 1105 so that the rotation part of the driving motor 1105 may remain fixed or may rotate relative to the fixed part of the driving motor 1105. The balancing method may further include:

> After completing the balancing operation in the direction adjusted by the balancing motor 1300 corresponding to one rotation assembly 1100 and before performing the balancing operation in the direction adjusted by the balancing motor 1300 corresponding to the next rotation assembly 1100, control the motor locking structure 1600 to lock the rotation part of the driving motor 1105 of the rotation assembly 1100 that has completed its balancing operation.

The balancing method of this disclosure may be implemented by the gimbal 1000 of this disclosure. Specifically, with reference to FIG. 1, after completing the balancing operation in the direction adjusted by the balancing motor 1300 corresponding to one rotation assembly 1100 and before performing the balancing operation in the direction adjusted by the balancing motor 1300 corresponding to the next rotation assembly 1100, the gimbal 1000 controls the motor locking structure 1600 to lock the rotation part of the driving motor 1105 of the rotation assembly 1100 that has completed its balancing operation. Specifically, after completing the balancing operation in the direction adjusted by the balancing motor 1300 corresponding to one rotation assembly 1100 and before performing the balancing operation in the direction adjusted by the balancing motor 1300 corresponding to the next rotation assembly 1100, the controller 1517 of the gimbal 1000 controls the motor locking structure 1600 to lock the rotation part of the driving motor 1105 of the rotation assembly 1100 that has completed its balancing operation.

In this way, the rotation part of the driving motor 1105 corresponding to the rotation assembly 1100 that has completed its balancing operation may be fixed. This may avoid relative movement during the process of performing the balancing operation corresponding to the next rotation assembly 1100 which may affect the balancing operation of the next rotation assembly 1100. At the same time, by fixing the rotation part of the driving motor 1105 corresponding to the rotation assembly 1100 that has completed its balancing operation, this may further make the driving motor 1105 corresponding to the rotating part 1100 exert no or less force, so as to save power.

The rotation part of the driving motor 1105 may include a rotor 1106 and the fixed part of the driving motor 1105 may include a stator 1107, and the foregoing case may be taken as an example for further illustration. With reference to FIG. 1, during the balancing operation, it may be necessary to adjust the attitude of the gimbal 1000. Thus, the motor locking structure 1600 may unlock the rotor 1106 of the driving motor 1105, so that the rotor 1106 of the driving motor 1105 may rotate relative to the stator 1107 of the driving motor 1105. During the balancing operation, when there is no need to adjust the attitude of the gimbal 1000, the motor locking structure 1600 may lock the rotor 1106 of the driving motor 1105 so that the rotor 1106 of the driving motor 1105 remains fixed relative to the stator 1107 of the driving motor 1105.

In some exemplary embodiments, the motor locking structure 1600 may include a block and a slot 1605. The block may be arranged on one of the rotation part and the fixed part of the driving motor 1105. The slot 1605 may be arranged on the other of the rotation part and the fixed part of the driving motor 1105. The motor locking structure 1600 may be a manual motor locking structure 1600 or an automatic motor locking structure 1600. The manual motor locking structure 1600 may also include an operation part. The block may be connected to the operation part (such as a button, a sliding part, etc.). The user may drive the block into the slot 1605 or out of the slot 1605 by operating the operation part, so that the rotation part of the driving motor 1105 may remain fixed or may rotate relative to the fixed part of the driving motor 1105. The automatic motor locking structure 1600 may include a drive part, and the drive part is connected to block. The drive part may be used to drive the block into the slot 1605 or out of the slot 1605, so that the rotation part of the driving motor 1105 may remain fixed or may rotate relative to the fixed part of the driving motor 1105. The drive part may be a linear motor, a magnetic valve motor, or an electromagnetic part, etc., and the block may be a pin, etc.

Figure 8:
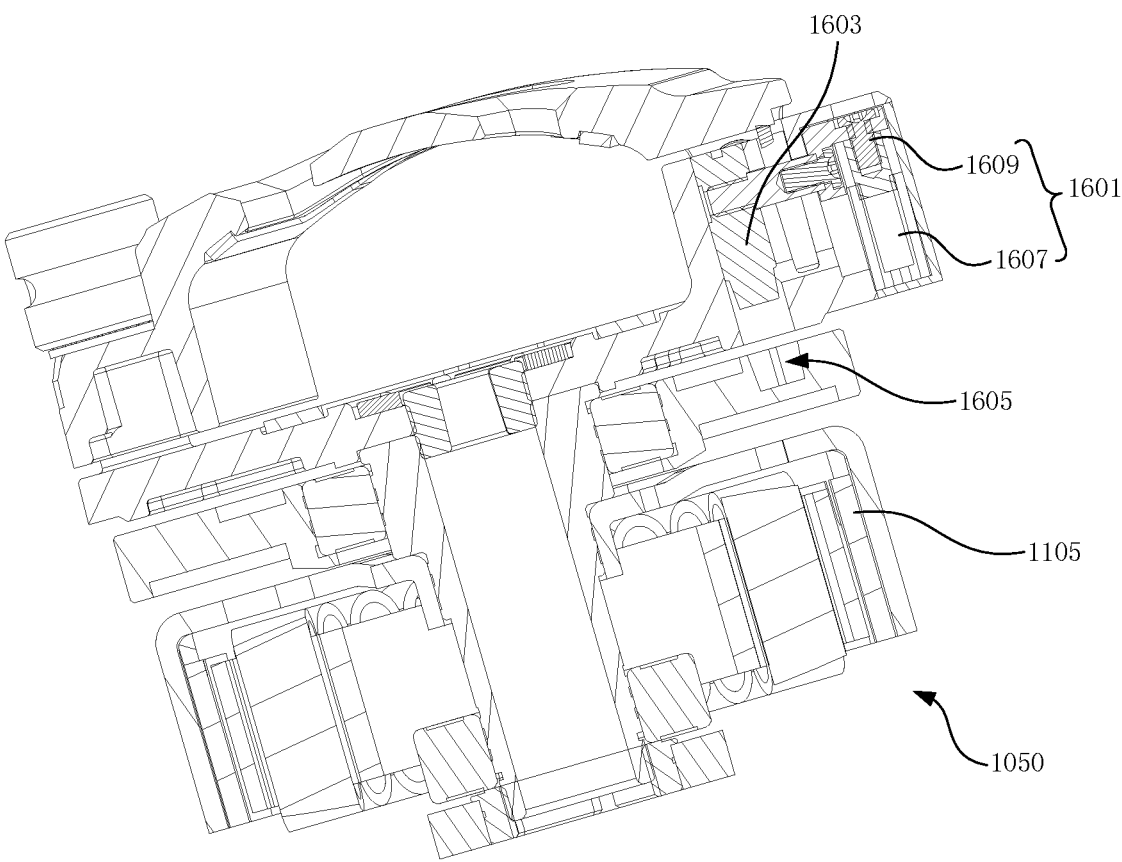
FIG. 8 is a sectional view along an A-A direction of FIG. 7.
Figure 9:
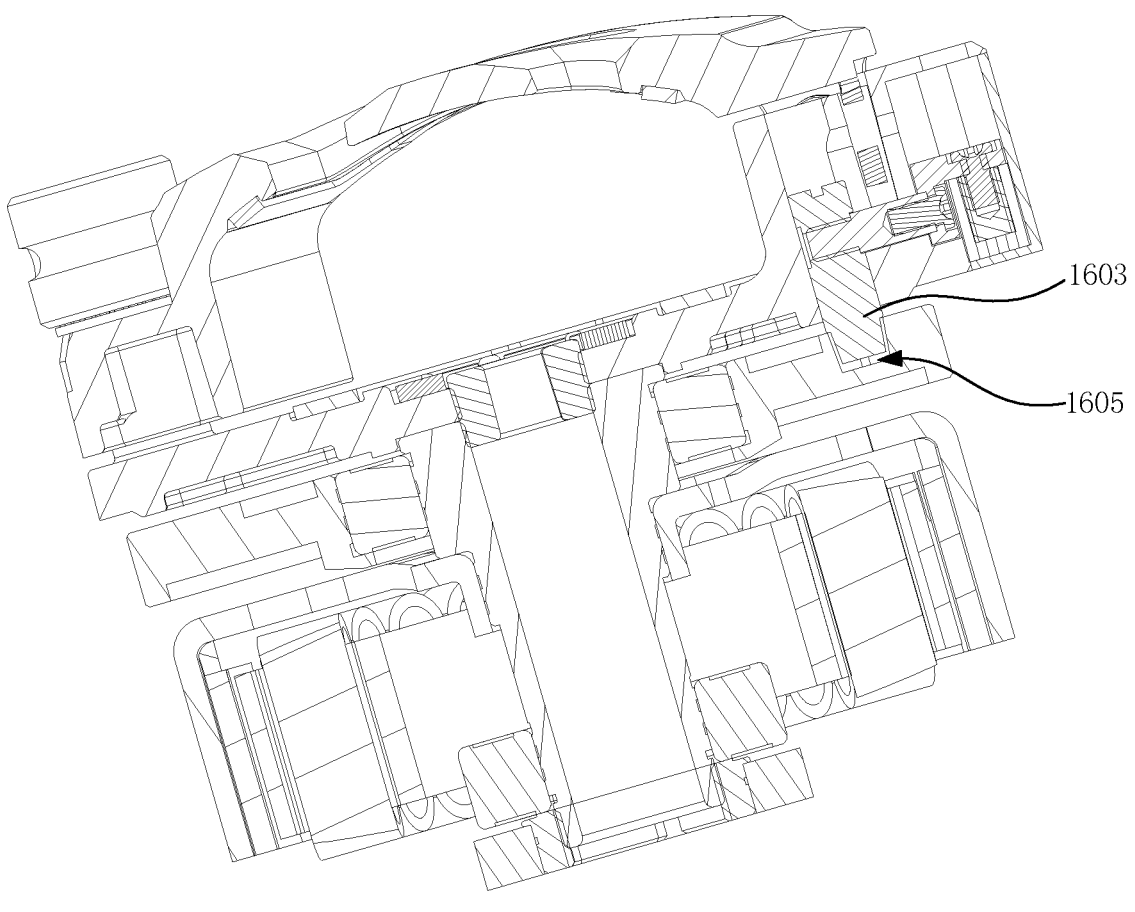
FIG. 9 is a sectional view along an A-A direction of FIG. 7.

Specifically, with reference to FIGS. 6-9, the yaw axis assembly 1050 is taken as an example for further illustration. In some exemplary embodiments, the motor locking structure 1600 is installed on an outer side of the rotation part of the driving motor 1105 of the yaw shaft assembly 1050. The motor locking structure 1600 includes a locking motor 1601 and a motor locking pin 1603. The locking motor 1601 includes a locking motor stator 1107 and a locking part 1609. The slot 1605 is arranged on the fixed part of the driving motor 1105. The locking motor 1601 may drive the locking part 1609 to move by driving the locking motor stator 1107, so that the locking part 1609 drives the motor locking pin 1603 to switch between a position of leaving the slot 1605 and the position of locked in the slot 1605. When the motor locking pin 1603 is out of the slot 1605, the motor locking structure 1600 unlocks the rotation part of the driving motor 1105, as shown in FIG. 8. When the motor locking pin 1603 is locked in the slot 1605, the motor locking structure 1600 locks the rotation part of the driving motor 1105, as shown in FIG. 9. The locking motor 1601 may be a magnetic valve motor.

In some exemplary embodiments, the balancing method may further include:

After completing all the balancing operations in the direction adjusted by the balancing motor 1300 corresponding to the rotation assembly 1100, control the motor locking structure 1600 to unlock the rotation part of the driving motor 1105 of the rotation assembly 1100 that completes its balancing operation.

The balancing method of this disclosure may be implemented by the gimbal 1000 of this disclosure. Specifically, with reference to FIG. 1, after completing all the balancing operations in the direction adjusted by the balancing motor 1300 corresponding to the rotation assembly 1100, the gimbal 1000 controls the motor locking structure 1600 to unlock the rotation part of the driving motor 1105 of the rotation assembly 1100 that completes its balancing operation. Specifically, after completing all the balancing operations in the direction adjusted by the balancing motor 1300 corresponding to the rotation assembly 1100, the controller 1517 of the gimbal 1000 controls the motor locking structure 1600 to unlock the rotation part of the driving motor 1105 of the rotation assembly 1100 that completes its balancing operation.

In this way, it may be convenient to adjust the attitude of the gimbal 1000 during the subsequent operation of the gimbal 1000.

Specifically, after completing all the balancing operations in the direction adjusted by the balancing motor 1300 corresponding to the rotation assembly 1100, the gimbal 1000 is in a usable state. During the use of the gimbal 1000, it may be necessary to adjust the attitude of the gimbal 1000. Therefore, the motor locking structure 1600 may be controlled to unlock the rotation part of the driving motor 1105 of the rotation assembly 1100 that completes the balancing operation. This allows the rotation part of the driving motor 1105 to rotate relative to the fixed part when the attitude of the gimbal 1000 needs to be adjusted. It realizes the adjustment of the attitude of the gimbal 1000, and avoids the driving motor 1105 from being stalled due to the locking of the rotation part, thereby preventing the driving motor 1105 from being damaged.

The rotation part of the driving motor 1105 may be fixed in a plurality of positions relative to the fixed part of driving motor 1105. The plurality of positions may be certain positions that may facilitate the gimbal 1000 to enter a folded state, or certain positions that may keep the load 2000 placed horizontally.

In some exemplary embodiments, after finishing its adjustment operation, the rotation part of the driving motor

1105 of the rotation assembly 1100 may be positioned at a predetermined angle. The predetermined angle may be within a preset working rotation range of the gimbal 1000. In this way, structural interference between the load 2000 and the gimbal 1000 that may result in damage can be avoided. The gimbal 1000 may enter a folded state following power off or sleeping, and the position where the gimbal enters the folded state may be outside the preset working rotation range.

Specifically, the rotation part of the driving motor 1105 may rotate within a certain working rotation range. If the working rotation range is exceeded, it may cause structural interference between the load 2000 and the gimbal 1000, may affect the control performance of the gimbal 1000 on the load 2000, or may cause the control algorithm of the gimbal 1000 to enter a singular state. Therefore, it is possible to prevent the rotation part of the driving motor 1105 from exceeding the preset working rotation range by positioning the rotation part at a preset angle. The preset working rotation range may be set by two soft limits provided on the gimbal 1000 along the rotation axis direction of the driving motor 1105. The soft limits may be within the range of the mechanical limits of gimbal 1000. The mechanical limits may be two limit blocks. For example, two limit blocks may be arranged at an interval on the fixed part of the driving motor 1105, or on the gimbal component 1101 which is fixed relative to the rotation part of the driving motor 1105.

In some exemplary embodiments, when one rotation assembly 1100 corresponds to two adjustment directions, the balancing method may further include:

According to a second preset sequence, control the gimbal 1000 to be in a balanced state in the two adjustment directions corresponding to the rotation assembly 1100 respectively.

The balancing method of this disclosure may be implemented by the gimbal 1000 of this disclosure. Specifically, with reference to FIG. 1, the gimbal 1000 may be configured to control the gimbal 1000 to be in a balanced state in the two adjustment directions corresponding to the rotation assembly 1100 respectively according to a second preset sequence. Specifically, the controller 1517 for gimbal 1000 may be configured to control the gimbal 1000 to be in a balanced state in the two adjustment directions corresponding to the rotation assembly 1100 respectively according to a second preset sequence.

In this way, the balancing operation of the rotation assembly 1100 may be quickly completed, and then the balancing operation of the gimbal 1000 may also be quickly completed.

Specifically, in the case where one rotation assembly 1100 corresponds to two adjustment directions, performing a balancing operation in one adjustment direction may negatively affect the other direction where the balancing operation has been completed. Thus, by setting the second preset sequence, it is possible to reduce or avoid the negative impact on the other adjustment direction that has completed its balancing operation during the balancing operation performed on the currently adjustment direction. In this way, the balancing operation of the rotation assembly 1100 may be completed quickly, and then the entire gimbal 1000 may be in a balanced state quickly. The second preset sequence may be determined according to specific situations.

In some exemplary embodiments, when one rotation assembly 1100 corresponds to two adjustment directions, two balancing motors 1300 may be provided to adjust the two adjustment directions respectively. In some exemplary embodiments, when one rotation assembly 1100 corresponds to two adjustment directions, a balancing motor 1300 may be provided to connect with a corresponding structure in the adjustment direction via a clutch structure, so as to realize the adjustment in the corresponding adjustment direction. That is, the number of balancing motor 1300 may be selected according to specific situations.

With reference to FIG. 1, in some exemplary embodiments, the gimbal component 1101 of the rotation assembly 1100 corresponding to two adjustment directions may include a first part and a second part, and the gimbal includes a load fixing plate 1011. The first part may be connected to the rotation part of the driving motor 1105. The second part may be connected to the first part, and is configured to connect the load fixing plate 1011. The load fixing plate 1011 is configured to mount a load 2000. The first part may move relative to the driving motor 1105, or the second part may move relative to the first part, so that the gimbal 1000 may be in a balanced state in the first adjustment direction. The load fixing plate 1011 may move relative to the second part, so that the gimbal 1000 may be in a balanced state in the second adjustment direction. The second preset sequence may include a sequence from the second adjustment direction to the first adjustment direction.

In this way, the gimbal 1000 may be in a balanced state in the adjustment directions of the balancing motor 1300 of the rotation assembly 1100 according to the second preset sequence.

Specifically, according to the exemplary embodiments shown in FIG. 1, the rotation assembly 1100 corresponding to two adjustment directions is the pitch axis assembly 1010. The first part is the vertical arm 1013 of the pitch axis assembly 1010, and the second part is the cross arm 1015 of the pitch axis assembly 1010. The vertical arm 1013 is connected to the rotation part of the driving motor 1105 of the pitch axis assembly 1010, and the cross arm 1015 is connected to the vertical arm 1013. The load fixing plate 1011 is installed on cross arm 1015. The load fixing plate 1011 is mounted with a load, such as a camera. The first adjustment direction may be the up-down direction, and the second adjustment direction may be the front-back direction. The cross arm 1015 may move up and down relative to the vertical arm 1013, so that the gimbal 1000 is in a balanced state in the adjustment directions of up and down. The load fixing plate 1011 may move back and forth relative to the cross arm 1015, so that the gimbal 1000 is in a balanced state in the front and back directions. The second preset sequence may include a sequence from the directions of front and back to the directions of up and down. Further with reference to FIGS. 2 and 3, corresponding to the two adjustment directions, there are two balancing motors 1300. One of the balancing motors 1300 is installed on the vertical arm 1013, and the other balancing motor 1300 is installed on the cross arm 1015. When adjusting in the front and back directions, the balancing motor 1300 installed on the cross arm 1015 may drive the load fixing plate 1011 to move back and forth, so as to drive the camera to move back and forth to realize the balancing operation in the front and back directions. When adjusting in the up and down directions, the balancing motor 1300 installed on the vertical arm 1013 may drive the cross arm 1015 to move up and down, such that the cross arm 1015 drives the load fixing plate 1011 and the camera to move up and down.

The load fixing plate 1011 and the cross arm 1015 may be detachably connected or fixedly connected. In the case where the load fixing plate 1011 is detachably connected to the cross arm 1015, since the length direction of the load fixing plate 1011 is almost perpendicular to the length direction of the cross arm 1015, when the gimbal 1000 needs to be stored, the load fixing plate 1011 may be removed from the cross arm 1015, thereby reducing the storage space of the gimbal 1000. Furthermore, in some application scenarios, for example, transition shooting, in order to avoid the problem of repeated balancing when the same load 2000 is repeatedly mounted on the gimbal 1000, the load fixing plate 1011 may be connected to the load 2000 via an adapter plate 2010. That is to say, the load fixing plate 1011 may be detachably connected to the adapter plate 2010. Therefore, when the load 2000 needs to be disassembled from the gimbal 1000, the adapter plate 2010 may be disassembled from the load fixing plate 1011. When the load 2000 is remounted on the gimbal 1000, the adapter plate 2010 may be installed on the load fixing plate 1011. Since the position of the load fixing plate 1011 relative to the cross arm 1015 has not changed during this process, and the load 2000 remains the same, there is no need to repeat the balancing operation.

It can be understood that in some exemplary embodiments, the vertical arm 1013 may move relative to the driving motor 1105. That is to say, the balancing motor 1300 may drive the vertical arm 1013 to move in the direction of vertical adjustment, so as to drive the cross arm 1015, the load fixing plate 1011 and the camera to move in the direction of vertical adjustment to perform the balancing operation. In some exemplary embodiments, the first part may be fixedly connected to the second part. For example, the first part and the second part are integrally formed; or the first part and the second part are fixedly connected via a fixing structure (such as screws, buckles, etc.).

In some exemplary embodiments, each rotation assembly 1100 may correspond to one or more adjustment directions, and each adjustment direction may correspond to a locking structure 1500, so that at least part of the gimbal component 1101 may move or remain fixed in the corresponding adjustment direction. In this way, at least part of the gimbal component 1101 may be moved in a correspondingly adjustment direction or held stationary, as desired.

Specifically, when the balancing operation needs to be performed in a corresponding adjustment direction, at least part of the gimbal component 1101 (such as the axis arm 1070) may be unlocked to enable the at least part of the gimbal component 1101 to move in a correspondingly adjustment direction. When no balancing operation is needed in a corresponding adjustment direction, at least part of the gimbal component 1101 (such as the axis arm 1070) may be locked, so that the at least part of the gimbal component 1101 may be kept fixed in the corresponding adjustment direction.

The locking structure 1500 may be a manual locking structure 1500, an automatic locking structure, or a combination of the manual locking structure 1500 and an automatic locking structure. The locking structure 1500 will be described in detail later and thus is not described in this part.

In some exemplary embodiments, the balancing method may further include:

According to a sequence of the adjustment directions, a user may be prompted to unlock the at least part of the gimbal components 1101 corresponding to each adjustment direction, or control to unlock the at least part of the gimbal components 1101 corresponding to each adjustment direction.

The balancing method of this disclosure may be implemented by the gimbal 1000 of this disclosure. Specifically, with reference to FIG. 1, according to a sequence of the adjustment directions, the gimbal 1000 may prompt a user to unlock the at least part of the gimbal components 1101 corresponding to each adjustment direction, or to control to unlock the at least part of the gimbal components 1101 corresponding to each adjustment direction. Specifically, according to a sequence of the adjustment directions, the controller 1517 for gimbal 1000 may prompt a user to unlock the at least part of the gimbal components 1101 corresponding to each adjustment direction, or to control to unlock the at least part of the gimbal components 1101 corresponding to each adjustment direction.

In this way, it may be convenient to control the gimbal component 1101 for the balancing operation in each adjustment direction.

Specifically, in some exemplary embodiments, the locking structure 1500 may be a manual locking structure 150; after the balancing operation in one adjustment direction is completed, the user may be prompted to unlock at least part of the gimbal component 1101 corresponding to the next adjustment direction. The Prompts herein may be, including but not limited to, sound and light prompts issued by the gimbal 1000. Alternatively, the gimbal 1000 may send a prompt to a preset terminal, and then prompts including but not limited to, sound and light prompts may be issued by the terminal. In this way, the user may manually operate the manual locking structure 1500 to lock or unlock the at least part of the gimbal component 1101 according to the prompt.

In some exemplary embodiments, the locking structure 1500 may be an automatic locking structure, and after the balancing operation in one adjustment direction is completed, the controller 1517 of the gimbal 1000 may control the automatic locking structure to unlock at least part of the gimbal component 1101 corresponding to the next adjustment direction.

The At least part of the gimbal 1000 herein may be the axis arm 1070 of the rotation assembly 1100 or other components, such as the load fixing plate 1011 on the axis arm 1070, or the load connection part (a clamping part, or a magnetic part), and the like.

In some exemplary embodiments, a trigger condition for performing the balancing operation in the next adjustment direction may include receiving an unlocking instruction for the gimbal component 1101 corresponding to the next adjustment direction. In this way, the balancing operation of the gimbal component 1101 corresponding to the next adjustment direction may be realized.

Specifically, when at least part of the gimbal component 1101 is locked (such as the case in which the axis arm 1070 is locked), if the unlocking is not performed first, the balancing motor 1300 may be stalled and even damaged during its operation. Therefore, in the case where the trigger condition for performing the balancing operation in the direction of the next adjustment includes receiving an unlocking instruction for the gimbal component 1101 corresponding to the direction of the next adjustment, the above situation can be avoided, thereby improving the service lives of the balancing motor 1300 and the gimbal 1000. The unlocking instruction may be input by the user in an operation area (such as inputting with keys or touch screens) on the support mechanism 1001 (such as a handle) of the gimbal 1000, or may be input by voice, gesture, or with a preset terminal communicating with the gimbal 1000. It may also be that the gimbal 1000 generate the instruction after a preset condition is satisfied, for example, the previous rotation assembly 1100 is about to complete or has completed the corresponding balancing operation.

In some exemplary embodiments, the unlocking instruction may be executed when the unlocking instruction is received. In some exemplary embodiments, the unlocking instruction may be executed in a preset period of time following receiving the unlocking instruction. The preset period of time may be adjusted according to specific situations.

In some exemplary embodiments, the locking structures 1500 corresponding to each adjustment direction may be the same, or the locking structures 1500 corresponding to at least two adjustment directions may be different. In this way, various forms of locking structures 1500 may be realized.

Specifically, in some exemplary embodiments, one rotation assembly 1100 may correspond to two adjustment directions, and the specific structures of the locking structures 1500 corresponding to the two adjustment directions may be the same. In some exemplary embodiments, one rotation assembly 1100 may correspond to two adjustment directions, and the two adjustment directions correspond to the locking structures 1500 with different structures. By unlocking and locking the locking structure 1500, the corresponding rotation assembly 1100 may perform a balancing operation in the corresponding adjustment direction.

Figure 5:
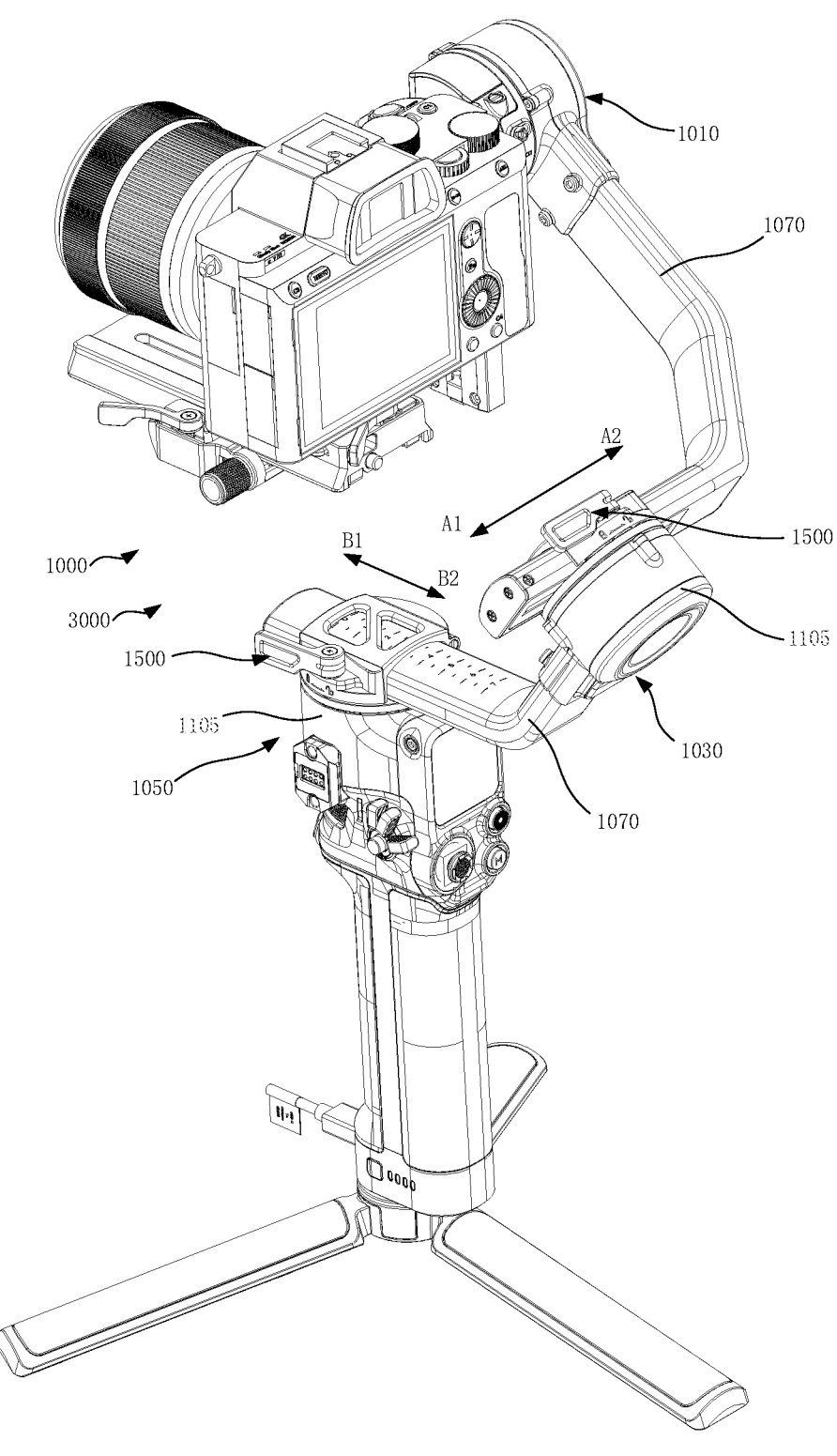
FIG. 5 is a perspective schematic view of a gimbal according to some exemplary embodiments of the present disclosure.
Figure 6:
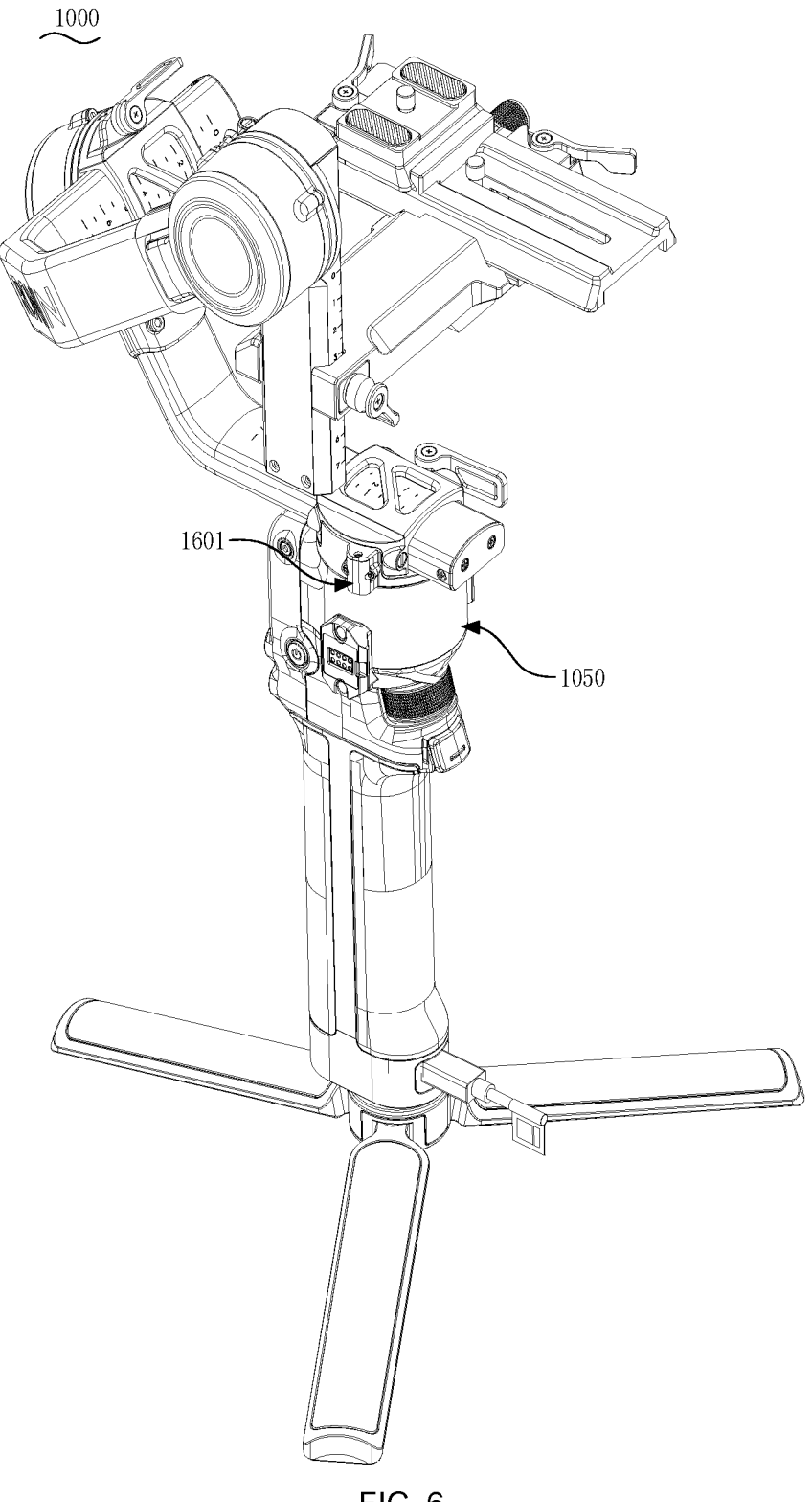
FIG. 6 is a perspective schematic view of a gimbal according to some exemplary embodiments of the present disclosure.
Figure 7:
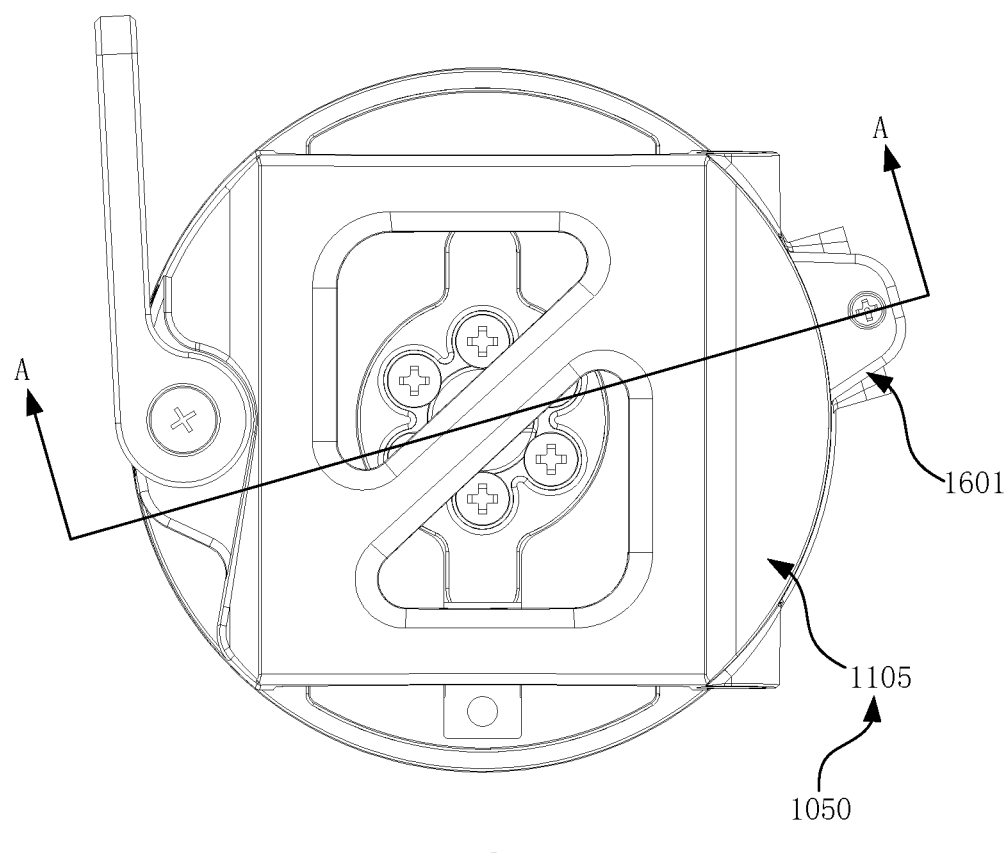
FIG. 7 is a partial structural schematic view of a yaw axis assembly according to some exemplary embodiments of the present disclosure.

In the exemplary embodiments shown in FIG. 1 and FIG. 5, the adjustment directions include the front and back directions, the up and down directions, the A1-A2 direction, and the B1-B2 direction. It can be understood that in some exemplary embodiments, the adjustment directions may include one of the front and back directions, the up and down directions, the A1-A2 direction, and the B1-B2 direction, or a combination of two, or more of these directions, which is not specifically limited herein.

In some exemplary embodiments, the balancing method may further include:

When the gimbal 1000 is in a balanced state in the adjustment direction of the balancing motor 1300, control the gimbal 1000 to send a balancing ending prompt, or control the gimbal 1000 to send a balancing ending prompt to a preset terminal, so that the preset terminal sends a balancing ending prompt.

The balancing method of this disclosure may be implemented by the gimbal 1000 of this disclosure. Specifically, with reference to FIG. 1, the gimbal 1000 may be configured to, when the gimbal 1000 is in a balanced state in the adjustment direction of the balancing motor 1300, control the gimbal 1000 to send a balancing ending prompt, or control the gimbal 1000 to send a balancing ending prompt to a preset terminal, so that the preset terminal sends a balancing ending prompt. Specifically, the controller 1517 for gimbal 1000 may be configured to, when the gimbal 1000 is in a balanced state in the adjustment direction of the balancing motor 1300, control the gimbal 1000 to send a balancing ending prompt, or control the gimbal 1000 to send a balancing ending prompt to a preset terminal, so that the preset terminal sends a balancing ending prompt.

In this way, the user may be prompted about the completion of the balancing operation, which is convenient for the user to further perform other operations with the gimbal 1000.

Specifically, in some exemplary embodiments, the Prompts herein may be, including but not limited to, sound and light prompts issued by the gimbal 1000. Alternatively, the gimbal 1000 may send a prompt to a preset terminal, and then prompts including but not limited to, sound and light prompts may be issued by the terminal. Thus, the user may perform other operations with the gimbal 1000 after receiving the prompt, such as shooting, stabilizing, adjusting attitude, etc. with the gimbal 1000.

Figure 10:
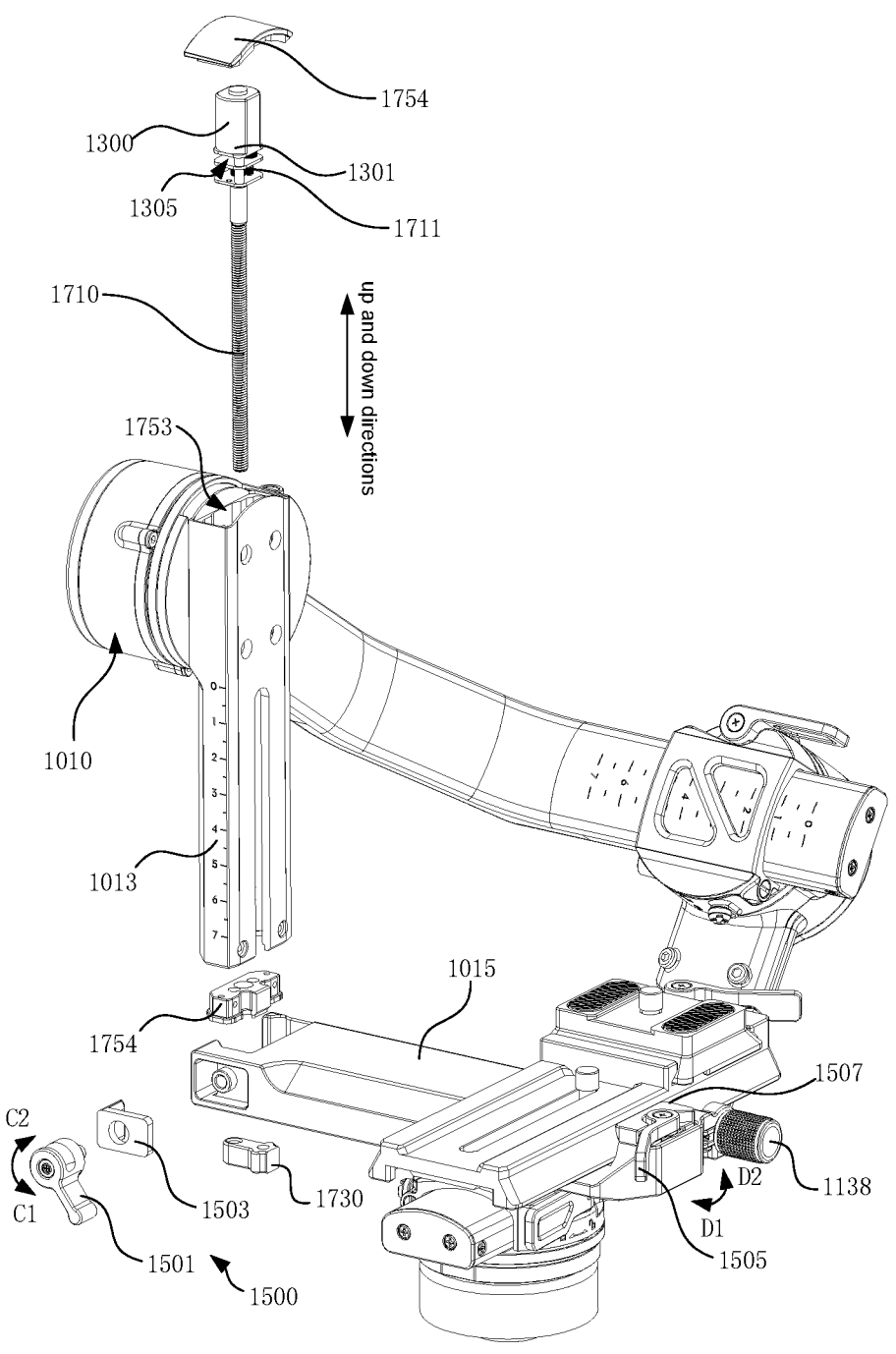
FIG. 10 is an exploded partial structural view of a gimbal according to some exemplary embodiments of the present disclosure.

With reference to FIG. 10, in some exemplary embodiments, the transmission mechanism 1103 may include a screw transmission structure 1700. The balancing motor 1300 is connected to the gimbal component 1101 via a screw transmission structure 1700. In this way, the balancing motor 1300 may drive at least part of the gimbal component 1101 via the screw transmission structure 1700.

Specifically, with reference to FIG. 10, the screw transmission structure 1700 may include a screw rod 1710 and a connection part 1730. The screw rod 1710 is connected to an output shaft 1305 of the balancing motor 1300. The connection part 1730 connects the screw rod 1710 and the gimbal component 1101. In this way, the driving of the gimbal component 1101 can be realized simply.

It can be understood that the screw transmission structure 1700 may have a self-locking function. When the balancing motor 1300 does not drive the at least part of the gimbal component 1101 to move, the at least part of the gimbal component 1101 may be kept fixed in a corresponding adjustment direction.

Specifically, in some exemplary embodiments, the connection part 1730 may be a screw nut. As shown in FIG. 10, the balancing motor 1300 and the screw rod 1710 on the pitch axis assembly 1010 are installed on the vertical arm 1013. The screw rod 1710 is connected to the output shaft 1305 of the balancing motor 1300 via a gear set 1711. The gear set 1711 may amplify the output torque of the balancing motor 1300. The connection part 1730 is fixed on the cross arm 1015, sleeved over the screw rod 1710, and screwed to the screw rod 1710. During a balancing operation in the up and down directions, the output shaft 1305 of the balancing motor 1300 rotates, driving the screw rod 1710 to rotate, the connection part 1730 sleeved over the screw rod 1710 moves along an axial direction of the screw rod 1710, and then drives the cross arm 1015 and components on the cross arm 1015 (including but not limited to the load fixing plate 1011 and the camera) to move up and down. The rotation direction of the output shaft 1305 of the balancing motor 1300 determines whether the cross arm 1015 moves upward or downward. The gear set 1711 may be fixed on the vertical arm 1013 of the pitch axis assembly 1010, so as to realize the installation and fixation of the screw rod 1710.

The balancing motor 1300 and the screw rod 1710 on the roll axis assembly 1030 are installed on the axis arm 1070 of the roll axis assembly 1030. The screw rod 1710 may be directly fixedly connected to the output shaft 1305 of the balancing motor 1300, or may be connected to the output shaft 1305 of the balancing motor 1300 via a gear set 1711. The connection part 1730 is fixed on the rotation part of the driving motor 1105 of the roll axis assembly 1030, sleeved over the screw rod 1710, and screwed to the screw rod 1710. During a balancing operation in the A1-A2 direction, the output shaft 1305 of the balancing motor 1300 rotates, driving the screw rod 1710 to rotate. Since the connection part 1730 is fixed on the rotation part of the driving motor 1105 of the rolling axis assembly 1030, the connection part 1730 does not move but acts against the axis arm 1070 and balancing motor 1300 of the rolling axis assembly 1030, which makes the axis arm 1070 of the roll axis assembly 1030, the balancing motor 1300 and the screw rod 1710 move along the axial direction of the screw rod 1710, thus drives the axis arm 1070 of the roll axis assembly 1030 and the components on it (including but not limited to the pitch axis assembly 1010, the load fixing plate 1011, the camera, etc.) to move along the A1-A2 direction. The rotation direction of the output shaft 1305 of the balancing motor

1300 determines whether the axis arm 1070 of the roll axis assembly 1030 moves in the A1 direction or in the A2 direction.

The balancing motor 1300 and the screw rod 1710 on the yaw axis assembly 1050 are installed on the axis arm 1070 of the yaw axis assembly 1050. The screw rod 1710 may be fixedly connected directly to the output shaft 1305 of the balancing motor 1300. The connection part 1730 is fixed on the rotation part of the driving motor 1105 of the yaw shaft assembly 1050, is sleeved over the screw rod 1710, and is screwed to the screw rod 1710. During a balancing operation in the B1-B2 direction, the output shaft 1305 of the balancing motor 1300 rotates, driving the screw rod 1710 to rotate. Since the connection part 1730 is fixed on the rotation part of the driving motor 1105 of the yaw shaft assembly 1050, the connection part 1730 does not move but acts against the axis arm 1070 and the balancing motor 1300 of the yaw axis assembly 1050, so that the axis arm 1070, the balancing motor 1300 and the screw rod 1710 of the yaw axis assembly 1050 move along the axial direction of the screw rod 1710, which then drive the axis arm 1070 of the yaw axis assembly 1050 and the components on it (including but not limited to the pitch axis assembly 1010, the roll axis assembly 1030, the load fixing plate 1011 and the camera, etc.) to move along the B1-B2 direction. The rotation direction of the output shaft 1305 of the balancing motor 1300 determines whether the axis arm 1070 of the yaw axis assembly 1050 moves in the B1 direction or in the B2 direction.

Figure 11:
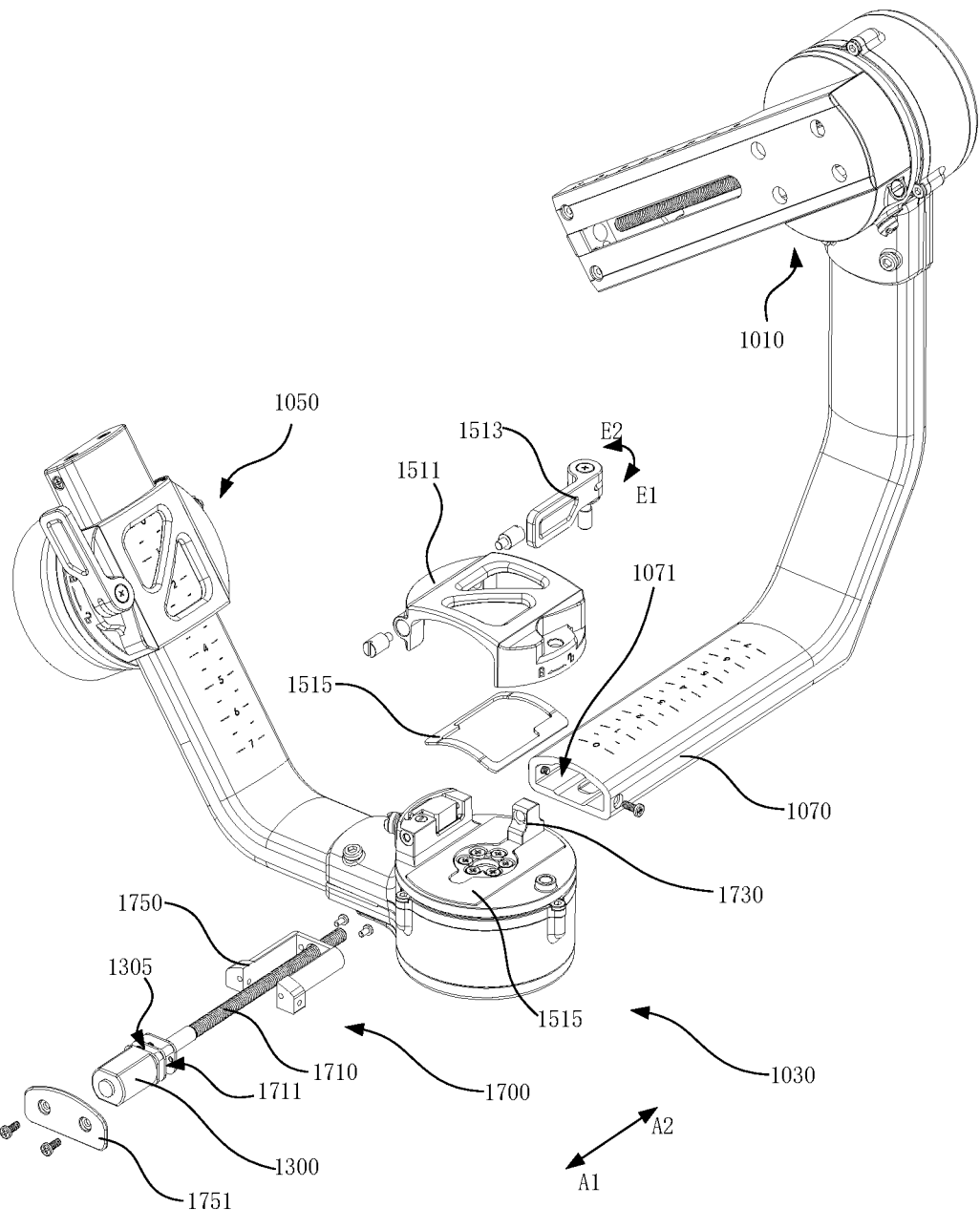
FIG. 11 is an exploded partial structural view of a gimbal according to some exemplary embodiments of the present disclosure.

With reference to FIG. 11, in some exemplary embodiments, the screw transmission structure 1700 may further include a first motor base 1750. The first motor base 1750 is configured to connect the fixed part of the balancing motor 1300; in addition, the screw rod 1710 is rotatably passed through the first motor base 1750. In this way, the rotation of the screw rod 1710 may be guided and supported by the first motor base 1750, so that the rotation of the screw rod 1710 is more stable.

Specifically, the screw rod 1710 is usually elongated in shape. On the one hand, the screw rod 1710 needs to bear the weight on the connection part 1730. On the other hand, the screw rod 1710 needs to rotate. As a result, when the screw rod 1710 rotates, it is easy to shake and affect the transmission effect. By arranging the screw rod 1710 to pass through the first motor base 1750, the first motor base 1750 may provide additional guidance and support for the screw rod 1710 when the screw rod 1710 rotates, making the screw rod 1710 rotate more stably.

In some exemplary embodiments, the first motor base 1750 is installed on the axis arms 1070 of each of the roll axis assembly 1030 and the yaw axis assembly 1050. The first motor base 1750 is fixed by screw to the axis arm 1070. The fixed part of the balancing motor 1300 is fixedly connected to the axis arm 1070, so that the first motor base 1750 is fixedly connected to the fixed part of the balancing motor 1300 (such as the body of the balancing motor 1300). The first motor base 1750 may be fixed on the axis arms 1070 of the roll axis assembly 1030 and the yaw axis assembly 1050 by screws. The balancing motor 1300 on the vertical arm 1013 of the pitch axis assembly 1010 is fixed to the vertical arm 1013 via other structures.

With reference to FIG. 11, in some exemplary embodiments, the gimbal component 1101 may include an axis arm 1070 provided with an accommodation space 1071, and the balancing motor 1300 and the screw rod 1710 may be arranged in the accommodation space 1071. The screw transmission structure 1700 may also include a first end cover 1751. The first end cover 1751 may be fixed on one end of the axis arm 1070 to cover the balancing motor 1300.

In this way, the space occupied by the driving motor 1105 and the screw rod 1710 may be reduced. In addition, the driving motor 1105 and the screw rod 1710 in the accommodation space 1071 may be protected by the first end cover 1751.

Specifically, in some exemplary embodiments, the axis arm(s) 1070 provided with the accommodation space 1071 may include the vertical arm 1013 of the pitch axis assembly 1010, the axis arm 1070 of the roll axis assembly 1030 and the axis arm 1070 of the yaw axis assembly 1050. These accommodation spaces 1071 accommodate respective balancing motors 1300 and screw rods 1710. The first end cover 1751 may be fixed to one end of the axis arm 1070 by screws, and the first motor base 1750 may be fixedly connected to the first end cover 1751 by screws. Of course, the fixing method of the first end cover 1751 is not limited to screw fixing, and other ways may also be used for fixing.

With reference to FIG. 1, in some exemplary embodiments, the gimbal component 1101 may include a first part and a second part. The balancing motor 1300 is installed on the first part. The second part is movably connected to the first part and is used for mounting the load 2000. The connection part 1730 is mounted on the second part. The balancing motor 1300 is used to drive the connection part 1730 to move and drive the second part to move relative to the first part, so as to perform a balancing operation in a corresponding direction. In this way, the balancing operation for the load 2000 may be achieved.

Specifically, in some exemplary embodiments, the gimbal component 1101 is the pitch axis component 1010, the first part is the vertical arm 1013 of the pitch axis assembly 1010, and the second part is the cross arm 1015 of the pitch axis assembly 1010. The load 2000 is installed on the cross arm 1015 via the load fixing plate 1011.

With reference to FIG. 10, in some exemplary embodiments, the screw transmission structure 1700 may also include a second motor base (not shown). The second motor base is installed on the first part for connecting the fixed part of the balancing motor 1300, and the screw rod 1710 is rotatably passed through the second motor base. In this way, the rotation of the screw rod 1710 may be guided and supported by the second motor base, so that the rotation of the screw rod 1710 is more stable.

Specifically, when the balancing motor 1300 drives the second part to move relative to the first part, the screw transmission structure 1700 may also be used for transmission. The screw transmission structure 1700 includes a second motor base to make the screw 1710 rotate more stably. The second motor base may be mounted on the vertical arm 1013 of the pitch axis assembly 1010. The second motor base may adopt the structural form of the first motor base. For specific description, reference may be made to the related implementation mode, which is not further described herein.

With reference to FIG. 10, in some exemplary embodiments, the first part may be provided with an accommodation cavity 1753. The balancing motor 1300 and the screw rod 1710 may be arranged in the accommodation cavity 1753. The screw transmission structure 1700 may also include a second end cover 1754. The second end cover 1754 is fixed at one end of the first part to cover the balancing motor 1300. In this way, the space occupied by the driving motor 1105 and the screw rod 1710 may be reduced.

In addition, the driving motor 1105 and the screw rod 1710 in the accommodation cavity 1753 may be protected by the second end cover 1754.

Specifically, in some exemplary embodiments, the first part is the vertical arm 1013 of the pitch axis assembly 1010, and the vertical arm 1013 is provided with an accommodation cavity 1753 for accommodating the corresponding balancing motor 1300 and screw rod 1710. The second end cover 1754 may be fixed at one end of the vertical arm 1013 by screws. Of course, the fixing method of the second end cover 1754 is not limited to screw fixing, and other ways may also be used for fixing. In some exemplary embodiments, the balancing motor 1300 may be located at the top or bottom of the first part. In this way, the location of the balancing motor 1300 may be flexibly configured according to requirements.

Specifically, in some exemplary embodiments, the first part may be the vertical arm 1013 of the pitch axis assembly 1010. In FIG. 2, the balancing motor 1300 is mounted on the top of the vertical arm 1013. In some exemplary embodiments, it can be understood that the balancing motor 1300 may be installed at the bottom of the vertical arm 1013. No matter the balancing motor 1300 is located on the top or the bottom of the vertical arm 1013, the balancing motor 1300 is located in the vertical arm 1013. It can be understood that, in some exemplary embodiments, no matter the balancing motor 1300 is located on the top or the bottom of the vertical arm 1013, the balancing motor 1300 may be located outside the vertical arm 1013, or partially located inside the vertical arm 1013 and partially located outside the vertical arm 1013.

With reference to FIG. 10, in some exemplary embodiments, the gimbal 1000 may include a locking structure 1500. The locking structure 1500 may be mounted on the second part and may selectively lock and unlock the second part. The balancing method may further include:

> When receiving an unlocking instruction, control the locking structure 1500 to unlock the second part or control the gimbal 1000 to issue a prompt to unlock the second part.

The balancing method of this disclosure may be implemented by the gimbal 1000 of this disclosure. Specifically, with reference to FIG. 1, the gimbal 1000 may be configured to, when receiving an unlocking instruction, control the locking structure 1500 to unlock the second part or control the gimbal 1000 to issue a prompt to unlock the second part. Specifically, the controller 1517 for gimbal 1000 may be configured to, when receiving an unlocking instruction, control the locking structure 1500 to unlock the second part or control the gimbal 1000 to issue a prompt to unlock the second part.

In this way, the second part may be conveniently controlled for the balancing operation.

Specifically, the locking structure 1500 may be a manual locking structure 1500, the locking structure 1500 may be an automatic locking structure, or the locking structure 1500 may be a combination of the manual locking structure 1500 and an automatic locking structure. No specific limitation is made here. For specific description, reference may be made to the related implementation mode, and is not further described herein.

In some exemplary embodiments, the balancing method may further include:

> When the gimbal 1000 is in a balanced state in the direction adjusted by the balancing motor 1300, control the locking structure 1500 to lock the second part or control the gimbal 1000 to issue a prompt to lock the second part.

The balancing method of this disclosure may be implemented by the gimbal 1000 of this disclosure. Specifically, with reference to FIG. 1, the gimbal 1000 may be configured to, when the gimbal 1000 is in a balanced state in the direction adjusted by the balancing motor 1300, control the locking structure 1500 to lock the second part or control the gimbal 1000 to issue a prompt to lock the second part. Specifically, the controller 1517 for gimbal 1000 may be configured to, when the gimbal 1000 is in a balanced state in the direction adjusted by the balancing motor 1300, control the locking structure 1500 to lock the second part or control the gimbal 1000 to issue a prompt to lock the second part.

In this way, the second part that has completed the balancing operation may be fixed, so as to avoid relative movement during the execution of another balancing operation that may affect the following operation.

With reference to FIG. 10, in some exemplary embodiments, the locking structure 1500 may include a first locking knob 1501 and a first locking pressing block 1503. The first locking knob 1501 is rotatably installed on the second part. The first locking pressing block 1503 is movably installed on the second part. The first locking knob 1501 is connected to the first locking pressing block 1503.

When the first locking knob 1501 is rotated in a first direction C1, the first locking pressing block 1503 is pressed against the first part to lock the second part. When the first locking knob 1501 rotates in a second direction C2, the first locking pressing block 1503 releases the first part to unlock the second part. The first direction is different from the second direction. In this way, the unlocking and locking of the second part can be realized.

Specifically, in some exemplary embodiments, the second part is the cross arm 1015 of the pitch axis assembly 1010. The locking structure 1500 for locking and unlocking the cross arm 1015 may be a manual locking structure 1500. The user may manually rotate the first locking knob 1501 to realize locking and unlocking of the second part.

It can be understood that, in some exemplary embodiments, the locking structure 1500 for locking and unlocking the cross arm 1015 may be an automatic locking structure. The automatic locking structure may also include a driving part. The driving part is connected to the first locking knob 1501 to drive the first locking knob 1501 to rotate back and forth in a first direction and a second direction. In some exemplary embodiments, the first direction may be opposite the second direction. It can be understood that the relationship between the first direction and the second direction may also be other relationships, which are not specifically limited herein.

With reference to FIG. 1, in some exemplary embodiments, the gimbal component 1101 may include a load fixing plate 1011, a first part and a second part. The load fixing plate 1011 is used for mounting the load 2000. The first part is connected to the rotation part of driving motor 1105. The second part is connected to the first part, and is used for removably connecting the load fixing plate 1011. The balancing motor 1300 is installed on the second part to drive the load fixing plate 1011 to move relative to the second part via the transmission mechanism 1103. In this way, the movement of the load fixing plate 1011 may be realized, and further the position adjustment of the load 2000 may also be realized.

Specifically, the balancing motor 1300 may drive the load fixing plate 1011 to move back and forth relative to the second part via the transmission mechanism 1103, and then drive the load 2000 (such as a camera) to move back and forth in the front and back directions.

With reference to FIG. 12, in some exemplary embodiments, the transmission mechanism 1103 may include a worm transmission structure 1130. The balancing motor 1300 is connected to the load fixing plate 1011 via the worm transmission structure 1130. Specifically, the worm transmission structure 1130 may include a worm 1131, a worm gear 1133, a gear 1135, and a first rack 1137. The worm 1131 is fixed to the output shaft 1305 of the balancing motor 1300. The worm gear 1133 meshes with the worm 1131. The gear 1135 is connected to the worm gear 1133. The first rack 1137 is fixed on the load fixing plate 1011 and meshes with the gear 1135. During a balancing operation of load fixing plate 1011, the output shaft 1305 of the balancing motor 1300 installed on the second part rotates, driving the worm 1131, the worm gear 1133 and the gear 1135 to rotate, and then driving the first rack 1137 and the load fixing plate 1011 to move. The worm gear 1133 may be mounted to the camera fixing plate. After the worm gear 1133 is installed on the camera fixed plate, it is fixed with a circlip to prevent axial movement. Of course, other structures for preventing axial movement, such as nuts, are also possible. This is not limited herein.

The structure of worm gear and worm 1131 may output a higher torque, and has a self-locking function. After the load 2000 is installed on the camera fixing plate, a self-locking force may be provided to prevent the load 2000 from falling off.

It can be understood that in some exemplary embodiments, when the load fixing plate 1011 cannot be disassembled from the second part, the transmission mechanism 1103 between the load fixing plate 1011 and the second part may also be a screw transmission structure 1700. Specifically, it can be selectively designed according to needs.

With reference to FIGS. 2 and 12, in some exemplary embodiments, the gimbal 1000 may also include a manual knob 1138. The manual knob 1138 is rotatably mounted on the second part. The manual knob 1138 is meshed with a second rack 1139 mounted on the load fixing plate 1011. In this way, a manual balancing function of the second part can be added.

Specifically, when the balancing motor 1300 is damaged or the battery power of the gimbal 1000 is low, or in other needs, the manual knob 1138 may be used to adjust the position of the load fixing plate 1011, and then the load 2000 may be adjusted to move back and forth in the front and back direction.

In some exemplary embodiments, the locking structure 1500 is installed on the second part, and may selectively lock and unlock the load fixing plate 1011. The balancing method may further include:

When receiving an unlocking instruction, control the locking structure 1500 to release the load fixing plate 1011 or control the gimbal 1000 to issue a prompt to unlock the load fixing plate 1011.

The balancing method of this disclosure may be implemented by the gimbal 1000 of this disclosure. Specifically, with reference to FIG. 1, the gimbal 1000 may be configured to, when receiving an unlocking instruction, control the locking structure 1500 to release the load fixing plate 1011 or control the gimbal 1000 to issue a prompt to unlock the load fixing plate 1011. Specifically, the controller 1517 for gimbal 1000 may be configured to, when receiving an unlocking instruction, control the locking structure 1500 to release the load fixing plate 1011 or control the gimbal 1000 to issue a prompt to unlock the load fixing plate 1011.

In this way, the load fixing plate 1011 may be conveniently controlled for balancing operation.

Specifically, the locking structure 1500 may be a manual locking structure 1500, the locking structure 1500 may be an automatic locking structure, or the locking structure 1500 may be a combination of the manual locking structure 1500 and an automatic locking structure. No specific limitation is made here. For specific description, reference may be made to the related implementation mode, and is not further described herein.

In some exemplary embodiments, the balancing method may further include:

When the gimbal 1000 is in a balanced state in the direction adjusted by the balancing motor 1300, control the locking structure 1500 to lock the load fixing plate 1011 or control the gimbal 1000 to issue a prompt to lock the load fixing plate 1011.

The balancing method of this disclosure may be implemented by the gimbal 1000 of this disclosure. Specifically, with reference to FIG. 1, the gimbal 1000 may be configured to, when the gimbal 1000 is in a balanced state in the direction adjusted by the balancing motor 1300, control the locking structure 1500 to lock the load fixing plate 1011 or control the gimbal 1000 to issue a prompt to lock the load fixing plate 1011. Specifically, the controller 1517 for gimbal 1000 may be configured to, when the gimbal 1000 is in a balanced state in the direction adjusted by the balancing motor 1300, control the locking structure 1500 to lock the load fixing plate 1011 or control the gimbal 1000 to issue a prompt to lock the load fixing plate 1011.

In this way, the load fixing plate 1011 that has completed the balancing operation may be fixed. In addition, it is avoided that relative movement occurs in the process of performing another balancing operation to affect the next balancing operation.

With reference to FIG. 10, in some exemplary embodiments, the locking structure 1500 may include a second locking knob 1505 and a second locking pressing block 1507. The second locking knob 1505 is rotatably mounted on the second part. The second locking pressing block 1507 is movably installed on the second part. The second locking knob 1505 is connected to the second locking pressing block 1507. When the second locking knob 1505 is rotated in a third direction D1, the second locking pressing block 1507 is pressed against the load fixing plate 1011 to lock the load fixing plate 1011. When the second locking knob 1505 is rotated in a fourth direction D2, the second locking pressing block 1507 releases the load fixing plate 1011 to unlock the load fixing plate 1011. The third direction is different from the fourth direction.

In this way, the unlocking and locking of the load fixing plate 1011 may be realized.

In some exemplary embodiments, the locking structure 1500 for locking and unlocking the load fixing plate 1011 may be a manual locking structure 1500. The user may manually rotate the second locking knob 1505 to realize locking and unlocking of the load fixing plate 1011. The third direction is opposite to the fourth direction. It can be understood that the relationship between the third direction and the fourth direction may also be other relationships, which are not specifically limited herein.

In some exemplary embodiments, the locking structure 1500 is installed on the rotation part of the driving motor 1105, and may selectively lock and unlock at least part of the gimbal component 1101. The balancing method may further include:

When receiving the unlock instruction, control the locking structure 1500 to unlock at least part of the gimbal component 1101, or control the gimbal 1000 to issue a prompt to unlock at least part of the gimbal component 1101.

The balancing method of this disclosure may be implemented by the gimbal 1000 of this disclosure. Specifically, with reference to FIG. 1, the gimbal 1000 may be configured to, when receiving the unlock instruction, control the locking structure 1500 to unlock at least part of the gimbal component 1101, or control the gimbal 1000 to issue a prompt to unlock at least part of the gimbal component 1101. Specifically, the controller 1517 for gimbal 1000 may be configured to, control the locking structure 1500 to unlock at least part of the gimbal component 1101, or control the gimbal 1000 to issue a prompt to unlock at least part of the gimbal component 1101.

In this way, it is convenient to control the gimbal component 1101 corresponding to each adjustment direction for balancing operation.

Specifically, in some exemplary embodiments, at least part of the gimbal component 1101 is further described by taking the axis arm 1070 as an example. Each of the roll axis assembly 1030 and the yaw axis assembly 1050 may be provided with a locking structure 1500. The locking structure 1500 of the roll axis assembly 1030 may be installed on the rotation part of the driving motor 1105 of the roll axis assembly 1030, and may selectively lock and unlock the axis arm 1070 of the roll axis assembly 1030. The locking structure 1500 of the yaw axis assembly 1050 may be installed on the rotation part of the driving motor 1105 of the yaw axis assembly 1050, and may selectively lock and unlock the axis arm 1070 of the yaw axis assembly 1050.

Specifically, the locking structure 1500 may be a manual locking structure 1500, the locking structure 1500 may be an automatic locking structure, or the locking structure 1500 may be a combination of the manual locking structure 1500 and an automatic locking structure. No specific limitation is made here. For specific description, reference may be made to the related implementation mode, and is not further described herein.

In some exemplary embodiments, the balancing method may further include:

When the gimbal 1000 is in a balanced state in the direction adjusted by the balancing motor 1300, control the locking structure 1500 to lock at least part of the gimbal component 1101, or control the gimbal 1000 to issue a prompt to lock at least part of the gimbal component 1101.

In this way, at least part of the gimbal component 1101 that has completed the balancing operation may be fixed. In addition, it is avoided that relative movement occurs in the process of performing another balancing operation to affect the next balancing operation.

With reference to FIG. 11, in some exemplary embodiments, the locking structure 1500 may include a holding part 1511 and a plate buckle 1513. One end of the holding part 1511 is rotatably connected to the rotation part of the driving motor 1105. The plate buckle 1513 is rotatably installed on the rotation part of the driving motor 1105 and connected to the other end of the holding part 1511. When the plate buckle 1513 rotates in a fifth direction E1, the holding part 1511 presses at least part of the gimbal component 1101 to lock the at least part of the gimbal component 1101. When the plate buckle 1513 rotates in a sixth direction E2, the holding part 1511 releases at least part of the gimbal component 1101 to unlock the at least part of the gimbal component 1101.

In this way, the at least part of the gimbal component 1101 may be unlocked and locked.

Specifically, In one example, the at least part of the gimbal component 1101 is the axis arm 1070 of the roll axis component 1030. One end of the holding part 1511 is rotatably connected to the rotation part of the driving motor 1105 of the roll axis assembly 1030. The plate buckle 1513 is rotatably installed on the rotation part of the driving motor 1105 of the roll axis assembly 1030 and connected to the other end of the holding part 1511. The locking structure 1500 for locking and unlocking the axis arm 1070 of the roll axis assembly 1030 is a manual locking structure 1500. The user may manually rotate the plate buckle 1513 to realize locking and unlocking of the axis arm 1070 of the roll axis assembly 1030. It can be understood that in some exemplary embodiments, the locking structure 1500 of the axis arm 1070 for locking and unlocking the roll axis assembly 1030 may be an automatic locking structure. The automatic locking structure may include a driving part, and the driving part is connected to the plate buckle 1513 to drive the plate buckle 1513 to rotate back and forth in the fifth direction and the sixth direction.

With reference to FIG. 11, in some exemplary embodiments, an inner surface of the holding part 1511 is provided with a lubricating pad 1515 in contact with the gimbal component 1101. In this way, the lubricating pad 1515 may reduce the friction of the axis arm 1070 of the roll axis assembly 1030 and improve the service lives of the holding part 1511 and the axis arm 1070 of the roll axis assembly 1030.

In some exemplary embodiments, the locking structure 1500 is capable of selectively automatically locking and automatically unlocking at least part of the gimbal component 1101. The balancing method may further include:

When receiving the unlock instruction, control the locking structure 1500 to unlock at least part of the gimbal component 1101.

When the gimbal 1000 is in a balanced state in the direction adjusted by the balancing motor 1300, control the locking structure 1500 to lock at least part of the gimbal component 1101.

The balancing method of this disclosure may be implemented by the gimbal 1000 of this disclosure. Specifically, with reference to FIG. 1, the gimbal 1000 may be configured to, when receiving the unlock instruction, control the locking structure 1500 to unlock at least part of the gimbal component 1101, and when the gimbal 1000 is in a balanced state in the direction adjusted by the balancing motor 1300, control the locking structure 1500 to lock at least part of the gimbal component 1101.

In this way, the at least part of the gimbal component 1101 may be automatically controlled to perform the balancing operation.

Specifically, the locking structure 1500 may include a locking controller (not shown) and a locking part 1609. The locking part 1609 may connect the locking controller and at least part of the gimbal component 1101. The trigger condition for the lock controller to control the locking part 1609 to unlock the at least part of the gimbal component 1101 may include receiving an unlocking instruction. The trigger condition for the locking controller to control the locking part 1609 to lock the at least part of the gimbal component 1101 may include that the gimbal 1000 is in a balanced state in the direction adjusted by the balancing motor 1300. In this way, automatic locking and unlocking of the locking structure 1500 may be realized, making it convenient for users to use the gimbal 1000.

Specifically, in some exemplary embodiments, the locking part 1609 may be a pressing block, a holding part, an electromagnetic part, a piezoelectric ceramic part, a memory metal, etc., or a combination of the foregoing. This is not specifically limited herein, that is to say, the locking part 1609 may be controlled electrically to lock and unlock the at least part of the gimbal component 1101 (such as the axis arm 1070).

In some exemplary embodiments, the locking structure 1500 may also include a locking motor 1601. The locking motor 1601 is connected to the locking controller and the locking part 1609 respectively. The locking motor 1601 is used to drive the locking part 1609 to move according to the control instruction of the locking controller, so as to unlock or lock at least part of the gimbal component 1101. In this way, the locking motor 1601 is controlled by the locking controller to realize locking and unlocking of the at least part of the gimbal component 1101 via the locking part 1609. Specifically, the locking motor 1601 may be a linear motor, which is used to drive the locking part 1609 to translate so as to lock and unlock the at least part of the gimbal component 1101. The locking motor 1601 may be a rotating motor, which is used to drive the locking part 1609 to rotate so as to lock and unlock the at least part of the gimbal component 1101. The locking motor 1601 may also be other types of motors, which are not specifically limited herein, as long as they can drive the locking part 1609 to move.

Figure 13:
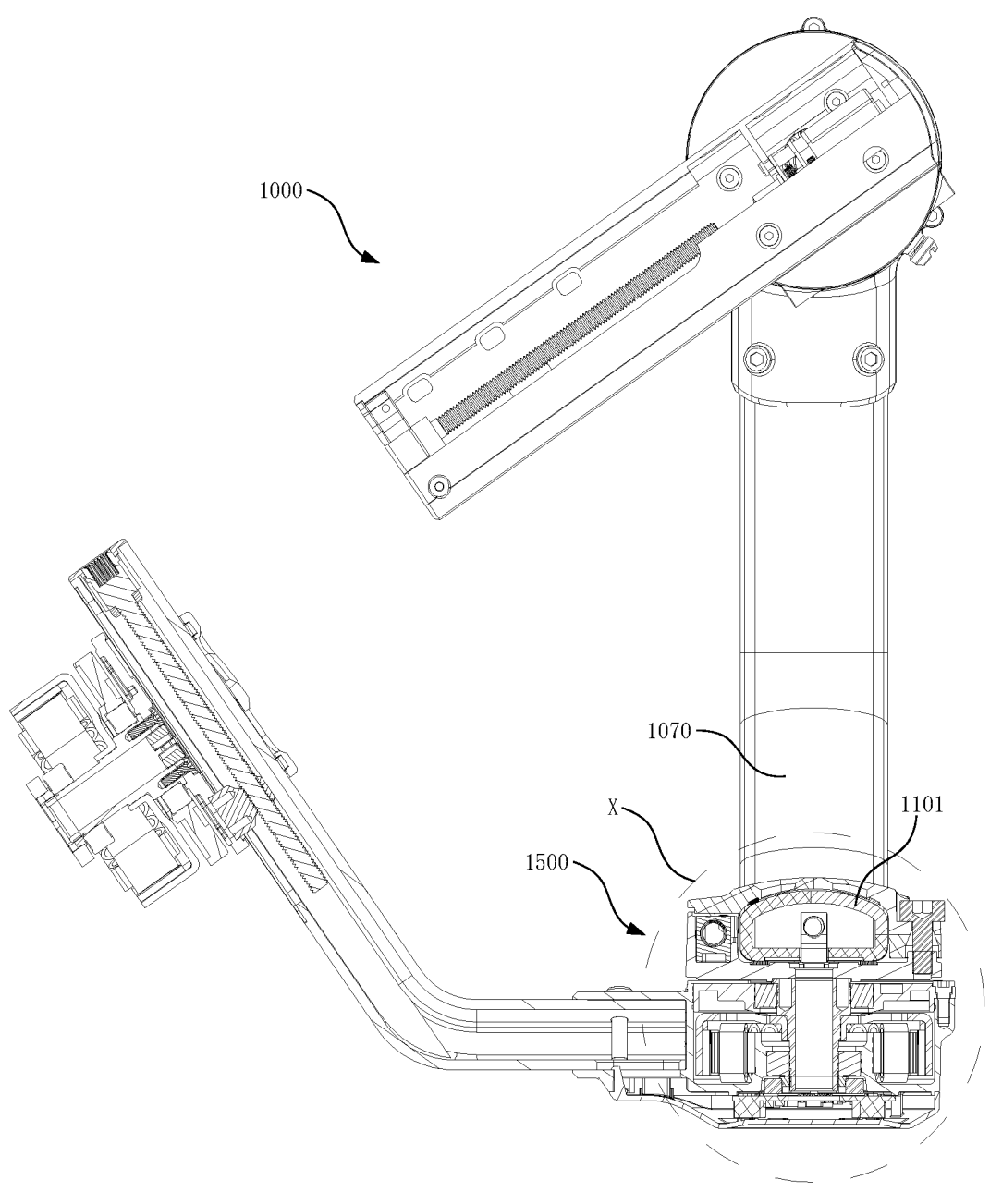
FIG. 13 is a schematic partial structural view of a gimbal according to some exemplary embodiments of the present disclosure.
Figure 14:
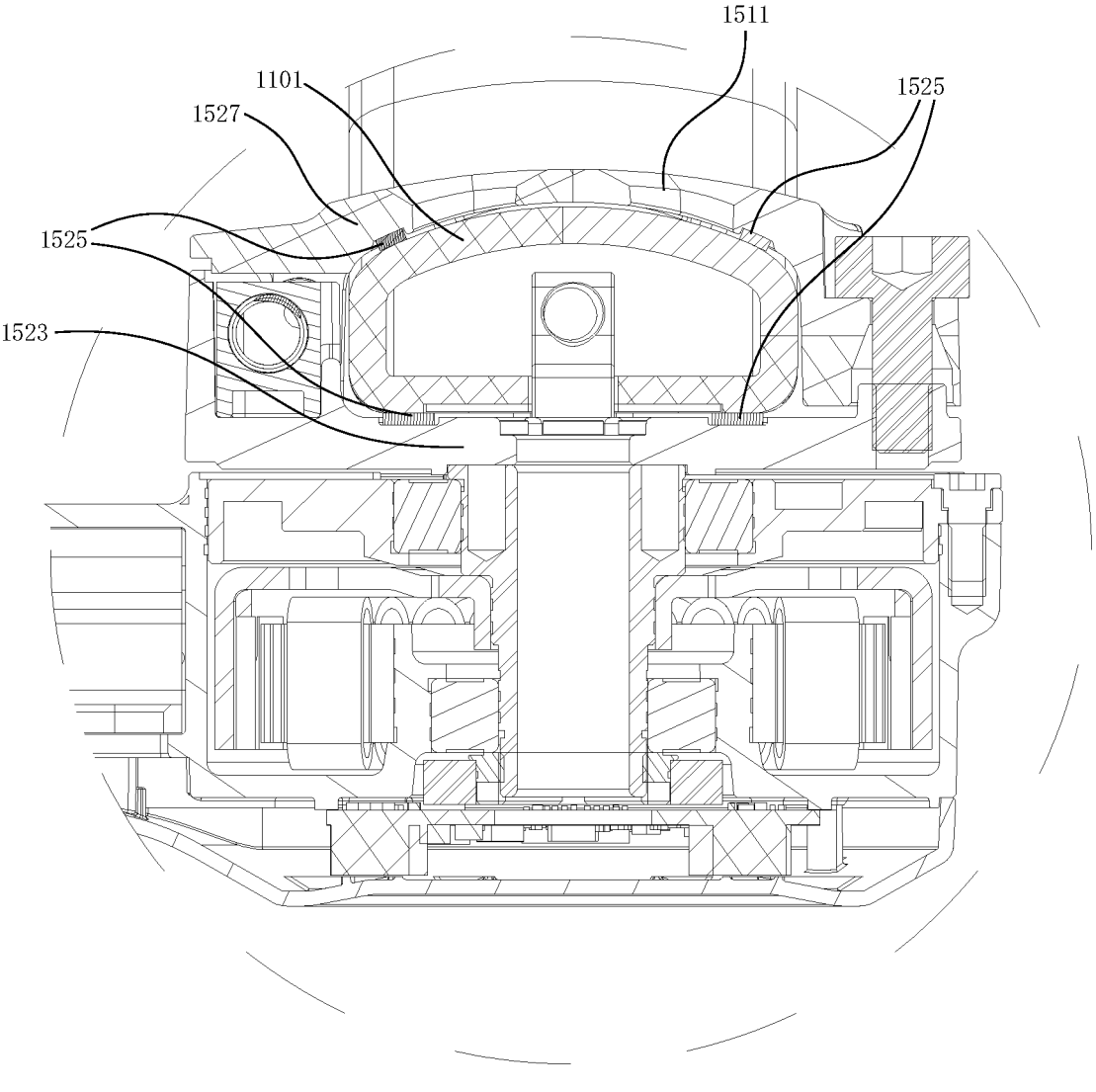
FIG. 14 is an enlarged view of a part X of FIG. 13.

With reference to FIGS. 13 and 14, in some exemplary embodiments, the locking structure 1500 may include an accommodation part 1523 and a friction pad 1525. The accommodation part may be used for accommodating at least part of the gimbal component 1101. At least one of the accommodation part 1523 and the gimbal component 1101 may be provided with a friction pad 1525. The friction pad 1525 abuts against the accommodation part 1523 and at least part of the gimbal component 1101 respectively. The friction pad 1525 is used to provide a friction force to the at least part of the gimbal component 1101, so that when the balancing motor 1300 stops driving the at least part of the gimbal component 1101 to move, the at least part of the gimbal component 1101 may be locked and cannot move. In this way, self-locking of the at least part of the gimbal component 1101 may be achieved via a mechanical structure.

Specifically, take at least part of gimbal component 1101 being the axis arm 1070 as an example for further illustration. In some exemplary embodiments, the friction pad 1525 may be provided on one or both of the accommodation part 1523 and the axis arm 1070, so that there is a friction pad(s) 1525 between the accommodation part 1523 and the axis arm 1070. When the axis arm 1070 is stationary, the friction force provided by the friction pad 1525 may make the axis arm 1070 fixed relative to the accommodation part 1523 and cannot move. During an adjustment operation, the corresponding balancing motor 1300 drives the axis arm 1070 to move. For example, for the roll axis assembly 1030, with reference to FIG. 11, the balancing motor 1300 on the axis arm 1070 of the roll axis assembly 1030 may drive the axis arm 1070 of the roll axis assembly 1030 to move. The output torque of the balancing motor 1300 overcomes the friction force of the friction pad 1525, so that the roll axis assembly 1030 and the axis arm 1070 move in an A1-A2 direction.

The friction pad 1525 may be disposed in multiple directions corresponding to at least part of the outer surfaces of the gimbal component 1101. Taking the axis arm 1070 as an example, friction pads may be provided on the upper, lower, left and right side surfaces of the axis arm 1070 so as to keep the axis arm 1070 fixed in the up, down, left and right directions. Of course, in some exemplary embodiments, the friction pads may also be provided only for the axis arm 1070 in a certain direction where displacement is likely to occur.

Further, when the transmission mechanism 1103 is a screw transmission mechanism 1700 or a worm transmission structure 1130, since it has a self-locking function, with the friction pad 1525. It may achieve a more stable effect, thereby improving the stability enhancement performance of the gimbal 1000.

In some exemplary embodiments, the friction pad 1525 may be elastic. In some exemplary embodiments, the friction pad 1525 may be made of one or two or more of rubber, resin and plastic materials. When there are multiple friction pads 1525, the materials of the multiple friction pads may be the same or different.

With reference to FIG. 14, in some exemplary embodiments, the accommodation part 1523 may include a cover plate 1527. The cover plate 1527 is fixed on the rotation part of the driving motor 1105 and presses at least part of the gimbal component 1101. In this way, the fixed installation of the friction pad 1525 may be realized.

Specifically, the cover plate 1527 may be in the form of the holding part 1511, or other structural forms. This is not specifically limited herein.

In some exemplary embodiments, the accommodation part 1523 may be a accommodation slot provided on the rotation part of the driving motor 1105. In this way, there is no need to add additional parts, thereby reducing the weight of and space occupied by the gimbal 1000.

Specifically, in one example, the rotation part of driving motor 1105 may include a rotor 1106 of driving motor 1105. The structure of the rotor 1106 may be provided with an accommodation slot to realize the function of the accommodation part 1523. The axis arm 1070 may be provided with an accommodation slot. The friction pad 1525 may be arranged between an outer surface of the axis arm 1070 and an inner wall of the accommodation slot.

It can be understood that, in addition to the content described above, in practical applications, the locking structure 1500 in this disclosure may also have other structures or certain deformations. The purpose is to keep at least part of the gimbal component 1101 fixed or move in the corresponding adjustment direction.

With reference to FIG. 1, in some exemplary embodiments, the balancing motor 1300 may be detachably mounted on the gimbal component 1101. In this way, on the one hand, after the balancing operation is completed, the balancing motor 1300 may be disassembled to reduce the weight of and space occupied by the gimbal 1000. On the other hand, when the balancing motor 1300 breaks down and needs to be repaired or replaced, it is only necessary to disassemble the balancing motor 1300 without removing other parts of the gimbal 1000.

It is understandable that when the balancing motor 1300 is detachable from the gimbal component 1101, during the aforementioned balancing operation, the influence of the balancing motor 1300 on the center of gravity of the gimbal 1000 may be estimated and thus excluded from the corresponding calculations. That is, after the corresponding balancing operation has been performed on the gimbal 1000, but before the balancing motor 1300 is disassembled from the gimbal component 1101, the gimbal 1000 is still in the expected balance state in the corresponding adjustment direction, and there is still a corresponding gap from the balance position. However, after the balancing motor 1300 is disassembled from the gimbal component 1101, the gimbal 1000 is almost completely in the desired balance state in the corresponding adjustment direction, and is almost approaching the balance position.

Specifically, in some exemplary embodiments, a detachable balancing motor 1300 may be installed at one end of the axis arm 1070. One end of the axis arm 1070 is provided with a structure for installing and dismounting the balancing motor 1300.

Figure 15:
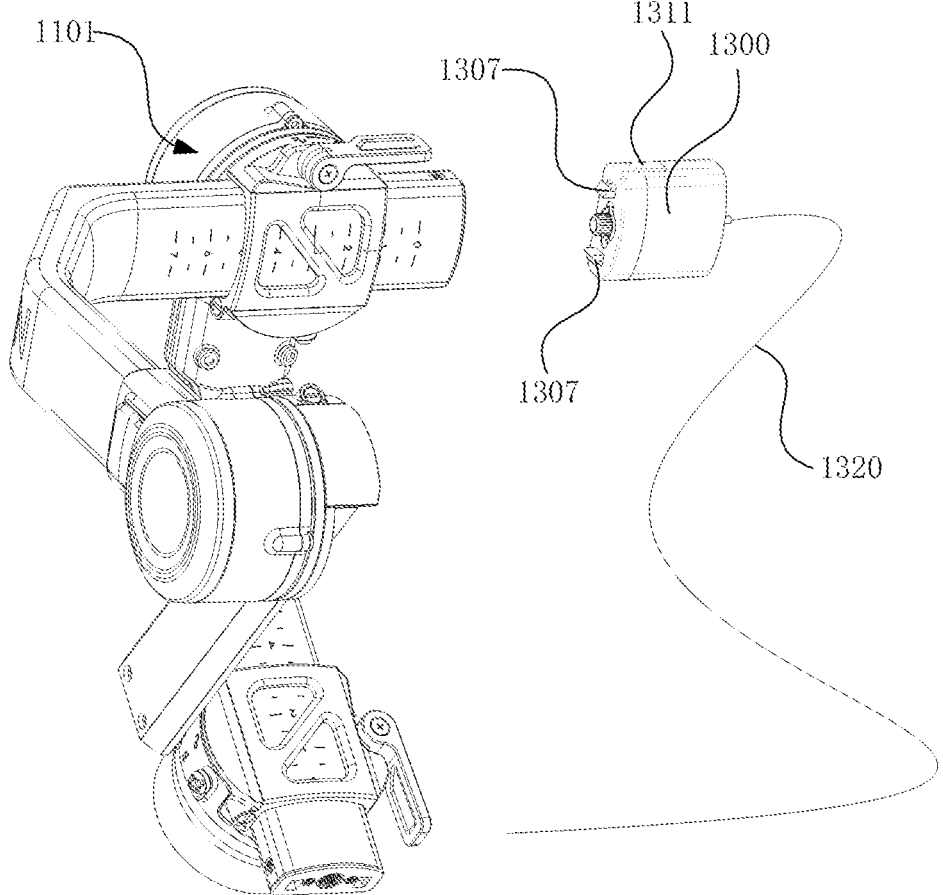
FIG. 15 is a schematic partial structural view of a gimbal according to some exemplary embodiments of the present disclosure.
Figure 16:
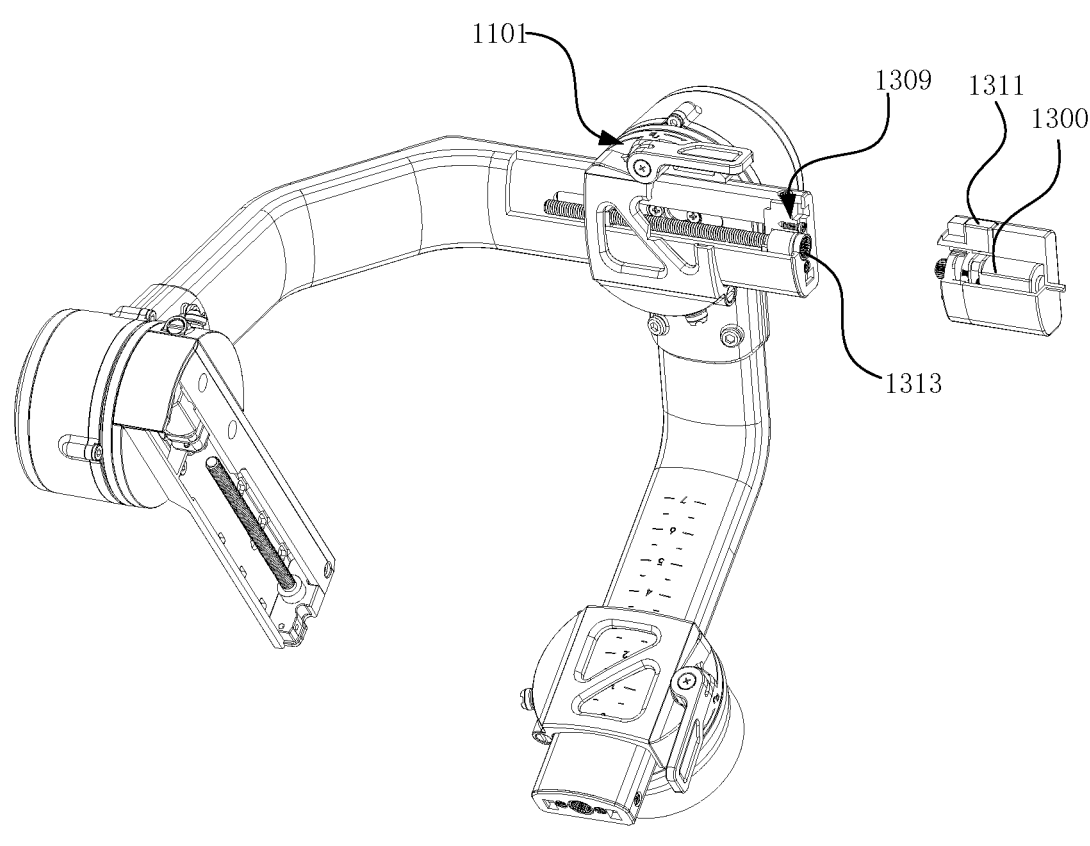
FIG. 16 is a schematic partial structural view of a gimbal according to some exemplary embodiments of the present disclosure.

With reference to FIGS. 15 and 16, in some exemplary embodiments, one of the balancing motor 1300 and the gimbal component 1101 may be equipped with a latch 1307, and the other one of the balancing motor 1300 and the gimbal component 1101 may be provided with a latch hole 1309. The latch 1307 is used for locking in the latch hole 1309. In this way, the detachable structure of the balancing motor 1300 may be realized with the latch 1307 and the latch hole 1309, with a simple structure and low costs.

Specifically, in some exemplary embodiments, the balancing motor 1300 may be equipped with a latch 1307, and an end face at one end of the axis arm 1070 may be provided with a latch hole 1309. During installation, the latch 1307 on the balancing motor 1300 may be aligned with the latch hole 1309 for installation. When the latch 1307 is fastened in the latch hole 1309, the balancing motor 1300 may be installed and fixed.

With reference to FIGS. 15 and 16, in some exemplary embodiments, an unlocking operation part 1311 may be installed on the balancing motor 1300 or the gimbal component 1101. The unlocking operation part 1311 may be connected to the latch 1307 and is used to separate the latch 1307 from the latch hole 1309 when it is operated. In this way, it is convenient for the user to disassemble the balancing motor 1300.

Specifically, in some exemplary embodiments, the balancing motor 1300 may be equipped with an unlocking operation part 1311. The unlocking operation part 1311 is connected to a latch(s) 1307. The latch 1307(*s*) may include two latches 1307 on both sides of the fixed part of the balancing motor 1300. Each latch 1307 is connected to a corresponding unlocking operation part 1311. In the case of not being operated, the two unlocking operation parts 1311 protrude relative to the fixed part (body) of the balancing motor 1300. The distance between the two latches 1307 is a first distance. When the user presses the two unlocking operation parts 1311 with two fingers, the unlocking operation parts 1311 are retracted into the fixed part of the balancing motor 1300, thereby driving the distance between the two latches 1307 to be reduced to a second distance (the second distance is shorter than the first distance). It makes the latches 1307 disengage from the corresponding latch holes 1309, and then the balancing motor 1300 may be removed in a direction away from the axis arm 1070. When the user releases his fingers, the two unlocking operation parts 1311 are driven by elastic parts located in the fixed part of the balancing motor 1300 to pop out and reset.

It can be understood that the connection mode of the balancing motor 1300 relative to the gimbal component 1101 is not limited to the above description. In practical applications, other applicable detachable structures or quick release structures may also be used, such as screw connection, magnetic connection, clamping connection, and the like.

In some exemplary embodiments, the gimbal 1000 supplies power to the balancing motor 1300 via wired and/or wireless means. In this way, the balancing motor 1300 may be powered in different ways.

Specifically, in some exemplary embodiments, the gimbal 1000 may supply power to balancing motor 1300 via a cable. The gimbal 1000 may supply power to the balancing motor 1300 via an additional data cable. Alternatively, one end of axis arm 1070 may be installed with a first conductive contact, and the fixed part of the balancing motor 1300 may be provided with a second conductive contact. Thus, when the balancing motor 1300 is installed on one end of the axis arm 1070, the first conductive contact may contact the second conductive contact so as to realize the connection of the power supply line.

In some exemplary embodiments, the gimbal 1000 may supply power to the balancing motor 1300 wirelessly. One end of axis arm 1070 may be installed with a first coil, and the fixed part of balancing motor 1300 may be provided with a second coil. When the balancing motor 1300 is installed on one end of the axis arm 1070, the first coil is aligned with the second coil, thus wireless power transmission is performed in the form of electromagnetic waves.

In some exemplary embodiments, the gimbal 1000 may supply power to the balancing motor 1300 via wired and wireless means. For details, please refer to the related descriptions above.

In some exemplary embodiments, the balancing motor 1300 may be provided with a battery, and the balancing motor 1300 communicates with the gimbal 1000 wirelessly. In this way, the balancing motor 1300 may be self-powered, which increases the battery life of the gimbal 1000.

Specifically, a battery may be provided in the fixed part of the balancing motor 1300. The balancing motor 1300 may be powered by the built-in battery of the balancing motor 1300. A control signal may be sent from the gimbal 1000 to the balancing motor 1300 via wireless communication, thereby controlling the operation of the balancing motor 1300.

The communication in a wireless manner can be achieved by means of Bluetooth, infrared, WIFI (Wireless Fidelity), ZigBee, etc. or a combination of several methods to achieve the wireless communication, which is not specifically limited herein.

In some exemplary embodiments, the gimbal 1000 may communicate with the balancing motor 1300 via wired and/or wireless means. In this way, the gimbal 1000 may communicate with the balancing motor 1300 in different ways.

Specifically, in some exemplary embodiments, the gimbal 1000 may communicate with the balancing motor 1300 in a wired method. The wired method may be achieved, for example, by using additional data lines (data lines include but not limited to USB data lines, TYPE-C data lines, and LIGHTENING data lines), or by setting corresponding conductive contacts. In some exemplary embodiments, the gimbal 1000 may communicate with the balancing motor 1300 in a wireless manner, and for the wireless communication, reference may be made to the relevant descriptions above. In some exemplary embodiments, the gimbal 1000 may communicate with the balancing motor 1300 via wired and wireless means.

Figure 17:
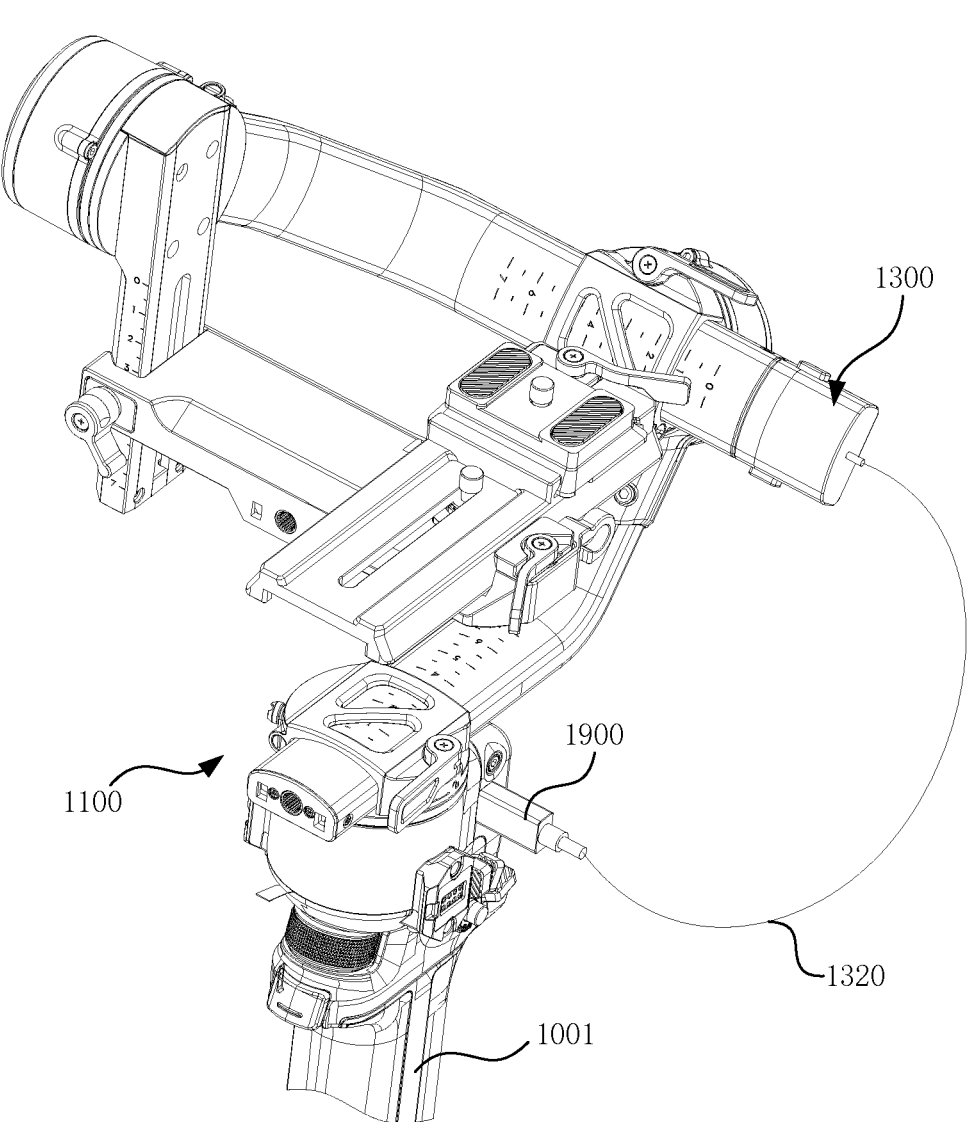
FIG. 17 is a schematic partial structural view of a gimbal according to some exemplary embodiments of the present disclosure.

With reference to FIG. 17, in some exemplary embodiments, the gimbal 1000 may also include a support mechanism 1001. The support mechanism 1001 is used to support the rotation assembly 1100. The support mechanism 1001 may be provided with a universal serial bus (USB) interface 1900 connected to the balancing motor 1300 so as to communicate with the balancing motor 1300 in a wired manner. In this way, the data transmission via the USB data cable has low cost and high reliability.

Specifically, in some exemplary embodiments, the support mechanism 1001 may be a handle of the gimbal 1000. The USB interface may be installed on one side of the handle. One end of the USB cable may be connected to the balancing motor 1300, and the other end thereof may be used to connect to the USB interface to realize the wired communication. Of course, the USB interface may also be arranged in a middle frame structure of the gimbal 1000. The middle frame structure may be located between the rotation assembly 1100 and the handle. The middle frame structure may be provided with a control unit for controlling the gimbal 1000 and/or the load 2000, and the control unit may include a controller.

In some exemplary embodiments, the gimbal 1000 may also include a knob to connected to the transmission mechanism 1103 after the balancing motor 1300 is disassembled. When the knob is rotated, the transmission mechanism 1103 drives at least part of the gimbal component 1101 to move so that the gimbal 1000 is in a balanced state in the direction adjusted by the balancing motor 1300. In this way, a manual balancing function is further added.

Specifically, when the balancing motor 1300 is damaged or the power of the balancing motor 1300 is low, or the power of the gimbal 1000 is low, or there are other needs, the knob may be used to adjust the position of at least part of the gimbal component 1101 (such as the axis arm 1070). Furthermore, without the balancing motor 1300, the balancing operation may be performed in an opposite adjustment direction.

In some exemplary embodiments, the number of rotation assemblies 1100 may be at least two, and the at least two rotation assemblies 1100 share the same balancing motor 1300. In this way, the cost of the gimbal 1000 may be reduced, the space occupied by the gimbal 1000 may be reduced, and the storage of the balancing motor 1300 may be facilitated.

Specifically, as shown in FIG. 1, the gimbal 1000 may be a three-axis gimbal, which includes three rotation assemblies 1100, namely a pitch axis assembly 1010, a roll axis assembly 1030 and a yaw axis assembly 1050. The three rotation assemblies 1100 share one balancing motor 1300. The balancing motor 1300 may be mounted to the cross arm 1015 and the vertical arm 1013 of the pitch axis assembly 1010, the axis arm 1070 of the roll axis assembly 1030, and the axis arm 1050 of the yaw axis assembly 1050 according to a first preset sequence and a second preset sequence. The axis arm 1070 realizes the balancing operation in the corresponding adjustment direction. After all the balancing operations of the gimbal 1000 are completed, the balancing motor 1300 may be stored.

With reference to FIG. 16, in some exemplary embodiments, the transmission mechanism 1103 may include a transmission part 1313. The transmission part 1313 may be fixedly connected to the gimbal component 1101. The balancing motor 1300 may be detachably connected to the transmission part 1313, or the knob is detachably connected to the transmission part 1313. In this way, with the transmission part 1313, the balancing operation may be performed with the balancing motor 1300 or the knob.

In some exemplary embodiments, the transmission part 1313 may include at least one of a screw rod, a rack, a worm gear, and a worm. In this way, the specific structure of the transmission part 1313 may be selected according to needs.

Specifically, the transmission part 1313 may include at least one of a screw rod, a rack, a worm gear, and a worm. The transmission part 1313 includes a screw rod; the transmission part 1313 includes a rack; the transmission part 1313 includes a worm gear; the transmission part 1313 includes a worm; the transmission part 1313 includes a screw rod and a rack; the transmission part 1313 includes a worm gear and a worm; the transmission part 1313 includes a screw rod, a rack and a worm gear; the transmission part 1313 includes multiple options, such as a screw rod, a rack, a worm gear, and a worm, etc., which are not exhausted herein. For the related structure and transmission principle of the transmission part 1313, reference may be made to the relevant descriptions in this disclosure, and is not repeated herein.

Figure 18:
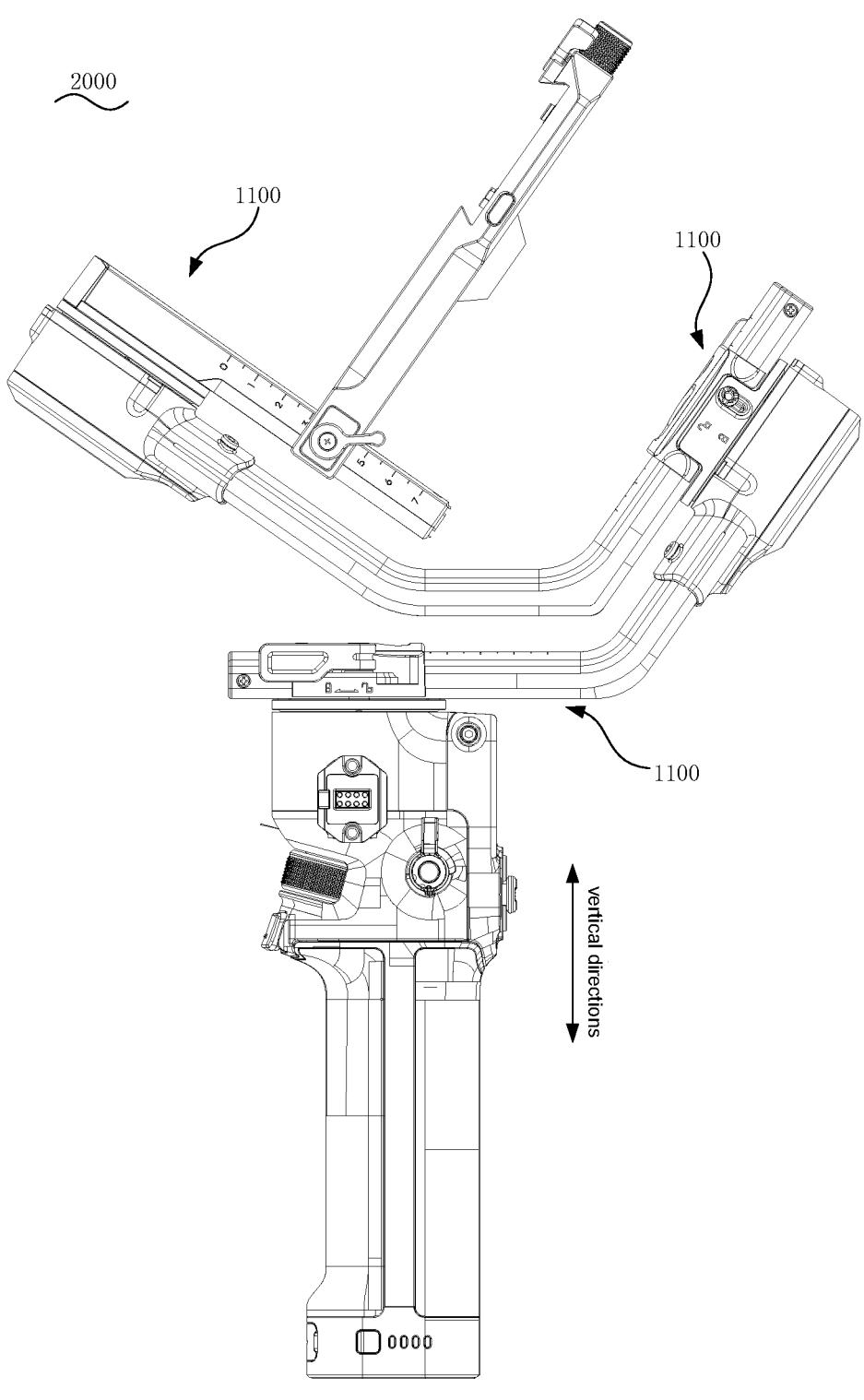
FIG. 18 is a schematic partial structural view of a gimbal according to some exemplary embodiments of the present disclosure.

With reference to FIGS. 1 and 18, according to some exemplary embodiments, this disclosure provides a gimbal 1000 control method. The gimbal 1000 includes a rotation assembly 1100 and a balancing motor 1300. The rotation assembly 1100 includes a gimbal component 1101, a transmission mechanism 1103 and a driving motor 1105. The driving motor 1105 is used to drive the gimbal component 1101 to rotate so as to adjust the attitude of the gimbal 1000. The balancing motor 1300 is used to drive at least part of the gimbal component 1101 to move via the transmission mechanism 1103, so as to adjust the center of gravity of the gimbal 1000, where the gimbal 1000 may switch back and forth between a folded state and an unfolded state. The control method may include:

Step S210: when receiving a preset instruction, control the balancing motor 1300 to drive at least part of the gimbal component 1101 to move, so that the at least part of the gimbal component 1101 is in a storage position, where the storage position is a position where the gimbal 1000 may be switched from an unfolded state to a folded state.

In the above control method, by controlling the balancing motor 1300 to drive the at least part of the gimbal component 1101 to move, the at least part of the gimbal component 1101 may be in the storage position. This may prevent the at least part of the gimbal component 1101 from physically interfering with other structures or components of the gimbal 1000 when the gimbal 1000 is switched from the unfolded state to the folded state, and ensures that the state switching of the gimbal 1000 is completed.

The control method of this disclosure may be implemented by the gimbal 1000 of this disclosure. Specifically, with reference to FIGS. 1 and 18, the gimbal 1000 may be configured to, after receiving a preset instruction, control the balancing motor 1300 to drive at least part of the gimbal component 1101 to move to make the at least part of the gimbal component 1101 in a storage position. Specifically, the controller 1517 of the gimbal 1000 may be configured to, after receiving a preset instruction, control the balancing motor 1300 to drive at least part of the gimbal component 1101 to move to make the at least part of the gimbal component 1101 in a storage position.

Usually, the gimbal 1000 is in an unfolded state before the balancing operation is performed on the gimbal 1000. The same gimbal 1000 may be installed with different loads 2000, or have different operating requirements. When installing different loads 2000, when the gimbal 1000 is in a balanced state in the direction adjusted by the balancing motor 1300, at least part of the gimbal component 1101, such as the axis arm 1070, may have different positions. That is to say, in the unfolded state, the position of the axis arm 1070 may be different for different loads 2000, and/or different for different operational requirements.

When the gimbal 1000 is in a balanced state in the direction adjusted by the balancing motor 1300, a user may use the gimbal 1000 normally. After finishing using the gimbal 1000, the user may need to fold the gimbal 1000 for storage and transportation. However, the position of the axis arm 1070 may cause physical interference with other structures or components of the gimbal 1000 when the gimbal 1000 is switched from the unfolded state to the folded state, so that the state cannot be switched smoothly.

Therefore, if a preset command is received, the balancing motor 1300 may be controlled to drive at least part of the gimbal component 1101 to move to make the at least part of the gimbal component 1101 in a storage position, so that the gimbal 1000 can be folded smoothly.

The preset instruction may be a shutdown instruction, a folding instruction, or a sleep instruction, etc. for the gimbal 1000, which is not specifically limited herein. The preset instruction may be associated with the action that the at least part of the gimbal component 1101 is in the storage position. The preset instruction may be input by the user, or automatically triggered by the gimbal 1000 when a default trigger condition is met.

The storage position may be set according to the configuration of the gimbal 1000, so that when the gimbal 1000 is switched from the unfolded state to the folded state, it is preferable that no physical interference occurs to the structure or components of the gimbal 1000. Whether the storage position is reached may be pre-calibrated by corresponding means. For example, it may be realized by a detection part. In some exemplary embodiments, the detection part may include a Hall sensor and a magnetic part. The hall sensor may be arranged on one of the fixed part and the rotation part of the balancing motor 1300, and the magnetic part may be arranged on the other of the fixed part and the rotation part of the balancing motor 1300. The number of times the Hall sensor detects that the magnetic part passes the Hall sensor may be used to pre-associate the storage position. In some exemplary embodiments, the detection part may include a light emitter and a light receiver. When the axis arm 1070 is in the storage position, the light emitter and the light receiver may face each other. The storage position is pre-associated with an output light intensity signal of the light receiver. In some exemplary embodiments, the storage position is pre-associated by the rotation angle of the balancing motor 1300. For example, a zero point of the rotation angle of balancing motor 1300 may be set. When in the storage position, the rotation angle of the balancing motor 1300 relative to the zero point is pre-associated with the storage position. It can be understood that this disclosure is not limited to the detection means described above.

In some exemplary embodiments, the control method may include:

Step S220: when the at least part of the gimbal component 1101 is in the storage position, control the driving motor 1105 to drive the at least part of the gimbal component 1101 to rotate, so that the gimbal 1000 is switched to a folded state.

The control method of this disclosure may be implemented by the gimbal 1000 of this disclosure. Specifically, with reference to FIGS. 1 and 18, the gimbal 1000 may be configured to, when the at least part of the gimbal component 1101 is in the storage position, control the driving motor 1105 to drive the at least part of the gimbal component 1101 to rotate, so that the gimbal 1000 is switched to a folded state. Specifically, the controller 1517 of the gimbal 1000 may be configured to, when the at least part of the gimbal component 1101 is in the storage position, control the driving motor 1105 to drive the at least part of the gimbal component 1101 to rotate, so that the gimbal 1000 is switched to a folded state.

In this way, the switching to the folded state of the gimbal 1000 may be easily completed.

Specifically, as shown in FIGS. 1 and 18, the gimbal 1000 may be a three-axis gimbal, which includes three rotation assemblies 1100, namely a pitch axis assembly 1010, a roll axis assembly 1030 and a yaw axis assembly 1050. The at least part of gimbal component 1101 may include the axis arms 1070 of pitch axis assembly 1010, the roll axis assembly 1030, and the yaw axis assembly 1050. When each axis arm 1070 is in the storage position, the driving motors 1105 of the pitch axis assembly 1010, the roll axis assembly 1030 and the yaw axis assembly 1050 may be controlled to drive the axis arms 1070 to rotate, so that the gimbal 1000 is switched to the folded state.

When the gimbal 1000 is in the folded state, the vertical orthographic projections of the axis arms 1070 of the pitch axis assembly 1010, the roll axis assembly 1030 and the yaw axis assembly 1050 are substantially coincident.

In some exemplary embodiments, the Step S220 may include:

When at least part of the gimbal component 1101 is in the storage position and it is determined that the load 2000 has been removed from the gimbal 1000, control the driving motor 1105 to drive the gimbal component 1101 to rotate. In this way, it is possible to prevent the load 2000 from interfering with the folding when the gimbal 1000 is switched to the folded state, thereby ensuring smooth switching to the folded state.

After the gimbal 1000 is powered on, the performance of the gimbal 1000 with and without the load 2000 may be different. In general, the gimbal 1000 may have at least two sets of preset control parameters, and different sets of preset control parameters may be used for adapting to different types of load 2000, so as to achieve better control of load 2000. The control parameters may include driving motor 1105 force, strength, filter cutoff frequency, and the like. When there is a mismatch between the control parameters of the gimbal 1000 and the mounted load 2000, the control performance of gimbal may be undesirable. When the gimbal 1000 is not mounted with the load 2000, the gimbal 1000 may be in a no-load state, in addition, the center of gravity of the gimbal 1000 may change, thus the original control parameters may not be able to adapt to the current gimbal 1000. Specifically, the gimbal 1000 may shake.

Specifically, based on the above mentioned shaking phenomenon and the judgment on whether the gimbal 1000 is in a balanced state in the corresponding adjustment direction, it may be determined whether the gimbal 1000 is in a no-load state or the control parameters do not match due to the replacement of a different load 2000. In this way, after determining that the gimbal 1000 is in the no-load state, related operations may be performed with the gimbal 1000 to make it enter the folded state. It can avoid structural interference between the load 2000 and the gimbal 1000 during the folding process of the gimbal 1000, facilitate smooth switching to the folded state, and avoid damage to the load 2000 caused by collision with the gimbal 1000.

The control method of this disclosure may be implemented by the gimbal 1000 of this disclosure. Specifically, with reference to FIGS. 1 and 18, the gimbal 1000 may be configured to, when at least part of the gimbal component 1101 is in the storage position and it is determined that the load 2000 has been removed from the gimbal 1000, control the driving motor 1105 to drive the gimbal component 1101 to rotate. Specifically, the controller 1517 of the gimbal 1000 may be configured to, when at least part of the gimbal component 1101 is in the storage position and it is determined that the load 2000 has been removed from the gimbal 1000, control the driving motor 1105 to drive the gimbal component 1101 to rotate.

Specifically, in some exemplary embodiments, the load 2000 is mounted on the cross arm 1015 of the pitch axis assembly 1010 via the load fixing plate 1011. Before switching to the folded state, the load 2000 and the load fixing plate 1011 need to be disassembled, as shown in FIGS. 1 and 18, so as to ensure that the gimbal 1000 may fold smoothly.

With reference to FIGS. 6 to 9, in some exemplary embodiments, the gimbal 1000 may include a motor locking structure 1600. The motor locking structure 1600 may selectively lock and unlock the rotation part of the driving motor 1105, so that the rotation part of the driving motor 1105 remains fixed or may rotate relative to the fixed part of the driving motor 1105. The control method may include:

When the gimbal 1000 is in a folded state, control the motor locking structure 1600 to lock the rotation part of the driving motor 1105 so that the rotation part of the driving motor 1105 remains fixed relative to the fixed part of the driving motor 1105.

The control method of this disclosure may be implemented by the gimbal 1000 of this disclosure. Specifically, with reference to FIGS. 1 and 18, the gimbal 1000 may be configured to, when the gimbal 1000 is in a folded state, control the motor locking structure 1600 to lock the rotation part of the driving motor 1105 so that the rotation part of the driving motor 1105 remains fixed relative to the fixed part of the driving motor 1105. Specifically, the controller 1517 of the gimbal 1000 may be configured to, when the gimbal 1000 is in a folded state, control the motor locking structure 1600 to lock the rotation part of the driving motor 1105 so that the rotation part of the driving motor 1105 remains fixed relative to the fixed part of the driving motor 1105.

In this way, when the gimbal 1000 is in the folded state, the rotation part of the driving motor 1105 may be prevented from accidentally rotating to make the gimbal 1000 out of the folded state, which may cause the gimbal 1000 to be damaged or inconvenient to store.

In one example, the rotation part of the driving motor 1105 may include a rotor 1106 and the fixed part of the driving motor 1105 may include a stator 1107. When the gimbal 1000 is in the folded state, it may be necessary to transport or store the gimbal 1000. In this regard, the motor locking structure 1600 may lock the rotor 1106 of the driving motor 1105, so that the rotor 1106 of the driving motor 1105 remains fixed relative to the stator 1107 of the driving motor 1105. In this way, the gimbal 1000 may be easily stored or transported. This may keep the gimbal 1000 in the folded state to avoid accidental damage to the gimbal 1000.

For the specific description of the motor locking structure 1600, reference may be made to the previous related description, and will not be described further in detail herein.

In some exemplary embodiments, the motor locking structure 1600 may include multiple ones, and one rotation assembly 1100 corresponds to at least one motor locking structure 1600. In this way, the rotation part of the driving motor 1105 of each rotation assembly 1100 may be locked.

Specifically, in some exemplary embodiments, the gimbal 1000 may be a three-axis gimbal, including three rotation assemblies 1100, and each rotation assembly 1100 corresponds to a motor locking structure 1600 to lock the rotation part of the corresponding driving motor 1105.

With reference to FIG. 1, in some exemplary embodiments, the gimbal component 1101 may include a load fixing plate 1011, a first part, and a second part. The load fixing plate 1011 is used to mount the load 2000. The first part is connected to the rotation part of the driving motor 1105. The second part is connected to the first part and is used for movably connecting the load fixing plate 1011 via the locking structure 1500. The balancing motor 1300 is installed on the second part to drive the load fixing plate 1011 to move relative to the second part via the transmission mechanism 1103, and the length extending direction of the load fixing plate 1011 is different from that of the second part. The control method may also include:

When the gimbal 1000 is in the folded state, control the locking structure 1500 to unlock the load fixing plate 1011 or control the gimbal 1000 to issue a prompt to unlock the load fixing plate 1011, so that the load fixing plate 1011 may be disassembled from the second part.

The control method of this disclosure may be implemented by the gimbal 1000 of this disclosure. Specifically, with reference to FIGS. 1 and 18, the gimbal 1000 may be configured to, when the gimbal 1000 is in the folded state, control the locking structure 1500 to unlock the load fixing plate 1011 or control the gimbal 1000 to issue a prompt to unlock the load fixing plate 1011, so that the load fixing plate 1011 may be disassembled from the second part. Specifically, the controller 1517 of the gimbal 1000 may be configured to, when the gimbal 1000 is in the folded state, control the locking structure 1500 to unlock the load fixing plate 1011 or control the gimbal 1000 to issue a prompt to unlock the load fixing plate 1011, so that the load fixing plate 1011 may be disassembled from the second part.

In this way, the space occupation and weight of the folded state of the gimbal 1000 may be reduced, and operations such as storage and transportation of the gimbal 1000 may be more convenient.

Specifically, in some exemplary embodiments, the first part is the vertical arm 1013 of the pitch axis assembly 1010, the second part is the cross arm 1015 of the pitch axis assembly 1010, and the load 2000 is mounted on the cross arm 1015 via the load fixing plate 1011. When the gimbal 1000 is in the folded state, the locking structure 1500 is controlled to unlock the load fixing plate 1011 or the gimbal 1000 is controlled to issue a prompt to unlock the load fixing plate 1011, so that the load fixing plate 1011 may be disassembled from the cross arm 1015.

The locking structure 1500 may be a manual locking structure 1500, an automatic locking structure, or a combination of the manual locking structure 1500 and an automatic locking structure. For the locking structure 1500, reference may be made to the relevant descriptions in this disclosure, and will not be repeated herein. The prompt may be a sound and light prompt issued by the gimbal 1000. Alternatively, the gimbal 1000 may send a prompt to a preset terminal, and the preset terminal may issue a sound and light prompt. In this way, the user may manually operate the manual locking structure 1500 to lock or unlock the load fixing plate 1011 according to the prompt.

In some exemplary embodiments, the length extension direction of the load fixing plate 1011 is perpendicular to the length extension direction of the second part. It can be understood that, in some exemplary embodiments, the length extension direction of the load fixing plate 1011 and the length extension direction of the second part may be in a relationship different than the vertical relationship.

In some exemplary embodiments, the control method may also include:

When the gimbal 1000 is in the folded state, control the gimbal 1000 to enter a preset state. In this way, the working state of the gimbal 1000 may be matched with the folded state.

Specifically, when the gimbal 1000 is in the folded state, the gimbal 1000 is usually in an unused state. Thus, if the gimbal 1000 is still running, it may cause waste of power to the gimbal 1000 or other problems that may cause damage to the gimbal 1000.

Further, the preset state may include a sleep state or a power-off state. The sleep state may make the gimbal 1000 in a power-saving state, and it may also wake up the gimbal 1000 quickly. The power-off state may make the gimbal 1000 in a more power-saving state, which is suitable for long-term storage and transportation operations.

In some exemplary embodiments, the preset instruction is a shutdown instruction, and the control method may also include:

When receiving a shutdown instruction, control the gimbal 1000 to power off after a certain interval, or When receiving a shutdown instruction, keep powering the electrical components related to the balancing operation and power off other electrical components, and control the electrical components related to the balancing operation to be powered off after a certain period of time.

The control method of this disclosure may be implemented by the gimbal 1000 of this disclosure. Specifically, with reference to FIGS. 1 and 18, the gimbal 1000 may be configured to, when receiving a shutdown instruction, control the gimbal 1000 to power off after a certain interval, or when receiving a shutdown instruction, keep powering the electrical components related to the balancing operation and power off other electrical components, and control the electrical components related to the balancing operation to be powered off after a certain period of time. Specifically, the controller 1517 of the gimbal 1000 may be configured to, when receiving a shutdown instruction, control the gimbal 1000 to power off after a certain interval, or when receiving a shutdown instruction, keep powering the electrical components related to the balancing operation and power off other electrical components, and control the electrical components related to the balancing operation to be powered off after a certain period of time.

In this way, there is time for the balancing motor 1300 to drive at least part of the gimbal component 1101 to the storage position.

Specifically, the certain period of time may be calibrated and stored in advance. Specifically, the certain period of time may be determined by the time interval between when the shutdown instruction is received and when the gimbal 1000 switches to the folded state.

The electrical components related to the balancing operation may include, but are not limited to, the balancing motor 1300, the controller 1517 for controlling the operation of the balancing motor 1300, the electronic governor, and related circuit boards, etc.

With reference to FIG. 1, in some exemplary embodiments, the gimbal 1000 may include at least two rotation assemblies 1100. At least some of the gimbal components 1101 in each rotation assembly 1100 may be synchronously driven, so that at least some of the gimbal components 1101 in each rotation assembly 1100 may be in the storage position. In this way, the time it takes for the gimbal 1000 to switch to the folded state may be reduced, and user experience may be improved.

Specifically, with reference to FIGS. 1 and 18, the gimbal 1000 may be a three-axis gimbal, which includes three rotation assemblies 1100, namely a pitch axis assembly 1010, a roll axis assembly 1030 and a yaw axis assembly 1050. At least part of gimbal component 1101 may include the axis arms 1070 of pitch axis assembly 1010, the roll axis assembly 1030, and the yaw axis assembly 1050. In the case of receiving a preset instruction, each axis arm 1070 may be driven synchronously, so that each axis arm 1070 is in the storage position. Furthermore, the time for driving each axis arm 1070 to the storage position is reduced, and the time for switching the gimbal 1000 to the folded state is also reduced.

In some exemplary embodiments, the Step S210 may include:

When a preset instruction is received and it is determined that the load 2000 has been removed from the gimbal 1000, control the balancing motor 1300 to drive at least part of the gimbal component 1101 to move.

The control method of this disclosure may be implemented by the gimbal 1000 of this disclosure. Specifically, with reference to FIG. 1, the gimbal 1000 may be configured to, when a preset instruction is received and it is determined that the load 2000 has been removed from the gimbal 1000, control the balancing motor 1300 to drive at least part of the gimbal component 1101 to move. Specifically, the controller 1517 of the gimbal 1000 may be configured to, when a preset instruction is received and it is determined that the load 2000 has been removed from the gimbal 1000, control the balancing motor 1300 to drive at least part of the gimbal component 1101 to move. For the method of detecting that the load 2000 has been removed from the gimbal 1000, please refer to the relevant description in this disclosure, and will not be described in detail herein.

In this way, on the one hand, it may reduce the physical interference that may be caused by the load 2000 during the folding process. On the other hand, it may save power when driving at least part of the gimbal component 1101, thereby saving the electric energy of the gimbal 1000 or the balancing motor 1300, and ensuring the endurance performance of the gimbal 1000 or the balancing motor 1300.

In some exemplary embodiments, the controlling of the balancing motor 1300 to drive the at least part of the gimbal component 1101 to move, so that the at least part of the gimbal component 1101 is in a storage position may include:

Control the balancing motor 1300 to drive the at least part of the gimbal component 1101 to move to a limit position of a preset stroke in a seventh direction;

Control the balancing motor 1300 to drive the at least part of the gimbal component 1101 to move from the limit position to a storage position in an eighth direction, where the seventh direction is opposite to the eighth direction.

The control method of this disclosure may be implemented by the gimbal 1000 of this disclosure. Specifically, with reference to FIG. 1, the gimbal 1000 may be configured to, control the balancing motor 1300 to drive the at least part of the gimbal component 1101 to move to a limit position of a preset stroke in a seventh direction; control the balancing motor 1300 to drive the at least part of the gimbal component 1101 to move from the limit position to a storage position in an eighth direction, where the seventh direction is opposite to the eighth direction. Specifically, the controller 1517 of the gimbal 1000 may be configured to, control the balancing motor 1300 to drive the at least part of the gimbal component 1101 to move to a limit position of a preset stroke in a seventh direction; control the balancing motor 1300 to drive the at least part of the gimbal component 1101 to move from the limit position to a storage position in an eighth direction, where the seventh direction is opposite to the eighth direction.

In this way, the at least part of the gimbal component 1101 may be placed in the storage position.

Moreover, with reference to FIG. 1, when the gimbal component 1101 is the axis arm 1070 of the pitch axis component 1010, the seventh direction is an upward direction, and the eighth direction is a downward direction. With reference to FIG. 5, in the case where the gimbal component 1101 is the axis arm 1070 of the roll axis component 1030, the seventh direction is the A1 direction, and the eighth direction is the A2 direction. In the case where the gimbal component 1101 is the axis arm 1070 of the yaw axis component 1050, the seventh direction is the B1 direction, and the eighth direction is the B2 direction.

In some exemplary embodiments, the controlling of the balancing motor 1300 to drive the at least part of the gimbal component 1101 to move, so that the at least part of the gimbal component 1101 is in the storage position may include:

Obtain the current position of the at least part of the gimbal component 1101;

According to the current position, control the balancing motor 1300 to drive the at least part of the gimbal component 1101 to move, so that the at least part of the gimbal component 1101 is in the storage position.

The control method of this disclosure may be implemented by the gimbal 1000 of this disclosure. Specifically, with reference to FIGS. 1 and 18, the gimbal 1000 may be configured to, obtain the current position of the at least part of the gimbal component 1101; according to the current position, control the balancing motor 1300 to drive the at least part of the gimbal component 1101 to move, so that the at least part of the gimbal component 1101 is in the storage position. Specifically, the controller 1517 of the gimbal 1000 may be configured to, obtain the current position of the at least part of the gimbal component 1101; according to the current position, control the balancing motor 1300 to drive the at least part of the gimbal component 1101 to move, so that the at least part of the gimbal component 1101 is in the storage position.

In this way, the at least part of the gimbal component 1101 may be placed in the storage position.

Specifically, in some exemplary embodiments, the current position of the at least part of the gimbal component 1101 (such as the axis arm 1070) may be obtained based on the rotation data of the balancing motor 1300. For example, the balancing motor 1300 has a certain moving range (stroke). Two end positions corresponding to the moving range (stroke) may be pre-determined and stored. The positional relationship between the current rotational position of the balancing motor 1300 and the current position of the axis arm 1070 may also be pre-calibrated and stored. During operation, the relative positions of the current rotational position of the balancing motor 1300 and one of the two end positions may be determined by recording the rotational data of the balancing motor 1300, and then the current position of the axis arm 1070 may be determined.

Similarly, the positional relationship between the current position and the storage position of the axis arm 1070 may also be calibrated and stored in advance. During operation, the current position of the axis arm 1070 may be detected in real time, and then the storage position of the axis arm 1070 may be determined. According to the determined storage position of the axis arm 1070, the balancing motor 1300 may be controlled to drive the axis arm 1070 to the storage position.

In some exemplary embodiments, the current position includes the balance position of the gimbal 1000 in the direction adjusted by the balancing motor 1300 corresponding to the rotation assembly 1100. In this way, the current position may be quickly determined.

Specifically, at least part of the gimbal component 1101 (such as the axis arm 1070) needs to be balanced before the gimbal 1000 can be used, so as to reduce the load on the driving motor 1105 and improve the service life of the driving motor 1105. After the balancing operation is completed, the gimbal 1000 is in a balanced state in the direction adjusted by the balancing motor 1300. That is, the axis arm 1070 regulated by the balancing motor 1300 is in a balance position. In this case, the balance position of the axis arm 1070 is recorded as the current position of the axis arm 1070, so that the axis arm 1070 can be quickly driven to the storage position.

In some exemplary embodiments, the load 2000 carried by the gimbal 1000 may include a photographing device (camera). The current position may include the position where at least part of the gimbal component 1101 is located when the center of rotation of the photographing device rotated around a preset rotation axis coincides with the center of a captured image.

In this way, the current position may be quickly determined.

Specifically, the payload 2000 may be a photographing device. The gimbal 1000 may have a rotation photographing mode, that is, it may rotate and photograph around a corresponding rotation axis, for example, a yaw axis or a roll axis. Since the load 2000 is installed after the gimbal 1000, and the gimbal 1000 may have certain balancing operation, it is possible that after balancing, the rotation center of the photographing device rotating around the preset rotation axis may deviate from the center of the image, resulting in a poor rotation photographing effect. Based on this, after the gimbal 1000 is balanced, the balancing effect of the gimbal 1000 may be sacrificed a little, so that an error between the rotation center and the center of the image is smaller than an error threshold, so as to achieve a better photographing effect.

In some exemplary embodiments, the error between the rotation center and the center of the image is less than an error threshold, at least part of the gimbal component 1101 may be driven to move by the balancing motor 1300, so as to adjust the components of the above error in the horizontal direction and the vertical direction of the image.

It can be seen from this that in some exemplary embodiments, balancing is more important than photographing effect. Specifically, it means that for the tradeoff between the "balancing" of the gimbal 1000 and the improvement of the photographing effect, the "balancing" of the gimbal 1000 is more important. That is, it is not allowed to adjust the mounting position of the photographing device on the gimbal 1000 by sacrificing the balancing effect. Therefore, the mounting position of the photographing device on the gimbal 1000 is not allowed to be adjusted after the balancing operation. In some exemplary embodiments, the photographing effect is more important than balancing. Specifically, it means that for the tradeoff between the "balancing" of the gimbal 1000 and the improvement of the photographing effect, it is more important to improve the photographing effect. It allows adjusting the mounting position of the photographing device on the gimbal 1000 by sacrificing the balancing effect. Thus, the mounting position of the photographing device on the gimbal 1000 may be adjusted after the balancing operation.

Thus, in practical applications, in addition to the balancing position described above, the current position of at least part of the gimbal component 1101 may also be the case that the current position includes the position where the photographing device is located when the rotation center of the photographing device rotating around a preset rotation axis coincides with the center of the captured image. The method for determining the current location needs to be determined in conjunction with specific application scenarios of the gimbal 1000.

With reference to FIGS. 1 and 18, in some exemplary embodiments, the gimbal 1000 may include multiple rotation assemblies 1100. When the gimbal 1000 is in a folded state, multiple gimbal components 1101 of the rotation assemblies 1100 may be arranged and distributed along one direction. In this way, the space occupied by the gimbal 1000 in the folded state of may be reduced.

Specifically, the gimbal component 1101 of the rotation assembly 1100 may include the axis arm 1070 of the rotation assembly 1100. The gimbal 1000 may be a three-axis gimbal. When the gimbal 1000 is in the folded state, the axis arms 1070 of the three rotation assemblies 1100 may be arranged and distributed along one direction, which may reduce the space occupied by the gimbal 1000 in the folded state.

As shown in FIG. 12, in some exemplary embodiments, the axis arms 1070 of the three rotation assembly 1100 may be arranged and distributed along a vertical direction, from top to bottom, they are the axis arm 1070 of the pitch axis assembly 1010, the axis arm 1070 of the roll axis assembly 1030 and the axis arm of the yaw axis assembly 1050 1070. It can be understood that, in some exemplary embodiments, the axis arm 1070 of the pitch axis assembly 1010, the axis arm 1070 of the roll axis assembly 1030 and the axis arm 1070 of the yaw axis assembly 1050 may also be arranged in other ways, which are not limited herein.

With reference to FIGS. 1 to 3, according to some exemplary embodiments, a gimbal 1000 balancing method provided is provided. The gimbal 1000 includes a rotation assembly 1100 and a balancing motor 1300. The rotation assembly 1100 includes a gimbal component 1101, a transmission mechanism 1103 and a driving motor 1105. The driving motor 1105 is used to drive the gimbal component 1101 to rotate so as to realize an attitude adjustment of the gimbal 1000. The balancing motor 1300 is used to drive at least part of the gimbal component 1101 to move via the transmission mechanism 1103, so as to adjust the center of gravity of the gimbal 1000. With reference to FIG. 19, the balancing method may include:

Step S310: control the gimbal 1000 to rotate around a preset rotation axis;

Step S320: obtain state information of the gimbal 1000 during rotation;

Step S330: if the state information indicates that the gimbal 1000 is in an unbalanced state in the direction adjusted by the balancing motor 1300, control the operation of the balancing motor 1300 so that the gimbal 1000 is in a balanced state in the direction adjusted by the balancing motor 1300.

The balancing method of this disclosure may be implemented by the gimbal 1000 of this disclosure. Specifically, with reference to FIG. 1, the gimbal 1000 may include a controller 1517, and the controller 1517 may be configured to control the gimbal 1000 to rotate around a preset rotation axis; obtain state information of the gimbal 1000 during rotation; and if the state information indicates that the gimbal 1000 is in an unbalanced state in the direction adjusted by the balancing motor 1300, control the operation of the balancing motor 1300 so that the gimbal 1000 is in a balanced state in the direction adjusted by the balancing motor 1300.

The above-mentioned balancing method and the gimbal 1000 may adjust the center of gravity of the gimbal 1000 via the balancing motor 1300, so that the gimbal 1000 may automatically adjust the balance. Thus, manual adjustment is not required, the operation is convenient, and the accuracy can be improved.

Specifically, the gimbal 1000 may include at least one rotation assembly 1100. Each rotation assembly 1100 may include at least one driving motor 1105. The driving motor 1105 may drive the corresponding gimbal component 1101 to rotate around a corresponding rotation axis, such as the yaw axis, the pitch axis, or the roll axis. Each rotation assembly 1100 may correspond to at least one adjustment direction. As driven by the balancing motor 1300, at least part of the gimbal component 1101 may move, so that the gimbal 1000 may achieve a balanced state in a corresponding adjusted direction. For a rotation assembly 1100, the driving motor 1105 may drive the corresponding gimbal component 1101 to rotate around a preset rotation axis. Whether the gimbal 1000 is in a balanced state in the corresponding adjustment direction may result in changes in the state information collected by the gimbal 1000. Thus, according to the state information of the gimbal 1000, it may be determined whether the gimbal 1000 is in a balanced state in the corresponding adjustment direction, and the corresponding automatic balancing operation may be performed if necessary.

It can be understood that the aforementioned state information may include, but is not limited to, the aforementioned first electrical signal parameter. The specific implementation principle of this part may be the same as that of the above-mentioned implementation, and will not be repeated herein. It should be noted that this part may also be combined with the foregoing second electrical signal parameter to implement a combined automatic balancing method.

It can be understood that the above-mentioned balancing operation of the gimbal 1000 may be automatically triggered by the gimbal 1000. For example, it may be triggered after detecting that the load 2000 is replaced, or it may be triggered by a user, and the specific triggering method is not limited herein.

With reference to FIGS. 1 to 4, a gimbal 1000 is provided. It may include a rotation assembly 1100, a balancing motor 1300, and a locking structure 1500. The rotation assembly 1100 may include a gimbal component 1101, a transmission mechanism 1103 and a driving motor 1105. The driving motor 1105 is used to drive the gimbal component 1101 to rotate to realize the attitude adjustment of the gimbal 1000. The balancing motor 1300 is used to drive at least part of the gimbal component 1101 to move via the transmission mechanism 1103 so as to adjust the center of gravity of the gimbal 1000. The locking structure 1500 is used to lock the at least part of the gimbal component 1101 corresponding to the adjusted direction when the gimbal 1000 completes the balancing operation in the direction adjusted by the balancing motor 1300 and does not receive an input operation from the user.

In the above-mentioned gimbal 1000, when the balancing operation on the gimbal 1000 in the direction adjusted by the balancing motor 1300 is completed and no user input operation is received, the at least part of the gimbal component 1101 corresponding to the adjusted direction may be locked. It keeps the gimbal 1000 in a balanced state in the direction adjusted by the balancing motor 1300, reduces the load on the driving motor 1105, and is beneficial to prolonging the service life of the gimbal 1000.

Specifically, when the locking structure 1500 is an automatic locking structure (that is, capable of selectively automatically locking and automatically unlocking the at least part of the gimbal component 1101 according to electrical signals), the user's input operations may include, but are not limited to, electrical signals triggered by buttons, joysticks, dials and other physical controls, touch operations, voice operations, gesture operations, etc. Thus, at least part of the gimbal component 1101 corresponds to the direction in which the locking structure 1500 may be adjusted based on the electrical signal. The automatic locking structure may include, but is not limited to, the locking part 1609 and the locking controller mentioned previously.

When the locking structure 1500 is a mechanical self-locking structure, the user's input operation may include, but is not limited to, a manual operation on any mechanical component of the locking structure 1500 or a mechanical component linked with any component of the locking structure 1500.

That is, after the balancing operation is completed, the locking structure 1500 may automatically lock at least part of the corresponding gimbal component 1101 without user intervention. The mechanical self-locking structure may include, but is not limited to, the friction pad mentioned previously.

It can be understood that, in some exemplary embodiments, the locking structure 1500 may also be a combination of an automatic locking structure and a mechanical self-locking structure, so that the mechanical self-locking structure may be used as a backup locking method or the automatic locking structure may be used as a backup locking method.

It should be pointed out that the above-mentioned descriptions and beneficial effects of the control method and the gimbal 1000 may be applicable to the gimbal 1000 in this part, which is not further described in detail herein.

In some exemplary embodiments, the locking structure 1500 may be configured to automatically lock the gimbal component 1101 when receiving the electrical signal that the gimbal 1000 is in a balanced state in the direction adjusted by the balancing motor 1300, and automatically unlock the gimbal component 1101 when receiving an electric signal to start the balancing operation for the gimbal 1000 in the direction adjusted by the balancing motor 1300. In this way, automatic locking and automatic unlocking of the locking structure 1500 may be realized, which is convenient for users to use.

Specifically, the above-mentioned electric signal may be a signal that can be inputted by the user in the operation area of the gimbal 1000, or by voice input, or a signal that can be inputted by the user may with a preset terminal communicating with the gimbal 1000, or a signal that can be automatically triggered by the gimbal 1000 when it is in a balanced state in the direction adjusted by balancing motor 1300.

With reference to FIGS. 6 to 9, in some exemplary embodiments, the locking structure 1500 may include a locking motor 1601 connected to a locking part 1609. The locking motor 1601 may be configured to drive the locking part 1609 so that the locking part 1609 may lock the axis arm 1070 or unlock the axis arm 1070.

With reference to FIG. 1, in some exemplary embodiments, the gimbal 1000 may include a controller 1517, and the controller 1517 may be configured to control the locking motor 1601 to drive the locking part 1609 so that the locking part 1609 locks the axis arm 1070 when receiving the electrical signal that the gimbal 1000 is in a balanced state in the direction adjusted by the balancing motor 1300, or control the locking motor 1601 to drive the locking part 1609 so that the locking part 1609 unlocks the axis arm 1070 when receiving the electrical signal that the gimbal 1000 starts a balancing operation. In this way, the locking structure 1500 may be controlled to unlock or lock the axis arm 1070.

It should be noted that in some exemplary embodiments, the controller 1517 of the gimbal 1000 and the locking controller described above may be two separate controllers. The controller 1517 of the gimbal may communicate with the locking controller so as to realize corresponding control functions or operations. In some exemplary embodiments, the controller 1517 of the gimbal 1000 may realize the function of the locking controller described above. That is to say, the controller 1517 of the gimbal 1000 may also realize the function of a locking controller in addition to its other functions. In some exemplary embodiments, the locking controller may realize the function of the controller 1517 of the gimbal 1000. That is to say, the locking controller may realize the function of the controller 1517 of the gimbal 1000 in addition to its own functions. Of course, this disclosure may also include other implementations, and is not limited to the relationship between the controller 1517 of the gimbal 1000 and the locking controller mentioned above. Moreover, in some exemplary embodiments, the controller 1517 and/or the locking controller of the gimbal 1000 may be an integrated chip or an integrated circuit board including a processor, a memory, etc., or a control device, a control apparatus, and the like. The position of the locking controller may be arranged by referring to the position of the controller 1517 of the gimbal, which is not specifically limited herein.

With reference to FIGS. 1-4, a gimbal 1000 provided in this disclosure may include a rotation assembly 1100, and the rotation assembly 1100 may include a gimbal component 1101, a transmission mechanism 1103 and a driving motor 1105. The driving motor 1105 may be configured to drive the gimbal component 1101 to rotate so as to realize the attitude adjustment of the gimbal 1000. The transmission mechanism 1103 may be configured to detachably connect to the balancing motor 1300. The balancing motor 1300 may be configured to drive at least part of the gimbal component 1101 to move so as to adjust the center of gravity of the gimbal 1000. In addition, before the gimbal 1000 performs the balancing operation, the balancing motor 1300 may be installed on the gimbal 1000, and may be electrically connected to the gimbal 1000 via a cable 1320. After the gimbal 1000 completes the balancing operation, the balancing motor 1300 and the cables 1320 may be removed from the gimbal 1000.

In the above process, the balancing operation is to adjust the center of gravity of the gimbal 1000.

For the gimbal 100 according to some exemplary embodiments, the transmission mechanism 1103 may be detachably connected to the balancing motor 1300. In this way, after the balancing operation of the balancing motor 1300 for the gimbal 1000 is completed, the balancing motor 1300 and the cable 1320 may be removed from the gimbal 1000. This may prevent the cable 1320 from entangling the gimbal when the gimbal is working or stored, thereby avoiding unnecessary damage to the gimbal 1000, balancing motor 1300, or the cable 1320.

The balancing motor 1300 may be electrically connected to the gimbal 1000 via the cable 1320, and may realize corresponding electrical signal transmission and/or power transmission to implement corresponding operations, including but not limited to, balancing operations, switching operations of folding states, and the like. Electrical signal transmission includes but is not limited to one-way or two-way transmission of control signals, one-way or two-way transmission of state signals, etc. The power transmission may include gimbal supplying power to the balancing motor 1300, or the balancing motor 1300 may have its own battery. When the power of the gimbal is less than a preset power level, the balancing motor 1300 may supply power to the gimbal. The cable may include, but is not limited to, a USB data cable, a TYPE-C data cable, a LIGHTENING data cable, a coaxial cable, etc., as long as the cable can perform data transmission and/or power transmission, and is not specifically limited herein.

It should be pointed out that the above-mentioned description and beneficial effects of the control method and the implementation of the gimbal 1000 may be applicable to the gimbal 1000 herein, which will not be repeated again.

It can be understood that when the above control method is applied to the gimbal 1000 described here, the balancing motor 1300 may not be included in the gimbal 1000, so that the gimbal 1000 not including the balancing motor 1300 may be regarded as a product.

With reference to FIGS. 1 to 4 and 10, a balancing motor 1300 provided in this disclosure may be used for a gimbal 1000. The gimbal 1000 may include a rotation assembly 1100. The rotation assembly 1100 may include a gimbal component 1101, a transmission mechanism 1103 and a driving motor 1105. The driving motor 1105 may be used to drive the gimbal component 1101 to rotate so as to realize the attitude adjustment of the gimbal 1000. The balancing motor 1300 may include a motor body 1301 and a connecting piece 1730. The connection part 1730 may be connected to the motor body 1301. The motor body 1301 may be detachably connect to the transmission mechanism 1103 via a connection part 1730, and may be used to drive at least part of the gimbal component 1101 to move when it is installed on the transmission mechanism 1103 so as to adjust the center of gravity of the gimbal 1000. Before the gimbal 1000 performs a balancing operation, the balancing motor 1300 may be installed on the gimbal 1000, and may be electrically connected to the gimbal 1000 via a cable 1320. After the gimbal 1000 completes the balancing operation, the balancing motor 1300 and the cable 1320 may be removed from the gimbal 1000.

Specifically, the motor body 1301 of the balancing motor 1300 may be a fixed part of the balancing motor 1300. The connection part 1730 may include an output shaft 1305 of the balancing motor 1300, or the output shaft 1305 of the balancing motor 1300 and a connection part on the output shaft 1305. The connection part may be an element coupling the output shaft 1305 and the transmission mechanism 1103, such as a D-shape or a non-circular column part. The transmission mechanism 1103 may include a screw rod 1710. One end of the screw rod 1710 may be provided with a connection hole. The shape of the connection hole matches the shape of the output shaft 1305 or the connection part, so that the output shaft 1305 or the connection part may be inserted into the connection hole, which may prevent the relative rotation between the output shaft 1305 of the balancing motor 1300 and the screw rod 1710. Of course, the transmission mechanism 1103 may also include other connection elements, and the other connection elements may connect the connection part with other elements of the transmission mechanism 1103.

It should be pointed out that the above descriptions and beneficial effects of the control method, the gimbal 1000 and the balancing motor 1300 may be applicable to the balancing motor 1300 described herein, which will not be further described herein to avoid redundancy.

With reference to FIGS. 1 to 3 and 5, a gimbal assembly 3000 provided in this disclosure may include a gimbal 1000 and a balancing motor 1300. The gimbal 1000 may include a rotation assembly 1100. The rotation assembly 1100 may include a gimbal component 1101, a transmission mechanism 1103 and a driving motor 1105. The driving motor 1105 may be used to drive the gimbal component 1101 to rotate so as to realize the attitude adjustment of the gimbal 1000. The balancing motor 1300 may include a motor body 1301 and a connection part 1730. The connection part 1730 may be connected to the motor body 1301. The motor body 1301 may be detachably connect to the transmission mechanism 1103 via the connecting piece 1730, and may be used to drive at least part of the gimbal component 1101 to move when installed on the transmission mechanism 1103 so as to adjust the center of gravity of the gimbal 1000. Before the gimbal 1000 performs a balancing operation, the balancing motor 1300 may be installed on the gimbal 1000, and may be electrically connected to the gimbal 1000 via a cable 1320. After the gimbal 1000 completes the balancing operation, the balancing motor 1300 and the cable 1320 may be removed from the gimbal 1000.

It should be pointed out that the above descriptions and beneficial effects of the control method and the implementation of the gimbal 1000 may be applicable to the gimbal assembly 3000 of this disclosure. This will not be described in detail herein to avoid redundancy.

In the description of this disclosure, the terms "certain embodiments," "one embodiment," "some embodiments," "exemplary embodiments," "examples," "specific examples," or "some examples," etc. refer to that a specific feature, structure, material, or feature described in connection with such an embodiment(s) or example(s) is included in at least one embodiment or example of the disclosure. In this disclosure, schematic representations of the above terms do not necessarily refer to the same embodiment or example. Furthermore, the described specific feature, structure, material or feature may be combined in any suitable manner in any one or more embodiments or examples.

Although some exemplary embodiments of this disclosure have been shown and described above, it can be understood that the above embodiments are exemplary and should not be construed as limitations on this disclosure. A person skilled in the art may make changes, modifications, substitutions and modifications to the above-mentioned exemplary embodiments within the scope of this disclosure.

What is claimed is:

1. A balancing method for a gimbal, wherein the gimbal comprises:

at least one rotation assembly, each comprising a gimbal component, a transmission mechanism, and a driving motor, wherein the driving motor is configured to drive the gimbal component to rotate so as to adjust an attitude of the gimbal;

at least one balancing motor corresponding to the at least one rotation assembly, each balancing motor being configured to drive, via the transmission mechanism, at least part of the gimbal component to move along a balancing direction so as to adjust a center of gravity of the gimbal; and at least one locking structure corresponding to the at least one rotation assembly;

wherein each rotation assembly corresponds to one or more balancing directions, and each balancing direction corresponds to the at least one locking structure, so that the at least part of the gimbal component is allowed to move or remain fixed in a corresponding balancing direction of the one or more balancing directions;

the method comprising:

controlling at least one driving motor to rotate;

obtaining a first electric signal parameter of the at least one driving motor; and controlling the at least one balancing motor to operate based on the first electric signal parameter so as to enable the gimbal to be in a balanced state in a direction adjusted by the at least one balancing motor.

2. The balancing method according to claim 1, wherein the gimbal comprises:

at least two rotation assemblies, correspondingly comprising at least two driving motors; and at least two balancing motors corresponding to the at least two rotation assemblies, each configured to drive a corresponding at least part of the gimbal component to move along the corresponding balancing direction;

the method further comprising:

adjusting, according to a first preset sequence, the gimbal to be in the balanced state in the balancing directions adjusted by the at least two balancing motors.

3. The balancing method according to claim 2, wherein the at least two rotation assemblies comprise:

a first rotation assembly, configured to mount a load;

a second rotation assembly, connected to the first rotation assembly; and a third rotation assembly, connected to the second rotation assembly and to a support mechanism, wherein the first preset sequence comprises a sequence from the first rotation assembly, the second rotation assembly to the third rotation assembly.

4. The balancing method according to claim 2, wherein the gimbal further comprises:

a locking structure for each of the at least two rotation assemblies, wherein the locking structure is configured to lock the corresponding at least part of the gimbal component so as to fix the at least part of the gimbal component relative to a rotation part of the at least one driving motor, or unlock the corresponding at least part of the gimbal component so as to allow the at least part of the gimbal component to move relative to the rotation part of the at least one driving motor;

the method further comprising:

prior to starting a balancing operation in a first target direction of the balancing directions, locking, by the locking structure, the at least part of the gimbal component of a next rotation assembly of the at least two rotation assemblies;

and after finishing the balancing operation in the first target direction, or within a preset period of time after the starting of the balancing operation in the first target direction, prompting a user to unlock the at least part of the gimbal component of the next rotation assembly of the at least two rotation assemblies, or controlling to unlock the at least part of the gimbal component of the next rotation assembly.

5. The balancing method according to claim 4, wherein a triggering condition for performing the balancing operation in a second target direction of the balancing directions corresponding to the next rotation assembly-comprises: receiving an unlocking instruction for the at least part of the gimbal component of the next rotation assembly.

6. The balancing method according to claim 2, wherein the gimbal further comprises:

a motor locking structure for each of the at least two rotation assemblies, configured to selectively lock or unlock a rotation part of the at least two driving motors to allow the rotation part to be fixed or rotate relative to a fixed part of the at least two driving motors; and the method comprising:

after finishing a balancing operation in a first target direction of at least two balancing directions corresponding to a current one of the at least two rotation assemblies and prior to starting the balancing operation in a second target direction of the at least two balancing directions corresponding to a next rotation assembly of the at least two rotation assemblies, controlling the motor locking structure to lock the rotation part of the at least one driving motor corresponding to the current rotation assembly having finished the balancing operation.

7. The balancing method according to claim 6, further comprising: after finishing the balancing operation in all of the at least two balancing directions, controlling the motor locking structure to unlock the rotation part of the at least two driving motors having finished the balancing operation thereof.

8. The balancing method according to claim 6, wherein the rotation part of the at least one driving motor having finished a corresponding balancing operation thereof is positioned at a predetermined angle within a preset working rotation range of the gimbal.

9. The balancing method according to claim 2, further comprising:

when the gimbal is in the balanced state in at least two balancing directions, controlling the gimbal to issue a prompt for balancing completion, or controlling the gimbal to notify a preset terminal to issue a prompt for the balancing completion.

10. The balancing method according to claim 1, wherein the at least one locking structure comprises:

an accommodation part, configured to accommodate the at least part of the gimbal component, wherein at least one of the accommodation part or the gimbal component comprises a friction pad in contact with the accommodation part and the gimbal component, and the friction pad is configured to provide a frictional force for the gimbal component to lock the at least part of the gimbal component from moving when the at least one balancing motor stop driving the at least part of the gimbal component.

11. The balancing method according to claim 1, further comprising:

upon receiving a preset instruction, controlling the at least one balancing motor to drive the at least part of the gimbal component to move the at least part of the gimbal component to a storage position, wherein the storage position enables the gimbal to switch from an unfolded state to a folded state.

12. The balancing method according to claim 11, further comprising:

when the at least part of the gimbal component is in the storage position, controlling the at least one driving motor to drive the gimbal component to rotate so as to switch the gimbal component to the folded state.

13. The balancing method according to claim 12, wherein the gimbal further comprising a motor locking structure; and the method further comprising:

when the gimbal is in the folded state, controlling the motor locking structure to lock the at least part of the gimbal component.

14. The balancing method according to claim 13, further comprising:

when the gimbal is in the folded state, controlling the gimbal to turn off.

15. The balancing method according to claim 11, further comprising:

upon receiving the preset instruction, waiting for a period of time, and then controlling the gimbal to turn off; or upon receiving the preset instruction, keeping electrical components related to balancing powered and turning off electrical components unrelated to balancing, waiting for a period of time, and then controlling the electrical components related to balancing to turn off.

16. The balancing method according to claim 1, wherein the controlling of the at least one balancing motor to operate based on the first electric signal parameter comprises:

in response to a decrease of the first electric signal parameter during a rotation of the at least one driving motor, controlling the at least one balancing motor to drive corresponding at least part of the gimbal component to move along an original balancing direction;

in response to an increase of the first electric signal parameter during the rotation of the at least one driving motor, controlling the at least one balancing motor to drive the corresponding at least part of the gimbal component to move along an opposite direction of the original balancing direction; or in response to the first electric signal parameter being smaller than a preset value, controlling the at least one balancing motor to stop driving the corresponding at least part of the gimbal component.

17. The balancing method according to claim 1, wherein the controlling of the at least one balancing motor to operate comprises:

controlling the at least one balancing motor to drive the at least part of the gimbal component to move.

18. The balancing method according to claim 1, wherein the first electric signal parameter is associate with torque of the at least one driving motor.

19. A gimbal, comprising:

at least one rotation assembly, each comprising a gimbal component, a transmission mechanism and a driving motor configured to drive the gimbal component to rotate so as to adjust an attitude of the gimbal;

at least one balancing motor corresponding to the at least one rotation assembly, each balancing motor being configured to drive, via the transmission mechanism, at least part of the gimbal component to move along a balancing direction to adjust a center of gravity of the gimbal;

at least one locking structure corresponding to the at least one rotation assembly, wherein each rotation assembly corresponds to one or more balancing directions, and each balancing direction corresponds to the at least one locking structure, so that the at least part of the gimbal component is allowed to move or remain fixed in a corresponding balancing direction of the one or more balancing directions; and a controller configured to:

control at least one driving motor to rotate, obtain a first electric signal parameter of the at least one driving motor, and control the at least one balancing motor to operate based on the first electric signal parameter so as to enable the gimbal to be in a balanced state in a direction adjusted by the at least one balancing motor.

20. A balancing method for a gimbal, wherein the gimbal comprises:

at least one rotation assembly, each comprising a gimbal component, a transmission mechanism, and a driving motor, wherein the driving motor is configured to drive the gimbal component to rotate so as to adjust an attitude of the gimbal;

at least one balancing motor corresponding to the at least one rotation assembly, each balancing motor being configured to drive, via the transmission mechanism, at least part of the gimbal component to move along a balancing direction so as to adjust a center of gravity of the gimbal; and at least one locking structure corresponding to the at least one rotation assembly;

wherein each rotation assembly corresponds to one or more balancing directions, and each balancing direction corresponds to the at least one locking structure, so that the at least part of the gimbal component is allowed to move or remain fixed in a corresponding balancing direction of the one or more balancing directions;

the method comprising:

controlling at least one driving motor to rotate;

obtaining a first electric signal parameter of the at least one driving motor, wherein the first electric signal parameter corresponds to a torque output by the driving motor; and conducting a balancing operation according to a change of the torque, wherein the balancing operation comprises: in response to the change of the torque, controlling the at least one balancing motor to move the corresponding at least part of the gimbal component to adjust a center of gravity of the gimbal, thereby adjusting the change of the torque.

* * * * *